US012810797B2

(12) United States Patent
Yamazaki et al.

(10) Patent No.: US 12,810,797 B2
(45) Date of Patent: Nov. 24, 2026

(54) ELECTRONIC DEVICE

(71) Applicant: Semiconductor Energy Laboratory Co., Ltd., Atsugi (JP)

(72) Inventors: Shunpei Yamazaki, Setagaya (JP); Takanori Matsuzaki, Atsugi (JP); Atsushi Miyaguchi, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 19/134,806

(22) PCT Filed: Dec. 11, 2023

(86) PCT No.: PCT/IB2023/062447
§ 371 (c)(1),
(2) Date: Jun. 2, 2025

(87) PCT Pub. No.: WO2024/127199
PCT Pub. Date: Jun. 20, 2024

(65) Prior Publication Data

US 2026/0073863 A1 Mar. 12, 2026

(30) Foreign Application Priority Data

Dec. 16, 2022 (JP) ................................ 2022-200779

(51) Int. Cl.
*G09G 3/3233* (2016.01)

(52) U.S. Cl.
CPC ... *G09G 3/3233* (2013.01); *G09G 2300/0814* (2013.01); *G09G 2300/0857* (2013.01); *G09G 2330/021* (2013.01); *G09G 2330/045* (2013.01)

(58) Field of Classification Search
CPC ......... G09G 3/3233; G09G 2300/0814; G09G 2300/0857; G09G 2330/021; G09G 2330/045
See application file for complete search history.

(56) References Cited

U.S. PATENT DOCUMENTS 7,592,970 B2 * 9/2009 Matthies ............ G02F 1/13336 345/206
10,373,983 B2 8/2019 Takahashi et al.
(Continued)

FOREIGN PATENT DOCUMENTS

CN 109493793 A 3/2019
CN 115424584 A * 12/2022 .......... G09G 3/3208
(Continued)

OTHER PUBLICATIONS

International Search Report (Application No. PCT/IB2023/062447) Dated Feb. 27, 2024.
(Continued)

*Primary Examiner* — Ke Xiao
*Assistant Examiner* — Jennifer L Zubajlo
(74) *Attorney, Agent, or Firm* — Eric J. Robinson; Robinson Intellectual Property Law Office, P.C.

(57) ABSTRACT

An electronic device with a novel structure is provided. In the electronic device including a semiconductor device, the semiconductor device includes a logic circuit portion provided in a plurality of element layers, a display control portion, and a display portion. The display portion includes a plurality of display regions. The display control portion includes a plurality of driver circuit portions. The plurality of display regions each include a pixel circuit that controls light emission of a light-emitting device. The plurality of driver circuit portions each include a driver circuit that controls the pixel circuit. The plurality of display regions are each provided at a position overlapping with a region where
(Continued)

any one of the plurality of driver circuit portions is provided. The logic circuit portion includes an arithmetic device. The arithmetic device has a function of controlling, in accordance with whether or not image data is updated in each of the plurality of display regions, an operation state or a stop state of the driver circuit corresponding to the pixel circuit included in the display region.

6 Claims, 25 Drawing Sheets

(56) References Cited

U.S. PATENT DOCUMENTS

| | | | | |
|---|---|---|---|---|
| 10,620,590 | B1 * | 4/2020 | Guzman | G04G 21/08 |
| 10,700,098 | B2 | 6/2020 | Takahashi et al. | |
| 11,404,447 | B2 | 8/2022 | Takahashi et al. | |
| 11,676,971 | B2 | 6/2023 | Takahashi et al. | |
| 12,027,528 | B2 | 7/2024 | Takahashi et al. | |
| 12,243,482 | B2 | 3/2025 | Yamazaki et al. | |
| 2014/0240362 | A1 | 8/2014 | Kurita | |
| 2015/0243203 | A1 * | 8/2015 | Kim | G09G 3/2092 345/212 |
| 2018/0040640 | A1 | 2/2018 | Takahashi et al. | |
| 2023/0410738 | A1 * | 12/2023 | Yamazaki | H05B 33/02 |
| 2024/0355829 | A1 | 10/2024 | Takahashi et al. | |

FOREIGN PATENT DOCUMENTS

| | | | | | |
|---|---|---|---|---|---|
| CN | 116830183 | A | | 9/2023 | |
| JP | 2014-194540 | A | | 10/2014 | |
| JP | 2018-025777 | A | | 2/2018 | |
| JP | 2018055097 | A | * | 4/2018 | |
| KR | 2018-0015574 | A | | 2/2018 | |
| KR | 2023-0112706 | A | | 7/2023 | |
| TW | 201824227 | | | 7/2018 | |
| WO | WO-2016/036472 | | | 3/2016 | |
| WO | WO-2022/118141 | | | 6/2022 | |
| WO | WO-2022118141 | A1 | * | 6/2022 | G09G 3/3233 |

OTHER PUBLICATIONS

Written Opinion (Application No. PCT/IB2023/062447) Dated Feb. 27, 2024.

* cited by examiner

ELECTRONIC DEVICE

TECHNICAL FIELD

In this specification, an electronic device, a display system including the electronic device, a semiconductor device included in the electronic device, and the like are described.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a storage device, an electronic device, a lighting device, an input device, an input/output device, a driving method thereof, and a manufacturing method thereof.

BACKGROUND ART

Wearable electronic devices that perform mobile communication or the like have been widely used. For example, an arm-worn electronic device may include a variety of sensors, a CPU for controlling the sensors, a memory for storing data, and the like in addition to a display (e.g., see Patent Document 1).

In such electronic devices, techniques for improving the performance of the semiconductor devices have been actively developed to process a large volume of data at high speed. As a technique for achieving high performance, what is called an SoC (System on Chip) is given in which an accelerator such as a GPU (Graphics Processing Unit) and a CPU are tightly coupled.

Furthermore, there has been a proposal for an integrated structure of a display device and a semiconductor device adopting an SoC incorporating CPU or the like (see Patent Document 2, for example). In an electronic device including a semiconductor device having higher performance by adopting an SoC, heat generation of the CPU or the like and an increase in power consumption become problems. Thus, power gating or the like is performed by saving data of a scan flip-flop of the CPU in a backup circuit, whereby a structure in which an increase in power consumption and heat generation are inhibited without a lowering in performance becomes effective.

REFERENCES

Patent Documents

[Patent Document 1] PCT International Publication No. 2016/036472

[Patent Document 2] PCT International Publication No. 2022/118141

SUMMARY OF THE INVENTION

Problems to be Solved by the Invention

A semiconductor device with performance improved by adopting an SoC is constructed with transistors in stacked element layers so that downsizing and higher performance are achieved. Performance improvement of the semiconductor device and demand for an increase in power consumption or downsizing of the semiconductor device have a trade-off relationship. That is, it has been difficult to achieve both performance improvement of the semiconductor device and reduction in power consumption or size of the semiconductor device.

An object of one embodiment of the present invention is to provide a novel electronic device and the like. Another object of one embodiment of the present invention is to provide an electronic device and the like with a novel structure, which include a semiconductor device having higher performance by adopting an SoC and which enables a reduction in size of the semiconductor device. Another object of one embodiment of the present invention is to provide an electronic device and the like with a novel structure which include a semiconductor device having higher performance by adopting an SoC and in which heat generation and an increase in power consumption can be inhibited. Another object of one embodiment of the present invention is to provide an electronic device and the like with a novel structure in which both performance improvement of a semiconductor device and reduction in power consumption or heat generation of the semiconductor device can be achieved. Another object of one embodiment of the present invention is to provide an electronic device and the like with a novel structure that are highly convenient.

The description of a plurality of objects does not preclude the existence of each object. One embodiment of the present invention does not necessarily achieve all the objects described as examples. Furthermore, objects other than those listed are apparent from description of this specification, and such objects can be objects of one embodiment of the present invention.

Means for Solving the Problems

One embodiment of the present invention is an electronic device including a semiconductor device; the semiconductor device includes a logic circuit portion provided in a plurality of element layers, a display control portion, and a display portion; the display portion includes a plurality of display regions; the display control portion includes a plurality of driver circuit portions; the plurality of display regions each include a pixel circuit that controls light emission of a light-emitting device; the plurality of driver circuit portions each include a driver circuit that controls the pixel circuit; the plurality of display regions are each provided at a position overlapping with a region where any one of the plurality of driver circuit portions is provided; the logic circuit portion includes an arithmetic device; and the arithmetic device has a function of controlling, in accordance with whether or not image data is updated in each of the plurality of display regions, an operation state or a stop state of the driver circuit corresponding to the pixel circuit included in the display region.

In the electronic device of one embodiment of the present invention, it is preferable that a first element layer, a second element layer, and a third element layer be included, the first element layer include a first transistor including a semiconductor layer including silicon in a channel formation region, the second element layer include a second transistor including a semiconductor layer including a metal oxide in a channel formation region, and the third element layer include the light-emitting device.

In the electronic device of one embodiment of the present invention, it is preferable that the arithmetic device include a scan flip-flop and a backup circuit electrically connected to the scan flip-flop, the scan flip-flop and the driver circuit portion be provided in the first element layer, and the backup circuit and the pixel circuit be provided in the second element layer.

In the electronic device of one embodiment of the present invention, it is preferable that the backup circuit, in a non-operation state of the arithmetic device, have a function of retaining data retained in the scan flip-flop in a state where supply of power supply voltage is stopped.

In the electronic device of one embodiment of the present invention, it is preferable that the metal oxide include In, Ga, and Zn.

In the electronic device of one embodiment of the present invention, it is preferable that the image data be image data for displaying a second hand, an hour hand, and a minute hand, in the arithmetic device, the driver circuit corresponding to the pixel circuit included in the display region displaying the second hand, the hour hand, and the minute hand be in an operation state, and the driver circuit corresponding to the pixel circuit included in the display region not displaying the second hand, the hour hand, and the minute hand be in a stop state.

Note that other embodiments of the present invention will be shown in the description of the following embodiments and the drawings.

Effect of the Invention

One embodiment of the present invention can provide an electronic device and the like with a novel structure. Another embodiment of the present invention can provide an electronic device and the like with a novel structure, which include a semiconductor device having performance improved by adopting an SoC and which enables a reduction in size of the semiconductor device. Another embodiment of the present invention can provide an electronic device and the like with a novel structure which include a semiconductor device having performance improved by adopting an SoC and which can inhibit heat generation and an increase in power consumption. Another embodiment of the present invention can provide an electronic device and the like with a novel structure in which both performance improvement of a semiconductor device and reduction in power consumption or heat generation of the semiconductor device can be achieved. Another embodiment of the present invention can provide an electronic device and the like with a novel structure that is highly convenient.

The description of a plurality of effects does not preclude the existence of other effects. In addition, one embodiment of the present invention does not necessarily achieve all the effects described as examples. In one embodiment of the present invention, other objects, effects, and novel features are apparent from the description of this specification and the drawings.

MODE FOR CARRYING OUT THE INVENTION

Figure 1A:
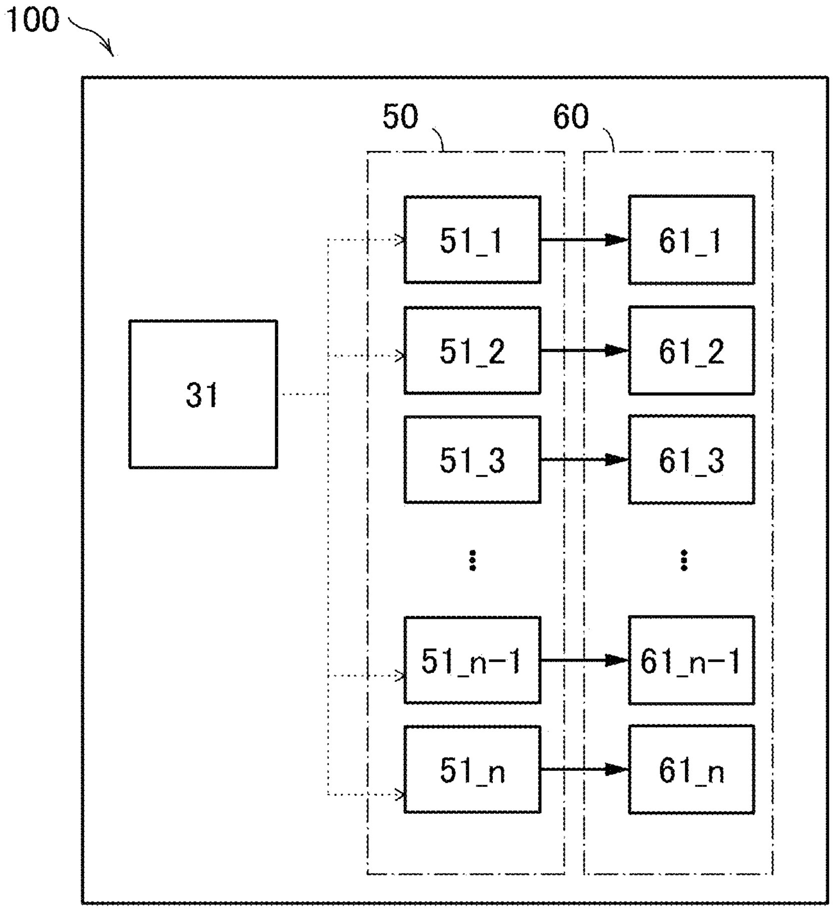
FIG. 1A and FIG. 1B are diagrams illustrating structure examples of a semiconductor device and an electronic device.

Embodiments of the present invention will be described below. Note that one embodiment of the present invention is not limited to the following description, and it will be readily understood by those skilled in the art that modes and details of the present invention can be modified in various ways without departing from the spirit and scope of the present invention. One embodiment of the present invention therefore should not be construed as being limited to the following description of the embodiments.

Note that ordinal numbers such as "first", "second", and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or the scope of claims. Moreover, in this specification and the like, for example, a "first" component in one embodiment can be omitted in other embodiments or the scope of claims.

In some cases, the same components, components having similar functions, components made of the same material, components formed at the same time, and the like are denoted by the same reference numerals in the drawings and repeated description thereof is omitted.

In this specification, for example, a power supply potential VDD may be abbreviated to a potential VDD, VDD, or the like. The same applies to other components (e.g., a signal, a voltage, a circuit, an element, an electrode, and a wiring).

In the case where a plurality of components are denoted by the same reference numerals, and, particularly when they need to be distinguished from each other, an identification sign such as "_1", "_2", "[n]", or "[m, n]" is sometimes added to the reference numerals. For example, a second wiring GL is referred to as a wiring GL_2.

Embodiment 1

Structure examples of an electronic device of one embodiment of the present invention will be described with reference to FIG. 1A to FIG. 19F.

Structure Example of Electronic Device

FIG. 1A is a block diagram illustrating a semiconductor device included in the electronic device of one embodiment of the present invention. A semiconductor device 100 illustrated in FIG. 1A includes a logic circuit portion 31, a display control portion 50, and a display portion 60, for example.

Figure 1B:
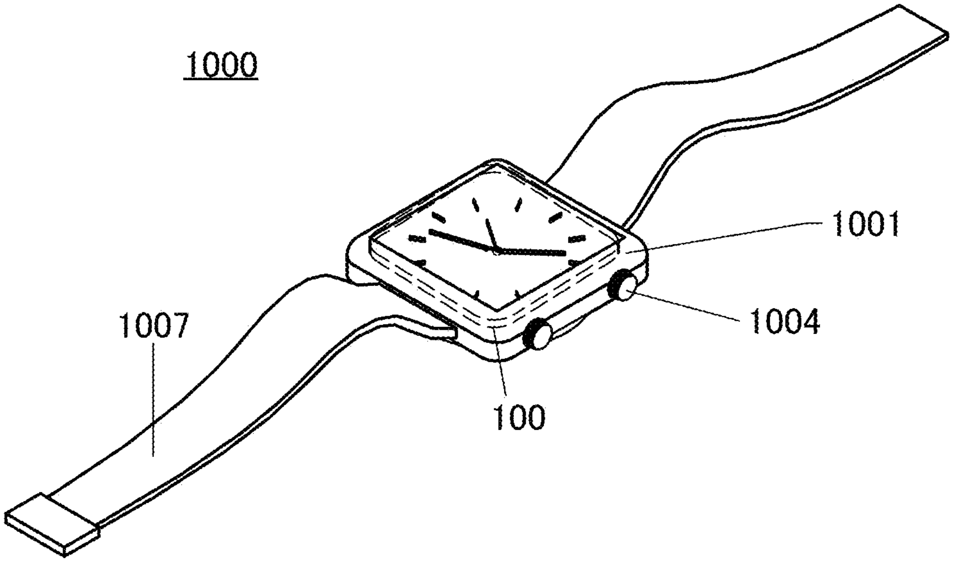

FIG. 1B is an example of a perspective view of an electronic device 1000 including the semiconductor device 100 illustrated in FIG. 1A. The electronic device 1000 illustrated in FIG. 1B is a watch-type electronic device having a function of displaying an analog watch with a minute hand, an hour hand, and a second hand, for example. The electronic device 1000 has a structure in which the semiconductor device 100 illustrated in FIG. 1A is stored in a housing 1001 to which an operation portion 1004 and a band 1007 are attached. The electronic device 1000 illustrated in FIG. 1B has a function of what is called a smartwatch.

The logic circuit portion 31 has a function of controlling the display control portion 50 in accordance with image data. Specifically, the logic circuit portion 31 has a function of controlling, in accordance with the image data, pause operations or restart operations of driver circuit portions 51 of the divided display control portion 50. In the pause operation of the driver circuit portion 51, an operation of not outputting the image data is performed in addition to an operation of retaining a scan signal at a low level in a driver circuit included in the driver circuit portion 51, so that the driver circuit portion 51 is brought into a stop state. Furthermore, supply of a control signal such as a clock signal to the driver circuit may also be stopped. This operation allows the image data supplied in the previous period to be retained in pixel circuits included in the display portion 60. In the restart operation of the driver circuit portion 51, the following operation is performed: the image data is supplied to the driver circuit of the driver circuit portion 51, so that a state in which the scan signal and the image data are supplied is obtained. In the case where supply of a control signal such as a clock signal to the driver circuit of the driver circuit portion 51 is stopped in the pause operation of the driver circuit portion 51, supply of the control signal is restarted, so that the driver circuit portion 51 is brought into an operation state. With this structure, power consumption of the driver circuit portion 51 in a period during which the image data is not updated can be reduced.

The display control portion 50 includes the driver circuits for controlling the pixel circuits included in the display portion 60. The display control portion 50 includes the driver circuit portions 51 (driver circuit portions 51_1 to 51_*n*) (n is an integer greater than or equal to 2). The driver circuit portions 51 each have a structure in which the driver circuits are provided for a plurality of regions (sections).

The driver circuits included in the driver circuit portion 51 are electrically connected to the pixel circuits included in the display portion 60. The driver circuit has a function of supplying the image data and the scan signal to the display portion 60. The driver circuit that supplies the scan signal to the display portion 60 is referred to as a gate driver circuit or a scan line driver circuit in some cases. The driver circuit that supplies the image data to the display portion 60 is referred to as a source driver circuit or a signal line driver circuit in some cases. A variety of circuits such as a shift register, a level shifter, an inverter, a latch, an analog switch, and a logic circuit can be used as the driver circuit.

The display portion 60 includes a plurality of pixel circuits for displaying an image based on the image data. The pixel circuit is a circuit that controls a display device such as a light-emitting device. The display portion 60 includes a plurality of display regions 61 (display regions 61_1 to 61_*n*). Each of the display regions 61 is referred to as a sub-display portion in some cases. The display regions 61 each have a structure in which the pixel circuits are provided for a plurality of regions (sections).

The structures of the display control portion 50 and the display portion 60 included in the semiconductor device 100 will be described with reference to FIG. 2A and FIG. 2B.

Figure 2A:
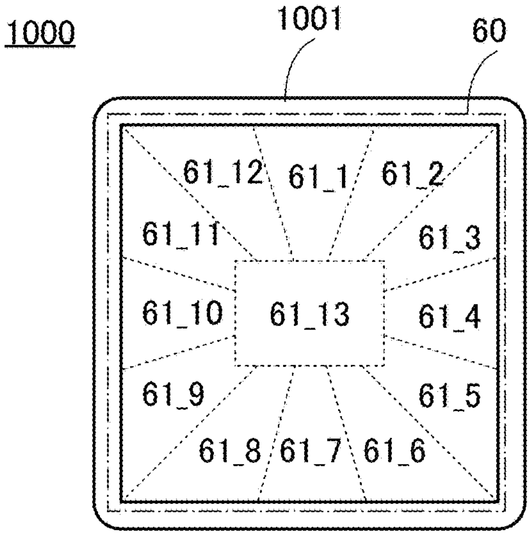
FIG. 2A and FIG. 2B are diagrams each illustrating a structure example of a semiconductor device.

FIG. 2A is a diagram illustrating the display portion 60 when the semiconductor device 100 is stored in the housing 1001 of the electronic device 1000. In FIG. 2A, the display control portion 50 (not illustrated) is placed at a position overlapping with the display portion 60. The display portion 60 includes the display regions 61_1 to 61_13.

Note that in the display portion 60 illustrated in FIG. 2A, the number of divided regions is 13. With this structure, when the analog watch with, for example, the minute hand, the hour hand, and the second hand is displayed, a middle portion of a dial can serve as a display region, in addition to 12 divided display regions which correspond to the number of dials displayed on the analog watch.

Note that the number of divided display regions in the display portion 60 may be other than 13. For example, the display region may be divided into 12 which corresponds to the number of dials displayed on the analog watch. Alternatively, the display region may have 7 divided parts: 6 equally-divided parts of dials on the analog watch and the display region of the middle region. Alternatively, the display region may have 5 divided parts: 4 equally-divided parts of dials on the analog watch and the display region of the middle region. Alternatively, the display region may have 3 divided parts: 2 equally-divided parts of dials on the analog watch and the display region of the middle region.

Figure 2B:
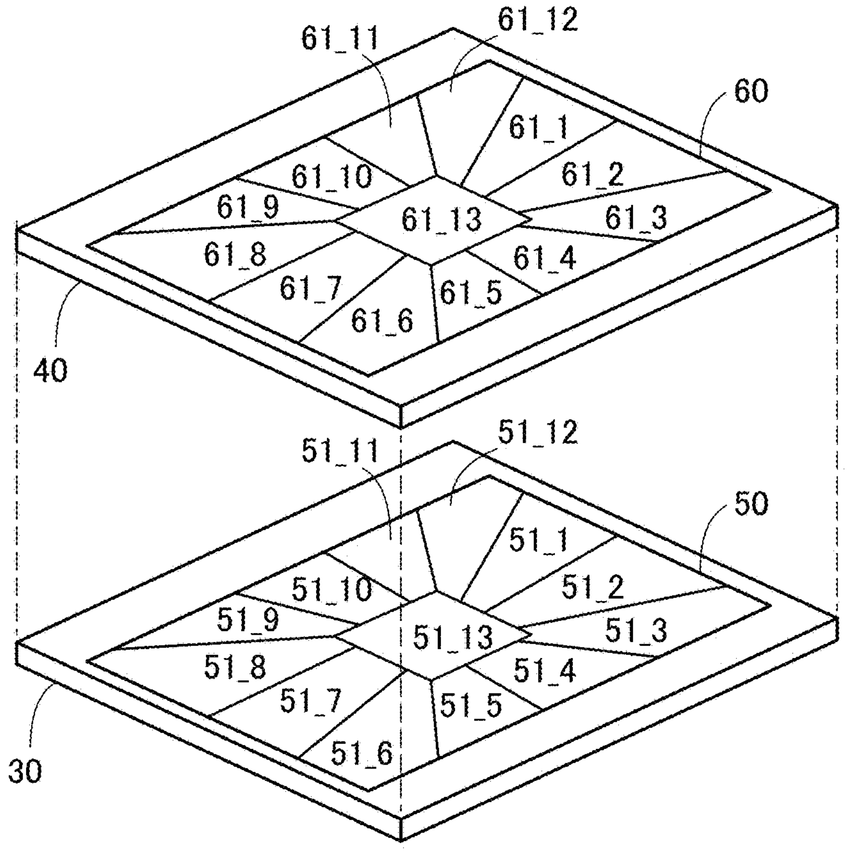

FIG. 2B is a schematic perspective view illustrating an element layer 30 and an element layer 40 provided with the display control portion 50 and the display portion 60, respectively. The element layer 40 is stacked over the element layer 30. The display control portion 50 provided in the element layer 30 is provided at a position overlapping with the display portion 60 provided in the element layer 40.

The display control portion 50 included in the element layer 30 is formed using a Si CMOS, i.e., transistors including silicon in their channel formation regions (Si transistors). That is, the element layer 30 is a layer including Si transistors. When the element layer 30 is formed using the Si transistors, a circuit required to operate at high speed, such as the display control portion 50, can be provided in the element layer 30.

For the Si transistors, the use of silicon having high crystallinity, such as single crystal silicon or polycrystalline silicon, is particularly preferable because high field-effect mobility can be achieved and higher-speed operation is possible.

The display portion 60 included in the element layer 40 is formed using OS transistors, i.e., transistors including an oxide semiconductor in their channel formation regions. That is, the element layer 40 is a layer including OS transistors. When the element layer 40 is formed using the OS transistors, the element layer 40 can be provided to be stacked over the element layer 30.

An OS transistor has a characteristic of an extremely low off-state current. Thus, when the OS transistor is used as a transistor of the display portion 60 provided with the pixel circuit, the image data written to the pixel circuit can be retained for a long period. Accordingly, the frequency of image data rewriting can be reduced, and low power consumption can be achieved.

The display portion 60 includes the plurality of display regions 61 (61_1 to 61_13). The display control portion 50 includes the driver circuit portions 51 (51_1 to 51_13). The driver circuit portions 51 include the driver circuits that can separately drive the plurality of display regions 61.

Figure 3A:
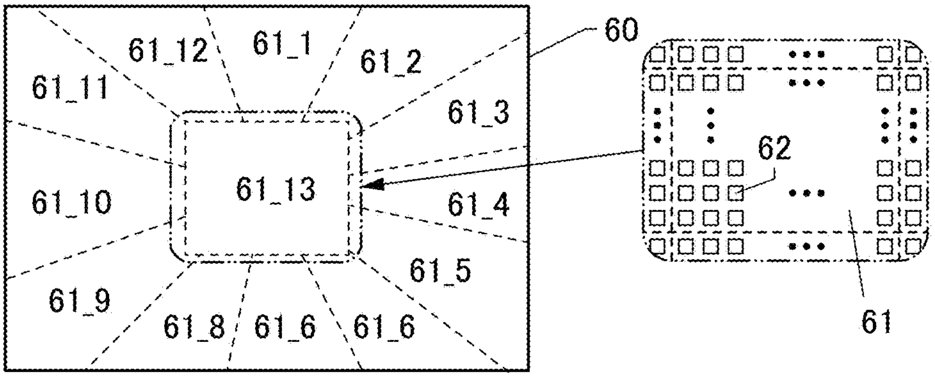
FIG. 3A to FIG. 3C are diagrams each illustrating a structure example of a semiconductor device.

FIG. 3A is a schematic view illustrating a structure of the display portion 60 included in the semiconductor device 100. FIG. 3A illustrates a structure example of the display region 61_13 provided with pixel circuits 62, for example.

Figure 3B:
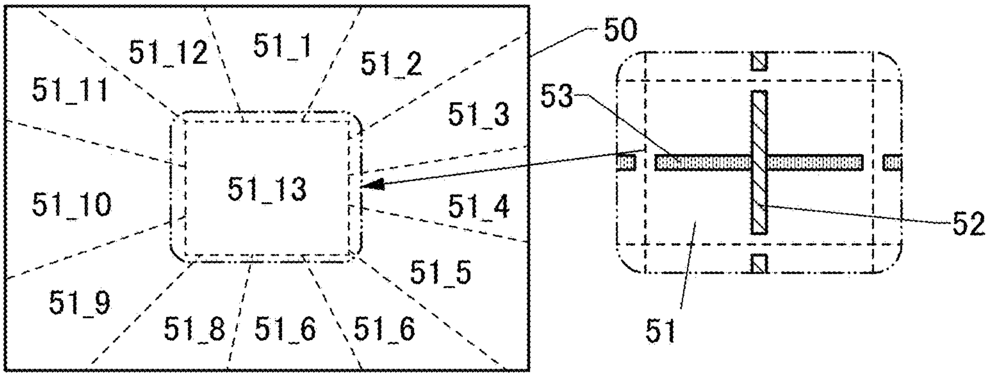

FIG. 3B is a schematic view illustrating a structure of the display control portion 50 included in the semiconductor device 100. FIG. 3B illustrates a structure example of the driver circuit portion 51_13 including driver circuits 52 and 53 for driving the pixel circuit 62 included in the display region 61_13, for example. The driver circuit 52 and the driver circuit 53 correspond to the source driver circuit and the gate driver circuit, respectively, for example. That is, a structure in which the display region 61 and the display control portion 50 are each divided into 13 sections is illustrated.

Figure 3C:
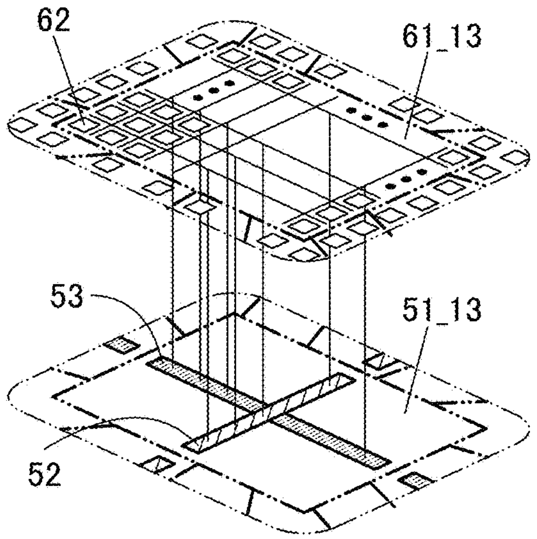

One of the display regions 61 and one of the driver circuit portions 51 are provided to overlap with each other (see FIG. 3C). For example, the display region 61_13 and the driver circuit portion 51_13 are provided to overlap with each other. The driver circuit 52 included in the driver circuit portion 51_13 is electrically connected to a wiring for transmitting the image data to the pixel circuit 62 included in the display region 61_13. The driver circuit 53 included in the driver circuit portion 51_13 is electrically connected to a wiring for selecting the pixel circuit 62, which is included in the display region 61_13, to which the image data is to be transmitted. The driver circuits 52 and 53 included in the driver circuit portion 51_13 each have a function of controlling the plurality of pixel circuits 62 included in the display region 61_13. Note that the driver circuit portions 51_1 to 51_12 also have a function of controlling the pixel circuits 62 included in the display regions 61_1 to 61_12 which are provided to overlap with the driver circuit portions 51_1 to 51_12.

Note that in FIG. 3A and FIG. 3B, the display regions 61_1 to 61_12 other than the display region 61_13 each have a polygonal shape other than a rectangular shape. In this case, the driver circuit portions 51, which are provided to overlap with the display regions 61 having polygonal shapes, are provided with the driver circuits 52 and 53 in accordance with the shapes of the display regions 61. Since the driver circuit portions 51 are arranged at positions overlapping with the display regions 61, the degree of freedom in the arrangement of the driver circuits 52 and 53 can be increased.

With the above structure, when the semiconductor device 100 is stored in the housing 1001 of the electronic device 1000, the display control portion 50 can be placed at a position overlapping with the display portion 60 including the display regions 61_1 to 61_13. When one of the display regions 61 and one of the driver circuit portions 51 are provided to overlap with each other, the connection distance (wiring length) between the pixel circuit 62 included in the display region 61 and the driver circuits 52 and 53 included in the driver circuit portion 51 can be extremely short. As a result, the wiring resistance and the parasitic capacitance are reduced, and thus time taken for charging and discharging can be reduced and high-speed driving can be achieved. Moreover, power consumption can be reduced. Furthermore, reduction in size and weight can be achieved.

The semiconductor device 100 includes the driver circuits 52 and 53 in each of the driver circuit portions 51. Thus, the display portion 60 is divided into the display regions 61 corresponding to the respective driver circuit portions 51, and the image data can be updated. For example, in the display portion 60, only in the display region 61 with an image change, image data is updated; whereas in the display region 61 without an image change, a potential corresponding to image data is retained in the pixel circuit 62 and thus an operation of the driver circuit portion 51 can be stopped. Thus, reduction in power consumption of the semiconductor device 100 can be achieved.

The semiconductor device 100 of one embodiment of the present invention can have a structure in which the display portion 60 including the pixel circuits and the display control portion 50 including the driver circuits are stacked; thus, the aperture ratio (effective display area ratio) of pixels can be extremely high. For example, the pixel aperture ratio can be higher than or equal to 40% and lower than 100%, preferably higher than or equal to 50% and lower than or equal to 95%, further preferably higher than or equal to 60% and lower than or equal to 95%. Furthermore, the pixel circuits can be arranged extremely densely, resulting in a significant increase in the resolution of the pixels. For example, in the display portion 60 of the semiconductor device 100, pixels can be arranged with a resolution greater than or equal to 2000 ppi, preferably greater than or equal to 3000 ppi, further preferably greater than or equal to 5000 ppi, still further preferably greater than or equal to 6000 ppi, and less than or equal to 20000 ppi or less than or equal to 30000 ppi.

Note that the diagonal size of the display portion 60 can be greater than or equal to 0.1 inches and less than or equal to 5.0 inches, preferably greater than or equal to 0.5 inches and less than or equal to 2.0 inches, further preferably greater than or equal to 1 inch and less than or equal to 1.7 inches. For example, the diagonal size of the display portion 60 may be 1.5 inches or approximately 1.5 inches. When the display portion 60 has a diagonal size less than or equal to 2.0 inches, the number of times of light exposure treatment using a light exposure apparatus (typically, a scanner apparatus) can be one; thus, the productivity of a manufacturing process can be improved.

Operation Example of Electronic Device

Figure 4A:
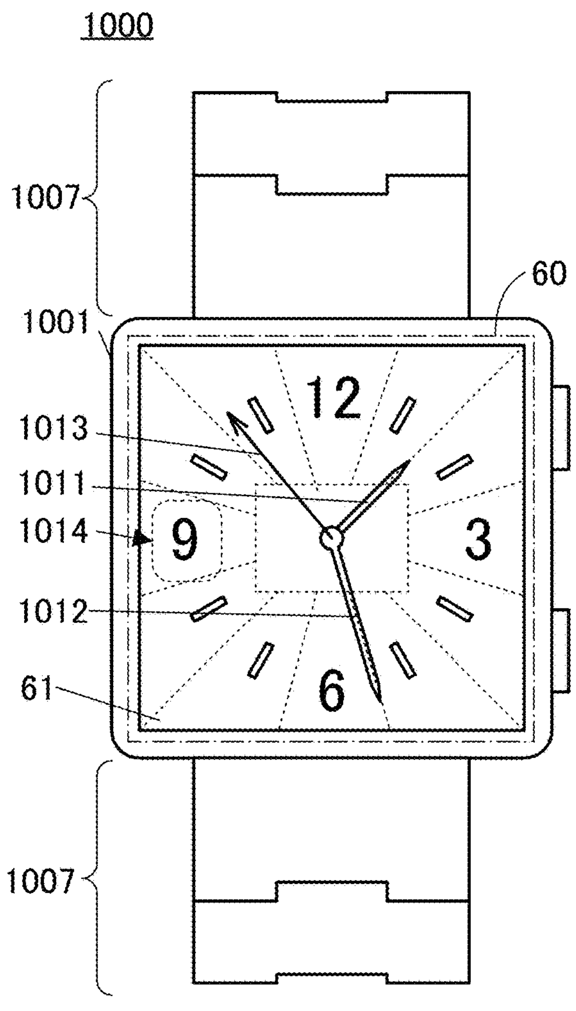
FIG. 4A and FIG. 4B are diagrams each illustrating a structure example of an electronic device.
Figure 4B:
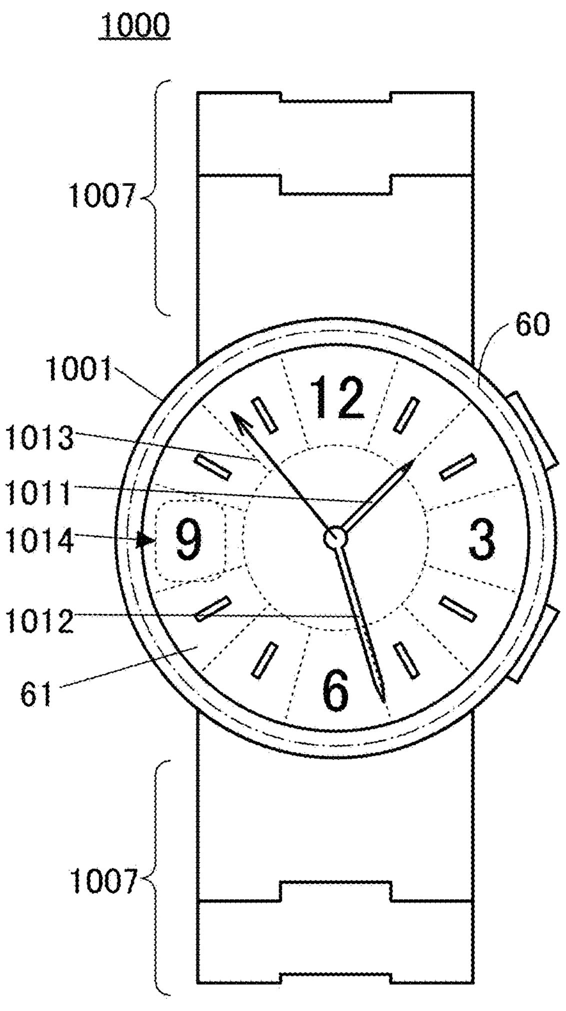

FIG. 4A and FIG. 4B are diagrams illustrating an operation example of the electronic device 1000 including the semiconductor device 100. For a display portion of the electronic device 1000, the display portion 60 included in the above-described semiconductor device 100 is used. Although FIG. 4A illustrates an example in which the display portion 60 of the electronic device 1000 has a rectangular shape, the operation example of the electronic device 1000 described below can also be applied to the display portion 60 having a circular shape as illustrated in FIG. 4B.

FIG. 4A and FIG. 4B are schematic views each illustrating the electronic device 1000 seen from the front surface side. FIG. 4A and FIG. 4B illustrate the case where the dial of the analog watch is displayed on the display portion 60 including the plurality of display regions 61. FIG. 4A and FIG. 4B each illustrate an hour hand 1011, a minute hand 1012, a second hand 1013, and a dial 1014 that are displayed on the display portion 60, as well as the housing 1001 and the band 1007 illustrated in FIG. 1B. Note that the second hand 1013 or the dial 1014 is not necessarily provided. Note that in FIG. 4A and FIG. 4B, boundaries between the display regions 61 in the display portion 60 are illustrated using dotted lines. FIG. 4A and FIG. 4B illustrate 13 divided display regions as described with reference to FIG. 2A and FIG. 2B.

Each of the display regions 61 illustrated in FIG. 4A and FIG. 4B is provided to overlap with any one of the plurality of driver circuit portions 51 as described with reference to FIG. 2A and FIG. 2B, and control of the pixel circuit can be performed for each display region 61. Thus, the pause operation or the update (restart operation) of the image data of the driver circuits included in the driver circuit portion 51 can be performed individually for each display region 61 in accordance with its image data.

Figure 5:
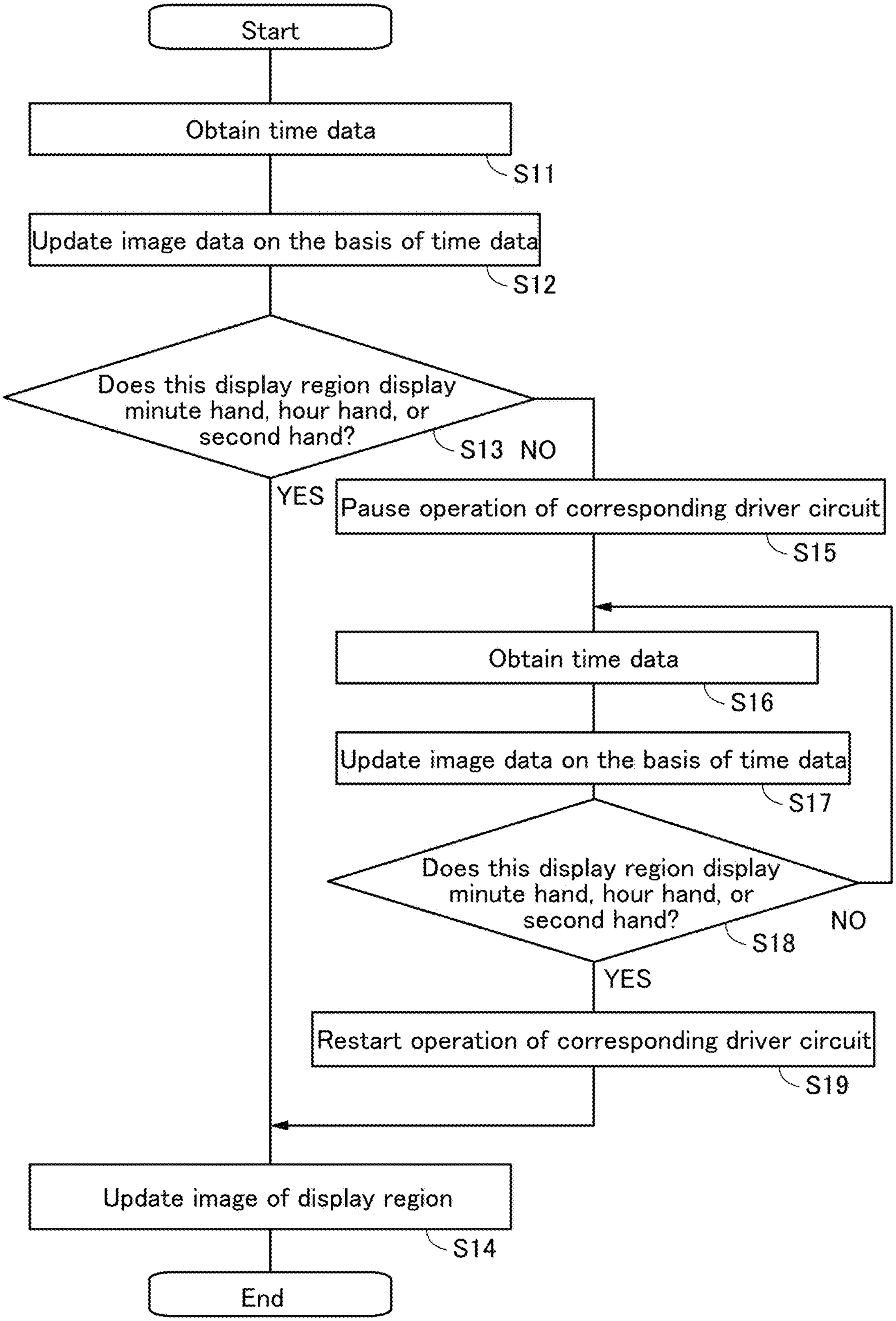
FIG. 5 is a flow chart showing a structure example of an electronic device.

FIG. 5 is an example of a flow chart showing the operation example of the electronic device 1000.

In an arithmetic device 10, time data is obtained (Step S11). The time data is data obtained with a timer or the like. On the basis of the time data, image data for displaying an analog watch on the display portion 60 is generated.

On the basis of the time data, the image data supplied to the driver circuit portions 51 included in the display control portion 50 is updated (Step S12). The image data is updated for each of the display regions 61 included in the display portion 60, that is, for each of the driver circuit portions 51 corresponding to the display regions 61.

Whether or not the display region 61 is a display region where a minute hand, an hour hand, or a second hand is displayed is determined in accordance with the image data based on the time data (Step S13). Note that in the case where the second hand is not displayed, the design may be changed as appropriate to determine whether or not the display region 61 is a display region where the minute hand or the hour hand is displayed. In the case where the display region 61 displays the minute hand, the hour hand, or the second hand on the basis of the time data (YES), the image data is transmitted to the driver circuit portion 51 corresponding to the display region 61 and an image of the display region 61 is updated on the basis of the transmitted image data (Step S14).

In Step S13, in the case of the display region 61 where the minute hand, the hour hand, or the second hand is not displayed on the basis of the time data (NO), a pause operation of a driver circuit included in the driver circuit portion 51 corresponding to the display region 61 is performed (Step S15). The pause operation is, for example, a stop of supply, from the driver circuit to a pixel circuit, of a scan signal and the image data. This pause operation reduces the frequency of supplying a signal to the driver circuit portion 51.

After the pause operation of the driver circuit included in the driver circuit portion 51 is performed in Step S15, time data is obtained in the arithmetic device 10 (Step S16). In the case where the time data is obtained in a certain period, such as once per second when there is the second hand and once per minute when there is no second hand, power gating of the arithmetic device 10 or the like can be performed periodically. Thus, power consumption can be reduced.

On the basis of the time data, the image data supplied to the driver circuit portions 51 included in the display control portion 50 is updated (Step S17). The image data is updated for each of the display regions 61 included in the display portion 60, that is, for each of the driver circuit portions 51 corresponding to the display regions 61.

Whether or not the display region 61 is a display region where the minute hand, the hour hand, or the second hand is displayed is determined in accordance with the image data based on the time data (Step S18). In the case of the display region 61 where the minute hand, the hour hand, or the second hand is displayed on the basis of the time data (YES), a restart operation of the driver circuit included in the driver circuit portion 51 corresponding to the display region 61 is performed (Step S19), then the image data is transmitted to the driver circuit portion 51 corresponding to the display region 61, and the image of the display region 61 is updated on the basis of the transmitted image data (Step S14). In the case of the display region 61 where the minute hand, the hour hand, or the second hand is not displayed on the basis of the time data (NO), the pause operation is continuously performed for the driver circuit included in the driver circuit portion 51 corresponding to the display region 61, and Step S16 of obtaining the time data and Step S17 of updating the image data are performed in the arithmetic device 10.

The states of the display portion 60 and the display control portion 50 in the electronic device 1000 based on the flowchart shown in FIG. 5 are specifically described with reference to FIG. 6A to FIG. 6F. Note that in FIG. 6A to FIG. 6F, boundaries between the display regions 61 in the display portion 60 are illustrated using dotted lines. FIG. 6A to FIG. 6F illustrate 13 divided display regions as described with reference to FIG. 2A and FIG. 2B. Thus, in the description of FIG. 6A to FIG. 6F, the display regions 61_1 to 61_13 are described when positions of the display regions 61 are specified. In a similar manner, the driver circuit portions 51_1 to 51_13 are described when positions of the driver circuit portions 51 are specified.

Figure 6A:
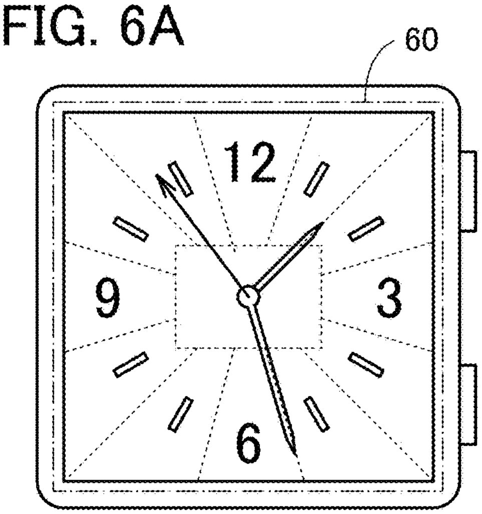
FIG. 6A to FIG. 6F are diagrams each illustrating a structure example of a semiconductor device.
Figure 6B:
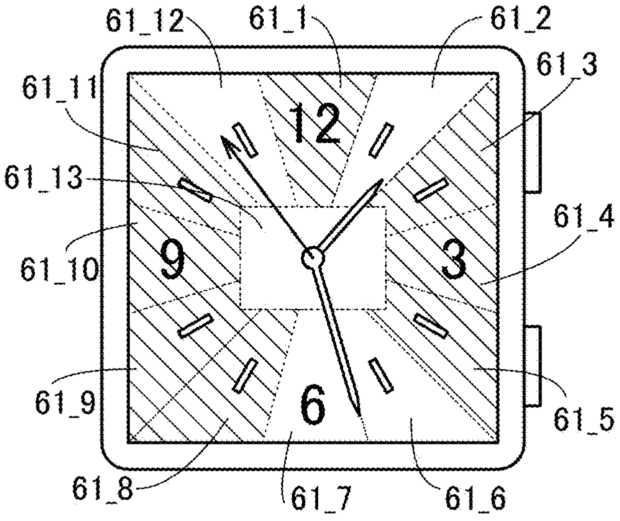

FIG. 6A is a diagram illustrating a state where the display of the analog watch on the display portion 60 is at "one o'clock twenty-eight minutes and fifty-four seconds". In this case, the display of the hour hand on the display portion 60 is performed in the display regions 61_2 and 61_13 as illustrated in FIG. 6B. The display of the minute hand on the display portion 60 is performed in the display region 61_6 and the display regions 61_7 and 61_13 as illustrated in FIG. 6B. The display of the second hand on the display portion 60 is performed in the display regions 61_12 and 61_13 as illustrated in FIG. 6B.

Thus, the display regions whose image data is updated on the basis of the time data are the display regions 61_2, 61_6, 61_7, 61_12, and 61_13. The other display regions are display regions where only display of the dial is displayed and the image data is not updated. Thus, the display regions where the image data is not updated are denoted by hatching in FIG. 6B.

Figure 6C:
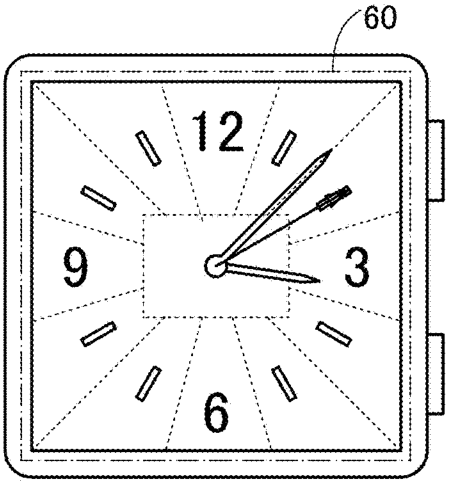
Figure 6D:
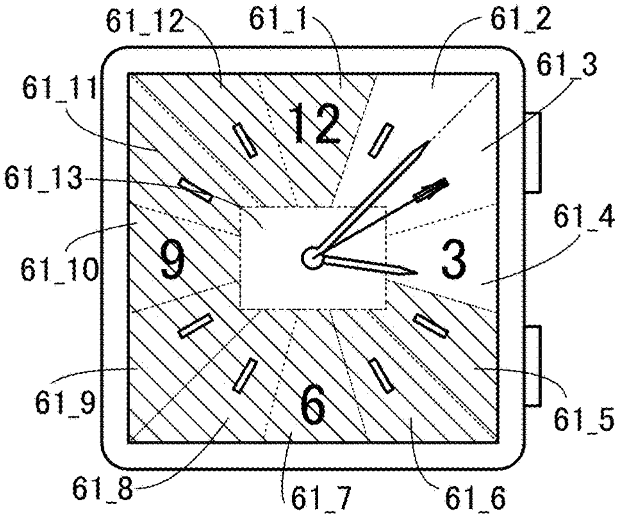

FIG. 6C is a diagram illustrating a state where display of the analog watch on the display portion 60 is at "three o'clock seven minutes and ten seconds". In this case, the display of the hour hand on the display portion 60 is performed in the display regions 61_4 and 61_13 as illustrated in FIG. 6D. The display of the minute hand on the display portion 60 is performed in the display region 61_2 and the display regions 61_3 and 61_13 as illustrated in FIG. 6D. The display of the second hand on the display portion 60 is performed in the display regions 61_3 and 61_13 as illustrated in FIG. 6D.

Thus, the display regions whose image data is updated on the basis of the time data are the display regions 61_2, 61_3, 61_4, and 61_13. The other display regions are display regions where only display of the dial is displayed and the image data is not updated. Thus, the display regions where the image data is not updated are denoted by hatching in FIG. 6D.

Figure 6E:
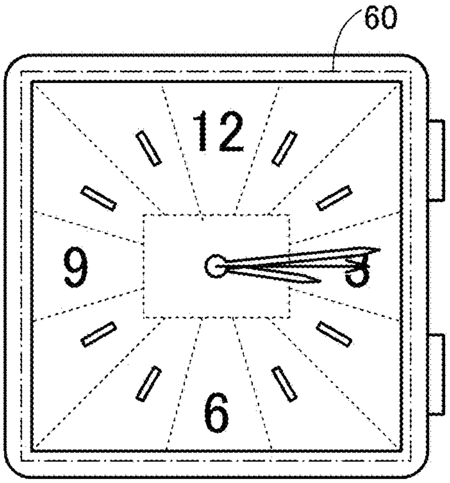
Figure 6F:
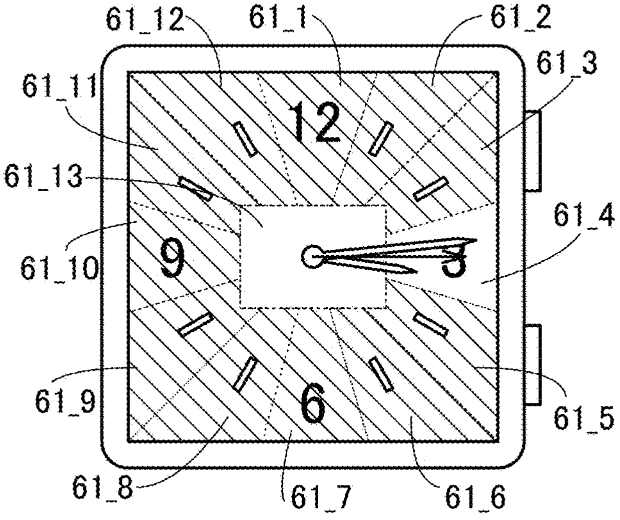

FIG. 6E is a diagram illustrating a state where display of the analog watch on the display portion 60 is at "three o'clock fourteen minutes and fifteen seconds". In this case, the display of the hour hand on the display portion 60 is performed in the display regions 61_4 and 61_13 as illustrated in FIG. 6F. The display of the minute hand on the display portion 60 is performed in the display regions 61_4 and 61_13 as illustrated in FIG. 6F. The display of the second hand on the display portion 60 is performed in the display regions 61_4 and 61_13 as illustrated in FIG. 6F.

Thus, the display regions whose image data is updated on the basis of the time data are the display regions 61_4 and 61_13. The other display regions are display regions where only display of the dial is displayed and the image data is not updated. Thus, the display regions where the image data is not updated are denoted by hatching in FIG. 6F.

As described above, in the structure of the semiconductor device of one embodiment of the present invention, the driver circuit portions 51 that separately drive the plurality of display regions 61 are provided to overlap with each other. The driver circuit portions 51_1 to 51_13, which correspond to the display regions 61_1 to 61_13 denoted by hatching in FIG. 6A to FIG. 6F, can perform the pause operation or the restart operation of the driver circuits on the basis of whether or not the image data is updated. Thus, power consumption of the electronic device 1000 including the semiconductor device 100 can be reduced.

Configuration Example of Semiconductor Device

Figure 7:
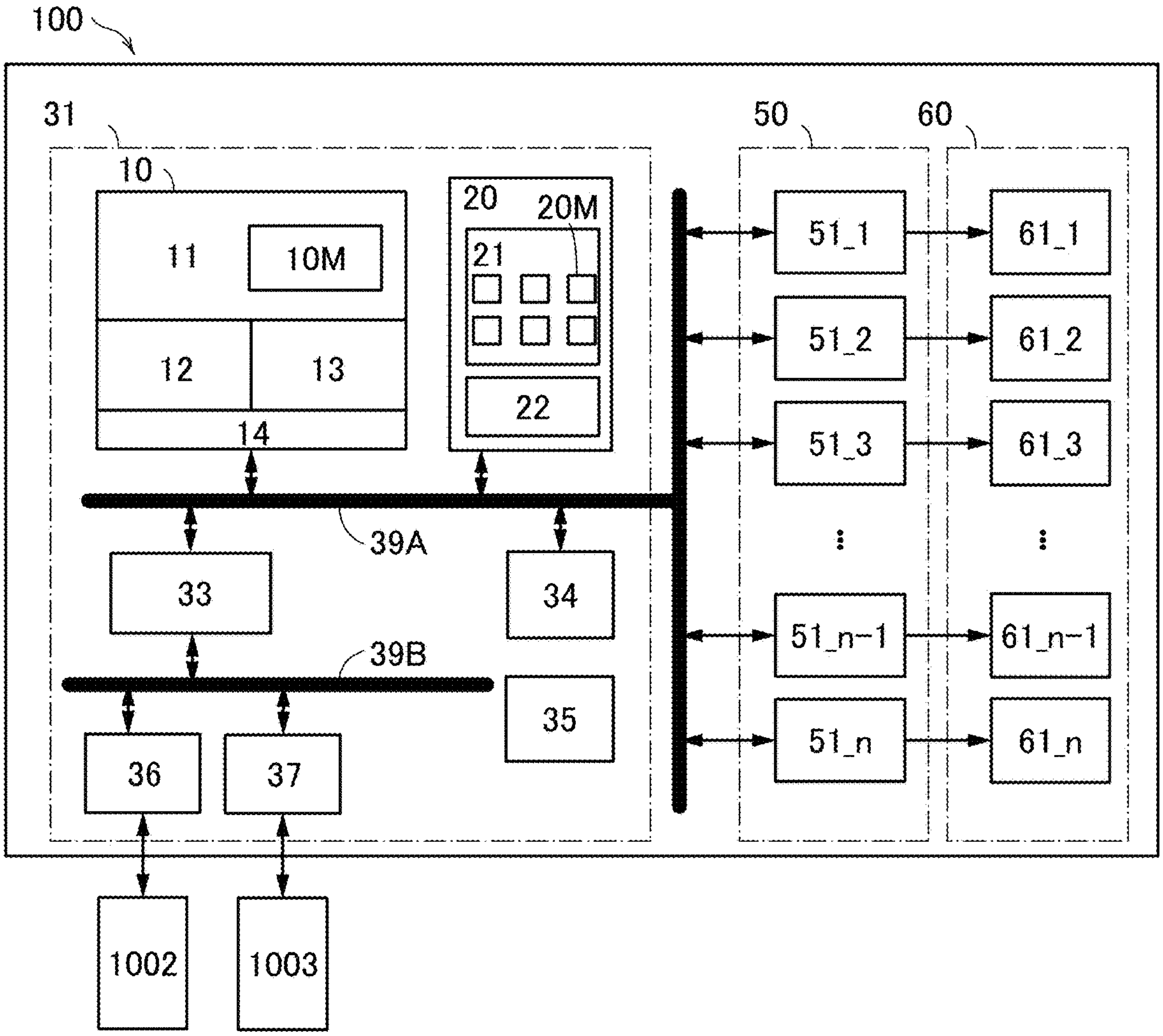
FIG. 7 is a diagram illustrating a configuration example of a semiconductor device.
Figure 8:
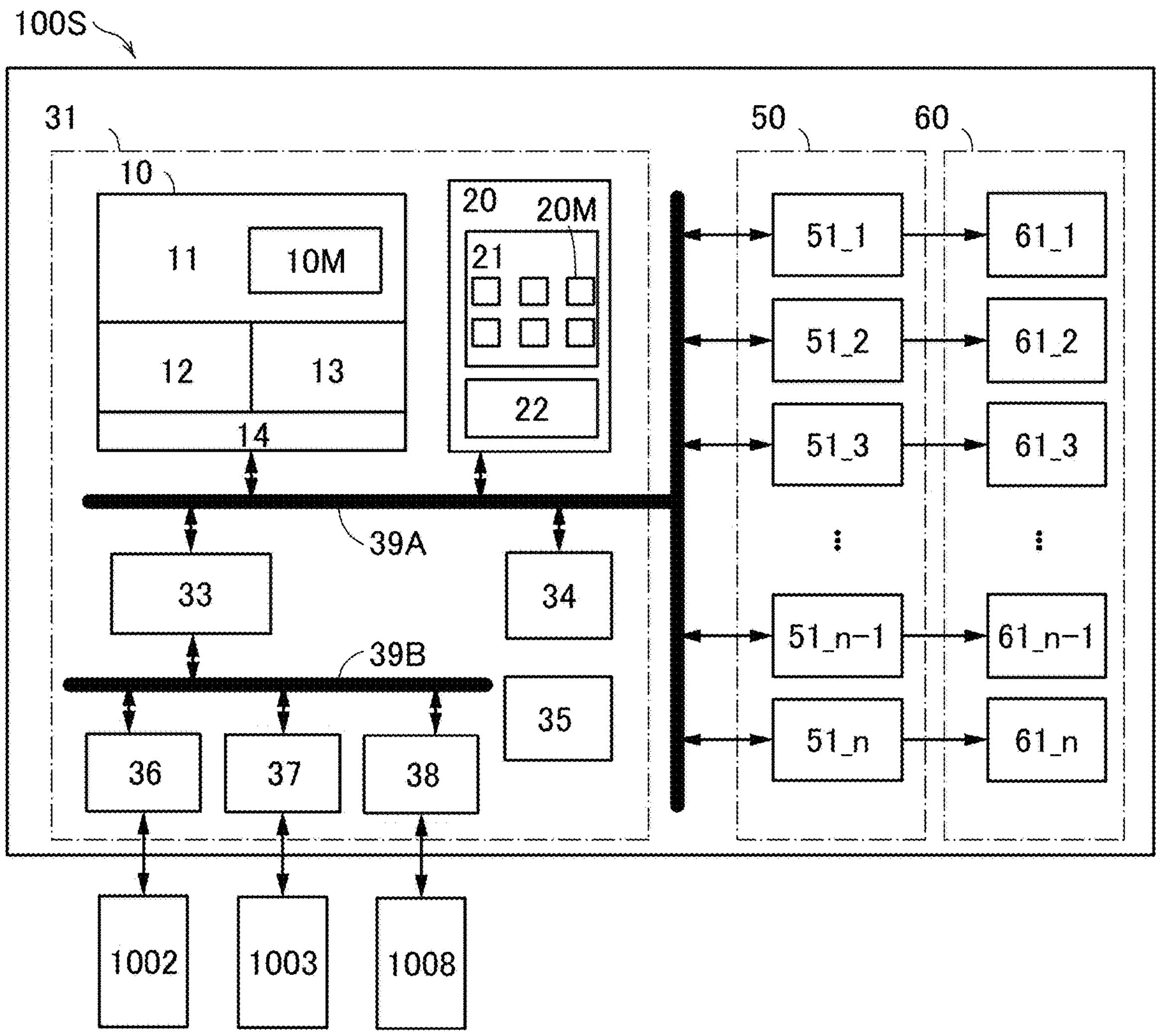
FIG. 8 is a diagram illustrating a configuration example of a semiconductor device.

FIG. 7 and FIG. 8 are block diagrams each illustrating a configuration example of the logic circuit portion 31 included in the semiconductor device 100. The logic circuit portion 31 illustrated in FIG. 7 includes, for example, the arithmetic device 10, a memory device 20, a bridge circuit 33, a power management unit (PMU) 34, a power supply circuit 35, a sensor control circuit 36, and a battery control circuit 37.

The arithmetic device 10 includes a CPU core 11, an L1 cache memory device 12, an L2 cache memory device 13, and a bus interface portion 14, for example. The L1 cache memory device 12 is referred to as an instruction cache in some cases. The L2 cache memory device 13 is referred to as a data cache in some cases.

Note that the arithmetic device 10 corresponds to a circuit that processes the image data, such as a CPU (Central Processing Unit). The arithmetic device 10 is referred to as a CPU, a processor device, or the like in some cases.

The CPU core 11 includes a plurality of CPU cores. The CPU cores include a backup circuit 10M electrically connected to a scan flip-flop. The L1 cache memory device 12 has a function of temporarily storing an instruction to be executed by the CPU core 11. The L2 cache memory device 13 has a function of temporarily storing data to be processed by the CPU core 11 or data obtained by the processing. The bus interface portion 14 has a circuit configuration that can transmit and receive signals such as data or an address between the arithmetic device 10 and a bus for connecting the arithmetic device 10 to other circuits in the semiconductor device 100.

Note that the scan flip-flop in the arithmetic device 10 is composed of a circuit including a Si transistor, that is, a Si CMOS. Meanwhile, the backup circuit 10M includes an OS transistor. The backup circuit 10M including the OS transistor can function as an OS memory having a function of retaining electric charge for a long time when the OS transistor is turned off.

The scan flip-flop has a function of retaining data included in the arithmetic device 10 and sequentially outputting the data in accordance with a clock signal or the like. The scan flip-flop is configured to be electrically connected to the backup circuit 10M. With this configuration, data included in the scan flip-flop can be output (backed up) to the backup circuit 10M, and data retained in the backup circuit 10M can be input (recovered) to the scan flip-flop. Thus, the semiconductor device 100 can significantly reduce sleep power (electric power in a non-display period) when the electronic device 1000 is brought into a sleep state; thus, the convenience of the semiconductor device 100 can be increased even when the capacity of the battery is small.

A metal oxide has a band gap of 2.5 eV or wider; thus, an OS transistor has an extremely low off-state current. For example, the off-state current per micrometer in channel width at a source-drain voltage of 3.5 V and room temperature (25° C.) can be lower than $1\times10^{-20}$ A, lower than $1\times10^{-22}$ A, or lower than $1\times10^{-24}$ A. Therefore, in an OS memory, the amount of electric charge that leaks from a retention node through the OS transistor is extremely small. Accordingly, the OS memory can function as a nonvolatile memory circuit; thus, power gating of the arithmetic device 10 is enabled.

A highly integrated semiconductor device generates heat due to circuit drive in some cases. This heat makes the temperature of a transistor rise to change the characteristics of the transistor, and the field-effect mobility thereof might change or the operation frequency thereof might decrease, for example. Since an OS transistor has higher heat resistance than a Si transistor, a change in field-effect mobility and a decrease in operating frequency due to a temperature change do not easily occur. Even when having a high temperature, an OS transistor is likely to keep a property of the drain current increasing exponentially with respect to the gate source voltage. Thus, the use of an OS transistor enables a stable operation in a high-temperature environment.

A metal oxide used for an OS transistor is an In oxide, a Zn oxide, a Zn—Sn oxide, a Ga—Sn oxide, an In—Ga oxide, an In—Zn oxide, an In-M-Zn oxide (Mis Ti, Ga, Y, Zr, La, Ce, Nd, Sn, or Hf), or the like. The use of a metal oxide containing Ga as M for the OS transistor is particularly preferable because the electrical characteristics such as field-effect mobility of the transistor can be made excellent by adjusting a ratio of elements. In addition, an oxide containing indium and zinc may contain one or more kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like.

As described above, the arithmetic device 10 can retain data owing to the backup circuit 10M, which is an OS memory, even when supply of power supply voltage is stopped. Thus, the power gating of the arithmetic device 10 can be performed and power consumption can be reduced greatly. The backup circuit 10M, which is an OS memory, can be provided to be stacked with a circuit which is included in the CPU core 11 and which is composed of a Si transistor, such as a scan flip-flop. Consequently, the backup circuit 10M can be provided without increasing in the circuit area.

The memory device 20 functions as an on-chip memory. The on-chip memory is a memory device for storing data or a program to be input to and output from the circuit included in the semiconductor device 100, such as the arithmetic device 10.

The memory device 20 includes a memory cell array 21 and a peripheral circuit 22. The memory cell array 21 includes memory cells 20M. As a circuit that can be used for the memory cell 20M, a memory including an OS transistor, such as a DOSRAM or a NOSRAM, as well as a memory including a Si transistor, such as an SRAM (Static RAM) or a DRAM (Dynamic RAM) can be used. A DOSRAM (registered trademark) is an abbreviation of "Dynamic Oxide Semiconductor RAM", which indicates a RAM including 1T (transistor) 1C (capacitor)-type memory cells. The DOSRAM, as well as the NOSRAM, is a memory utilizing a low off-state current of an OS transistor.

The DOSRAM is a DRAM formed using an OS transistor and is a memory that temporarily stores information transmitted from the outside. When the DOSRAM is employed, in the memory device 20, the memory cell 20M including an OS transistor and the peripheral circuit 22 including a Si transistor (a transistor containing silicon in a channel formation region) can be provided in different layers stacked; thus, the entire circuit area can be reduced with the DOSRAM. Furthermore, the DOSRAMs can be efficiently placed, with a memory cell array being finely divided. The DOSRAMs can be stacked when including OS transistors that are provided in a plurality of layers.

A bus 39A is a bus for transmitting and receiving various signals between the arithmetic device 10, the memory device 20, and the PMU 34 at high speed. As an example, an AMBA (Advanced Microcontroller Bus Architecture)—AHB (Advanced High-performance Bus) can be used as a bus. The bus 39A is also a bus for transmitting and receiving various signals at high speed between the plurality of driver circuit portions 51_1 to 51_*n* included in the display control portion 50. Note that a circuit connected to the bus 39A included in the logic circuit portion 31 may include an accelerator, a memory controller, a direct memory access controller, an interface circuit, or the like.

The PMU 34 has a circuit configuration for controlling power gating of a circuit such as the CPU core 11 of the arithmetic device 10 included in the semiconductor device 100.

The power supply circuit 35 is a circuit for generating voltage used in the semiconductor device 100.

A bus 39B is a bus for transmitting and receiving various signals at low speed between the sensor control circuit 36 and the battery control circuit 37. As an example, an AMBA-APB (Advanced Peripheral Bus) can be used as the bus. Transmission and reception of various signals between the bus 39A and the bus 39B are performed through the bridge circuit 33. Note that a circuit connected to the bus 39B included in the logic circuit portion 31 may include an interrupt control circuit, an accelerator, an interface circuit, a timer circuit, a watch dog circuit, or the like.

The sensor control circuit 36 has a circuit configuration for transmitting and receiving data related to charging and discharging of a sensor 1002 outside the semiconductor device 100. The sensor control circuit 36 supplies power necessary for the sensor 1002. The sensor control circuit 36 receives input from the sensor 1002 and converts the input into a control signal and outputs the control signal to the arithmetic device 10 through the bus 39B or the like. In the sensor control circuit 36, error management of the sensor 1002 or correction processing of the sensor control circuit 36 may be performed. Note that the sensor control circuit 36 may include a plurality of control circuits for controlling the sensor 1002.

The sensor 1002 has a function of obtaining information on one or more of the senses of sight, hearing, touch, taste, and smell of a human. Specifically, the sensor 1002 has at least one of functions of sensing or measuring force, displacement, position, speed, acceleration, angular velocity, rotational frequency, distance, light, magnetism, temperature, sound, time, electric field, current, voltage, electric power, radiation, humidity, gradient, oscillation, a smell, and infrared rays. As the sensor 1002, a sensor such as an imaging element, a gyroscope sensor, or an acceleration sensor or a sensor that measures a heart rate, a surface temperature, a blood oxygen concentration, or the like by touch on part of a human body can be used, for example. When a sensor such as a three-axis gyroscope sensor or an acceleration sensor is mounted, a state such as an orientation, motion, or the like of the electronic device 1000 can be detected. The on/off state of a function of the electronic device 1000 can be switched in accordance with the state of the electronic device 1000, so that power consumption can be reduced.

The battery control circuit 37 can manage the charging and discharging state of a battery 1003 outside the semiconductor device 100. The battery control circuit 37 may include a power converter or an inverter having a plurality of channels, a protection circuit, or the like. The battery control circuit 37 supplies power from the battery 1003 to the power supply circuit 35, and components are supplied with power from the power supply circuit 35 through a power supply line (not illustrated). The battery control circuit 37 has a function of receiving power supplied from the outside and charging the battery 1003. The battery control circuit 37 can control the charging operation of the battery 1003 in accordance with the charging state of the battery 1003.

The battery control circuit 37 preferably has a function of reducing power consumption. Examples of the function of reducing power consumption include, when no input of data or the like to the semiconductor device 100 is detected for a given time, lowering the clock frequency of a clock signal generation circuit (not illustrated) that supplies a clock signal to the arithmetic device 10 or stopping input of a clock signal, stopping the operation of the arithmetic device 10 itself, stopping the operation of the memory device 20, and reducing power supply to the components. Such a function can be performed either with the battery control circuit 37 alone or with the battery control circuit 37 in conjunction with the arithmetic device 10.

As the battery 1003, a secondary battery such as a lithium-ion battery, a solar battery, or the like can be used, for example. The battery 1003 may be provided with a protection circuit for preventing overcharging, overdischarging, and the like of the battery 1003. A battery is referred to as a power storage device in some cases. A solar battery is referred to as a photoelectric conversion device in some cases. The battery 1003 may have flexibility, that is, the battery 1003 may be a flexible battery. When the battery 1003 has flexibility, the degree of freedom in design of the electronic device can be increased.

Although not illustrated in FIG. 7, the semiconductor device 100 may include a control circuit corresponding to the operation of the operation portion 1004. In addition to the operation portion 1004, when the semiconductor device 100 is connected to a touch panel, the touch panel may include a control circuit like the operation portion.

Although not illustrated in FIG. 7, the semiconductor device 100 may include a module (also referred to as a communication module) having a function of communicating with the outside. The communication module is provided with a high frequency circuit (RF circuit), for example, to transmit and receive an RF signal. The high frequency circuit is a circuit for performing mutual conversion between an electromagnetic signal and an electrical signal in a frequency band that is set by national laws to perform wireless communication with another communication apparatus using the electromagnetic signal. Several tens of kilohertz to several tens of gigahertz are a practical frequency band that is generally used. A structure can be employed in which the high frequency circuit connected to an antenna includes a high frequency circuit portion compatible with a plurality of frequency bands and the high frequency circuit portion includes an amplifier, a mixer, a filter, a DSP, an RF transceiver, or the like. In the case of performing wireless communication, it is possible to use, as a communication protocol or a communication technology, a communications standard defined by the 3GPP (Third Generation Partnership Project) (registered trademark), such as standard compatible with LTE (Long Term Evolution) (registered trademark), LTE-Advanced compatible with the fourth-generation mobile communication system, the fifth-generation mobile communication system (5G), or the sixth-generation mobile communication system (6G), a communications standard defined by IEEE (Institute of Electrical and Electronics Engineers) (registered trademark), such as Wi-Fi (registered trademark) or Bluetooth (registered trademark), or the like.

FIG. 8 is a diagram illustrating a modification example of the block diagram of the semiconductor device 100 illustrated in FIG. 7. In a block diagram of a semiconductor device 100S illustrated in FIG. 8, in addition to the structure of the semiconductor device 100 illustrated in FIG. 7, a structure including a solar battery 1008 and a control circuit 38 for converting power obtained by the solar battery 1008 are illustrated.

As the solar battery 1008, for example, a silicon solar battery using crystalline silicon for a photoelectric conversion layer or a solar battery with a tandem structure of a silicon solar battery and a perovskite type solar battery can be used. As the 1008 solar battery, for example, an amorphous silicon solar battery, a CIGS (Cu—In—Ga—Se) type solar battery, an organic solar battery, or a perovskite type solar battery can be used. The organic solar battery or a perovskite solar battery has a high light-transmitting property and thus can be provided to overlap with the display portion 60.

The control circuit 38 has a function of sensing the power generation state or the like of the solar battery 1008. The control circuit 38 can control whether the generated power is used as power for driving the semiconductor device 100 or for charging the battery 1003 in accordance with the power generation state.

When the electronic device 1000 includes the solar battery, the usage time of the battery can be extended; thus, the semiconductor device and the electronic device including the semiconductor device can be more convenient.

Next, structure examples of the element layers provided with the semiconductor device 100 are described with reference to FIG. 9A to FIG. 10B.

Figure 9A:
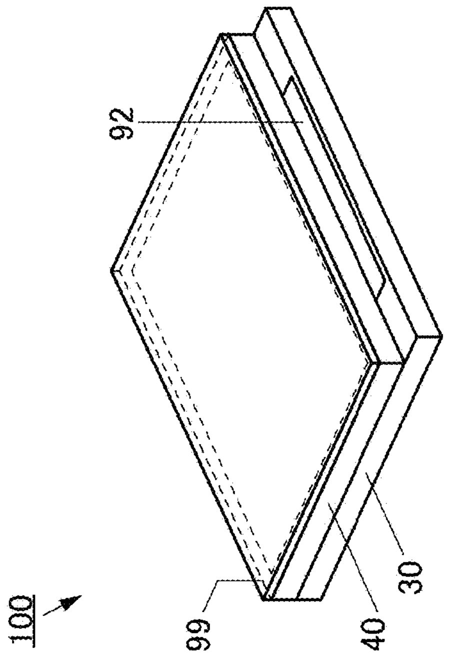
FIG. 9A to FIG. 9C are diagrams each illustrating a structure example of a semiconductor device.

The semiconductor device 100 illustrated in FIG. 9A includes the element layer 40 over the element layer 30 and a sealing substrate 99 over the element layer 40. An element layer 90 (not illustrated) is provided between the sealing substrate 99 and the element layer 40. The semiconductor device 100 illustrated in FIG. 9B is illustrated such that the element layer 30, the element layer 40, the element layer 90, the sealing substrate 99, and the like illustrated in FIG. 9A are separated from one another.

Figure 9B:
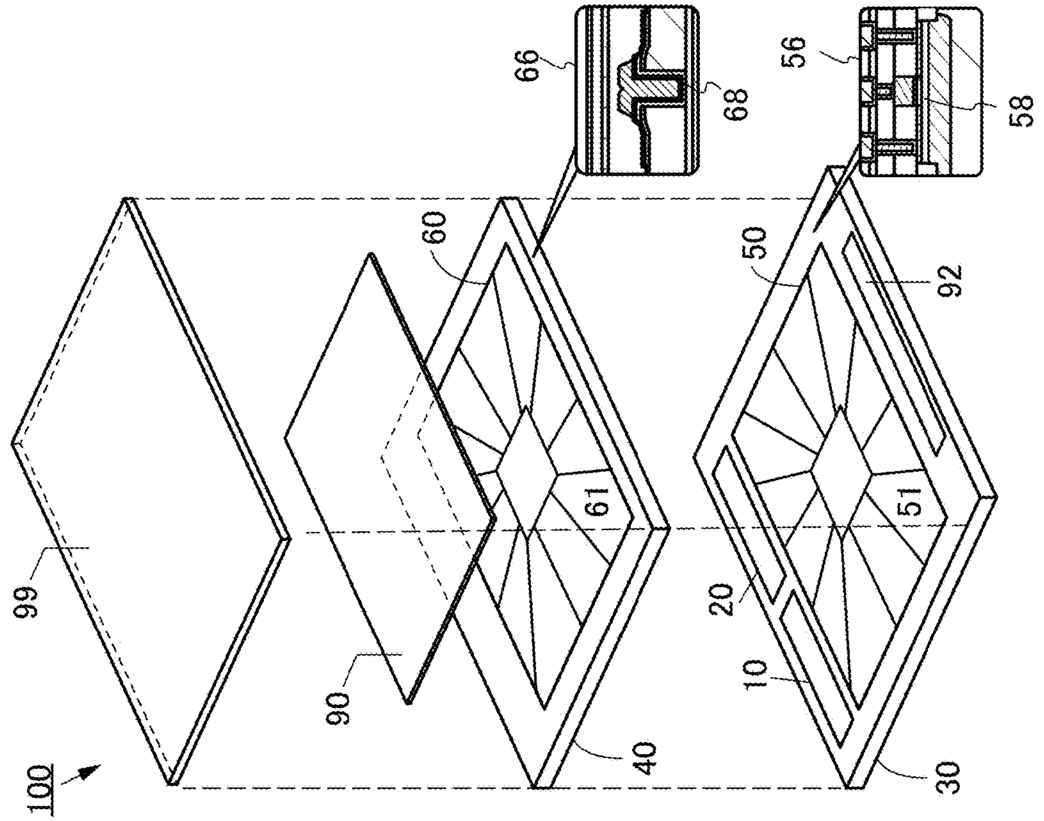
Figure 9C:
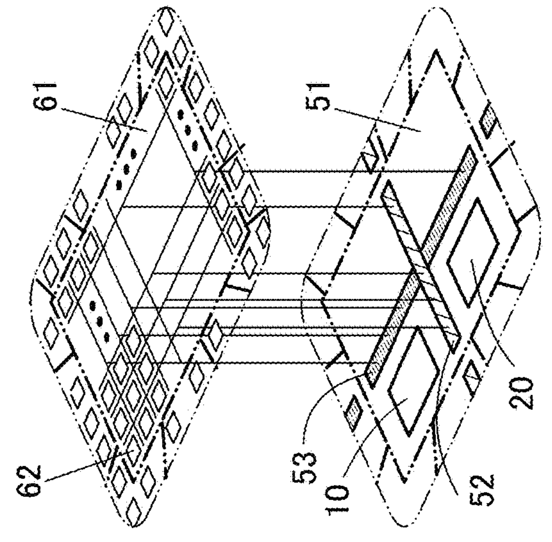

As illustrated in FIG. 9A and FIG. 9B, the element layer 30 includes a terminal portion 92. As illustrated in FIG. 9B, the element layer 30 includes the arithmetic device 10, the memory device 20, and the display control portion 50 in a region overlapping with the element layer 40. The display control portion 50 includes the plurality of driver circuit portions 51 each provided with the driver circuits.

An FPC (Flexible printed circuits) or the like is electrically connected to the terminal portion 92. Thus. The element layer 40 and the sealing substrate 99 are not formed in a region overlapping with the terminal portion 92.

Although the arithmetic device 10 and the memory device 20 are illustrated as the logic circuit portion 31 included in the element layer 30 in FIG. 1B, other structures may be employed. For example, another structure illustrated in FIG. 1A may be included, or any other structures may be included.

The element layer 90 includes a light-emitting device (not illustrated) such as an organic EL element. Light emission of the light-emitting device is controlled by the pixel circuit included in a subpixel for performing color display. Thus, the element layer 90 can also be regarded as part of the display portion 60.

In this specification and the like, the term "element" can be replaced with the term "device" in some cases. For example, a display element and a light-emitting element can be rephrased as a display device and a light-emitting device, respectively.

As described above, the element layer 30 includes a transistor 56 containing silicon in a semiconductor layer 58 including a channel formation region. When the arithmetic device 10, the memory device 20, and the display control portion 50 are provided in the same element layer 30, wirings electrically connecting the arithmetic device 10, the memory device 20, and the display control portion 50 can be shortened. Thus, the charging and discharging time of the wirings for transmitting a control signal that allows the arithmetic device 10 to control the display control portion 50 can be shortened, so that power consumption can be reduced.

As described above, the element layer 40 includes a transistor 66 containing a metal oxide in a semiconductor layer 68 including a channel formation region. When an OS transistor is used as the transistor included in the pixel circuit provided in the display portion 60, a potential corresponding to a signal of the image data can be retained in the pixel circuit; thus, a still image can be displayed without updating the image data.

Note that the arithmetic device 10 and the memory device 20 may be placed in the display control portion 50. For example, in the driver circuit portion 51 included in the display control portion 50, the arithmetic device 10 and the memory device 20 may be provided to be dispersed in regions other than the driver circuit 52 and the driver circuit 53 (see FIG. 9C). With this structure, circuit arrangement can be efficiently performed using extra space in the case where the area of the driver circuit portion 51 provided with the driver circuit 52 and the driver circuit 53 is larger than the area where the driver circuits 52 and 53 are provided.

Figure 10A:
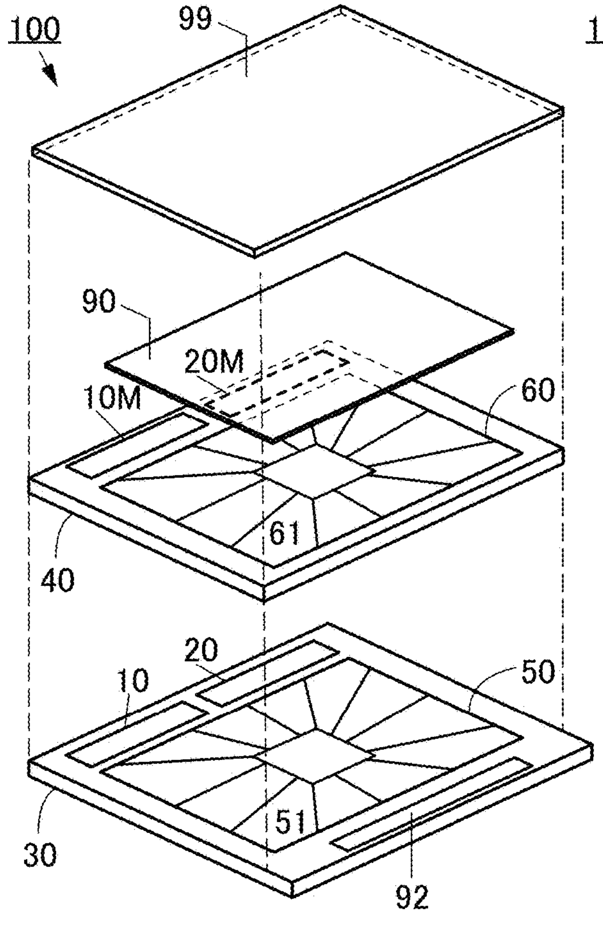
FIG. 10A and FIG. 10B are diagrams each illustrating a structure example of a semiconductor device.

In the element layer 40, the backup circuit 10M included in the arithmetic device 10 and the memory cell 20M included in the memory device 20 are preferably provided. That is, the transistors provided in the same element layer as the pixel circuit 62 are used in the backup circuit 10M and the memory cell 20M. The backup circuit 10M and the memory cell 20M provided in the element layer 40 are preferably provided at positions overlapping with the arithmetic device 10 and the memory device 20 provided in the element layer 30, respectively, as illustrated in FIG. 10A.

With this structure, the backup circuit 10M can be placed directly over the scan flip-flop included in the arithmetic device 10. Thus, a wiring for electrically connecting the scan flip-flop and the backup circuit 10M can be shortened. Thus, the wiring resistance and the parasitic capacitance can be lowered, and the operation speed of the semiconductor device 100 can be increased. The semiconductor device 100 is reduced in power consumption.

Note that when the backup circuit 10M included in the arithmetic device 10 and the memory cell 20M included in the memory device 20 are placed in a peripheral portion of the display portion 60, the semiconductor device 100 can be provided in a region of the electronic device 1000 covered with the housing 1001, for example. Accordingly, the backup circuit 10M included in the arithmetic device 10 and the memory cell 20M included in the memory device 20 can be placed utilizing a region of the element layer 40 where the display portion 60 is not placed; thus, the backup circuit 10M and the memory cell 20M can be placed without reducing the display quality of the display portion 60.

Figure 10B:
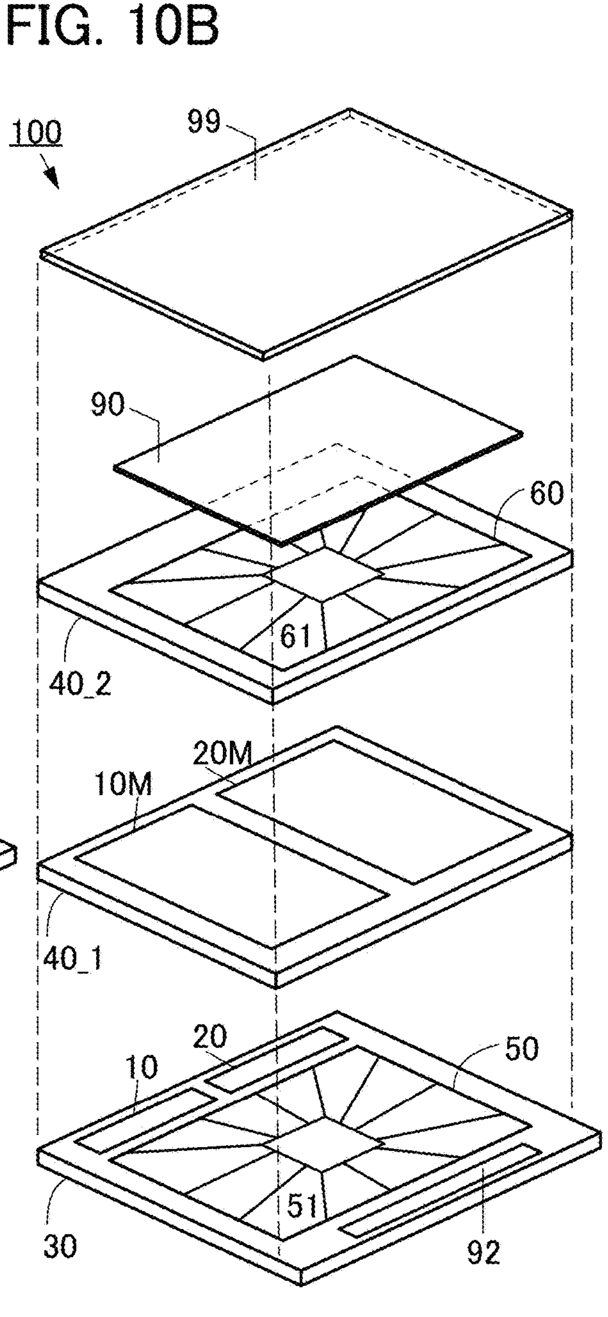

Note that the element layer 40 including the transistor 66 may be a plurality of element layers such as element layers 40_1 and 40_2 as illustrated in FIG. 10B, for example. With this structure, element layers including transistors having different transistor characteristics can be stacked using the element layer 40_1 and the element layer 40_2. In addition, element layers including transistors having different transistor shapes can be stacked using the element layer 40_1 and the element layer 40_2. Furthermore, element layers including transistors having different transistor sizes, i.e., a channel length and a channel width, can be stacked using the element layer 40_1 and the element layer 40_2.

In FIG. 10B, the backup circuit 10M included in the arithmetic device 10 and the memory cell 20M included in the memory device 20 are provided in the element layer 40_1 over the element layer 30, and the pixel circuits, i.e., the display portion 60 including the display regions 61, are provided in the element layer 40_2 below the element layer 90. In this case, the element layer 40_1 can be an element layer including transistors having higher driving frequencies to improve the performance of the backup circuit 10M and the memory cell 20M, and the element layer 40_2 can be an element layer including transistors having high withstand voltage to improve the performance of the pixel circuits. Thus, the semiconductor device 100 can be a semiconductor device that can achieve higher performance.

Modification Example of Electronic Device

Modification examples of the electronic device will be described.

Figure 11A:
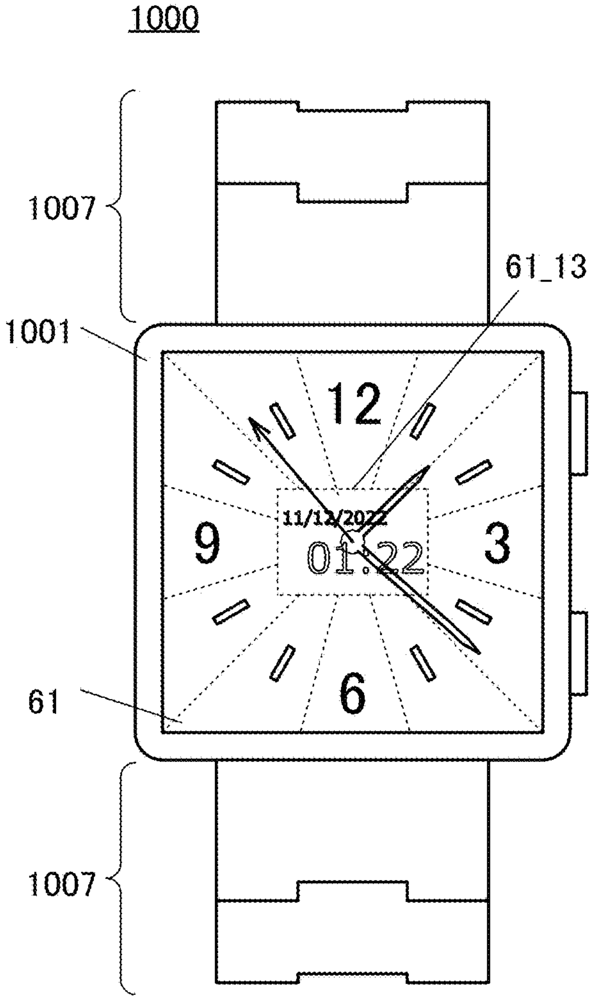
FIG. 11A and FIG. 11B are diagrams each illustrating a structure example of a semiconductor device.

FIG. 11A illustrates a structure different from the design of the display portion 60 illustrated in FIG. 4A. FIG. 11A illustrates a structure in which a digital watch is displayed on the display region 61_13 of the display portion 60 as well as the dial of the analog watch illustrated in FIG. 4A is displayed.

In the above-described structure, in the case where the display portion 60 is divided into 13 display regions as illustrated in FIG. 2A and FIG. 2B, the driver circuit portion 51_13 is not stopped by the update of image data in the middle display region 61_13. Thus, it is possible to perform highly convenient display by displaying the digital watch. Note that in addition to the digital watch, the middle display region 61_13 may also have a date display function (calendar), an age of the moon display function (moon phase), a power reserve display, or the like.

Figure 11B:
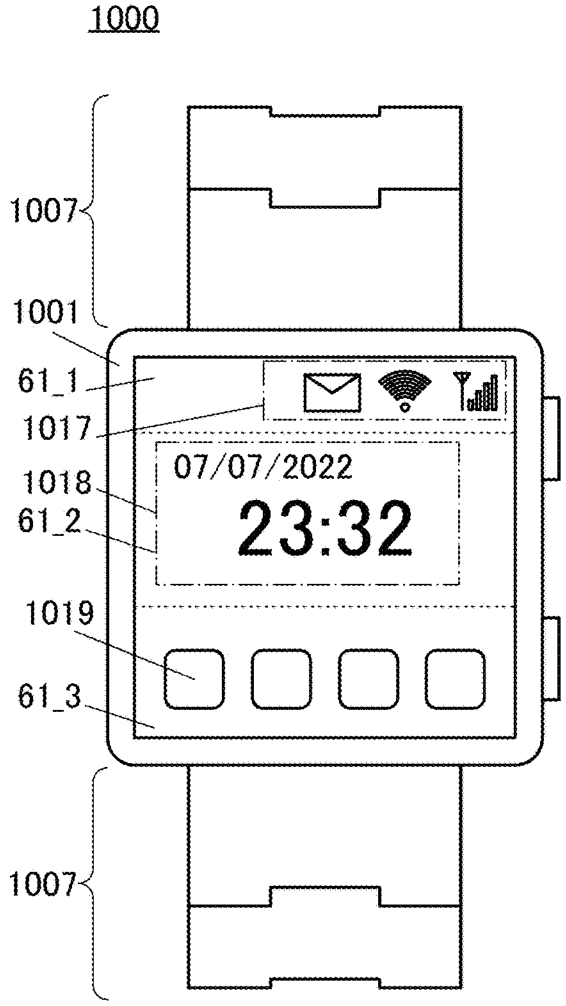

Note that the division of the display regions 61 in the display portion 60 is not limited to the 13 display regions corresponding to the dial of the analog watch illustrated in FIG. 4A. For example, in the case where a notification information 1017, date and time information 1018, and a plurality of icons 1019 are displayed as illustrated in FIG. 11B, the display region 61 can be divided into three regions of the display regions 61_1 to 61_3 in the display portion 60.

Configuration Example of Pixel Circuit

Figure 12A:
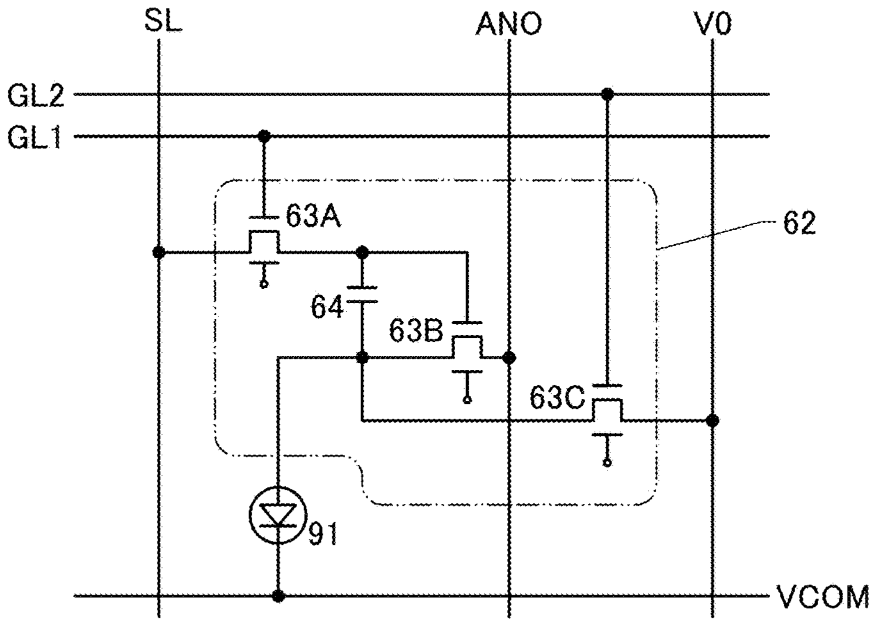
FIG. 12A and FIG. 12B are circuit diagrams illustrating a configuration example of a pixel circuit.
Figure 12B:
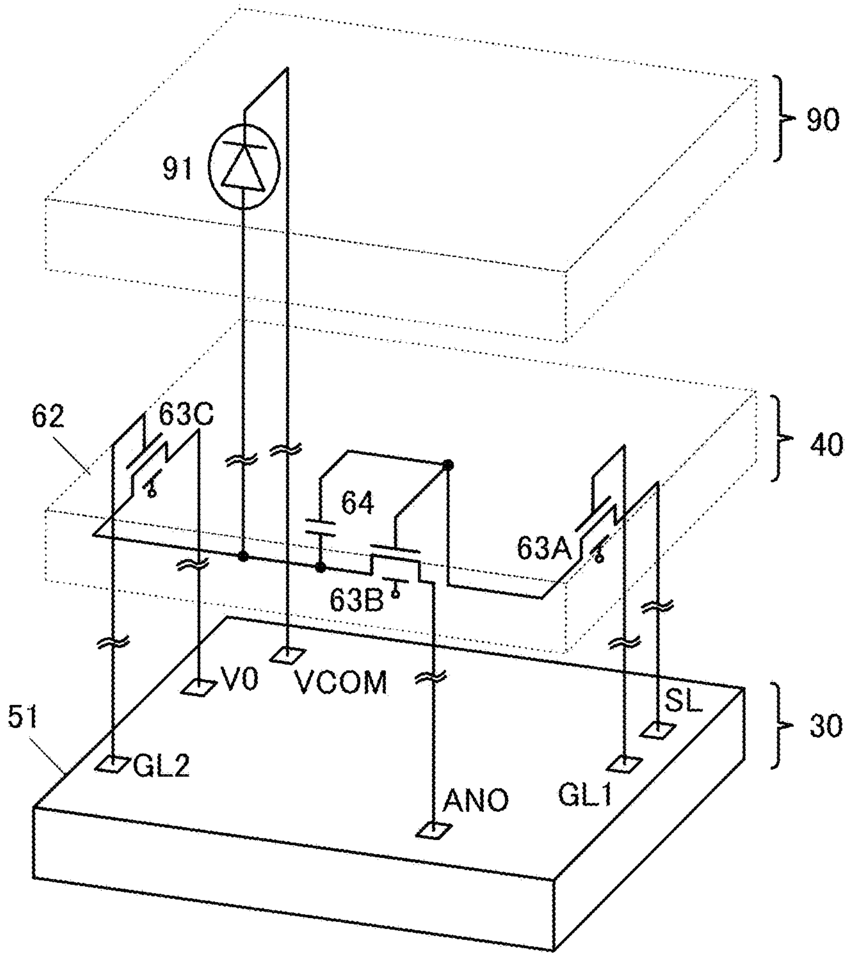

FIG. 12A and FIG. 12B illustrate a configuration example of the pixel circuit 62 and a light-emitting device 91 connected to the pixel circuit 62. FIG. 12A is a diagram illustrating the connection between elements, and FIG. 12B is a diagram schematically illustrating the vertical positional relation of the element layer 30 including the driver circuits 52 and 53, the element layer 40 including the pixel circuit 62, and the element layer 90 including the light-emitting device 91.

The pixel circuit 62 illustrated as an example in FIG. 12A and FIG. 12B includes a transistor 63A, a transistor 63B, a transistor 63C, and a capacitor 64. The transistor 63A, the transistor 63B, and the transistor 63C can be OS transistors. Each of the OS transistors, the transistor 63A, the transistor 63B, and the transistor 63C, preferably includes a back gate electrode, in which case a structure in which the back gate electrode is supplied with the same signal as that supplied to a gate electrode or a structure in which the back gate electrode is supplied with a signal different from that supplied to the gate electrode can be used.

The transistor 63B includes a gate electrode electrically connected to the transistor 63A, a first electrode electrically connected to the light-emitting device 91, and a second electrode electrically connected to a wiring ANO. The wiring ANO is a wiring for supplying a potential for supplying current to the light-emitting device 91.

The transistor 63A includes a first terminal electrically connected to the gate electrode of the transistor 63B, a second terminal electrically connected to a wiring SL which functions as a source line, and the gate electrode having a function of controlling the conduction state or non-conduction state on the basis of the potential of a wiring GL1 which functions as a gate line.

The transistor 63C includes a first terminal electrically connected to a wiring V0, a second terminal electrically connected to the light-emitting device 91, and the gate electrode having a function of controlling the conducting state or the non-conducting state on the basis of the potential of a wiring GL2 functioning as a gate line. The wiring V0 is a wiring for supplying a reference potential and a wiring for outputting current flowing through the pixel circuit 62 to the driver circuit portion 51.

The capacitor 64 includes a conductive film electrically connected to the gate electrode of the transistor 63B and a conductive film electrically connected to a second electrode of the transistor 63C.

The light-emitting device 91 includes a first electrode electrically connected to the first electrode of the transistor 63B and a second electrode electrically connected to a wiring VCOM. The wiring VCOM is a wiring for supplying a potential for supplying current to the light-emitting device 91.

Accordingly, the intensity of light emitted from the light-emitting device 91 can be controlled in accordance with an image signal supplied to the gate electrode of the transistor 63B. Furthermore, variations in the gate-source voltage of the transistor 63B can be inhibited by the reference potential of the wiring V0 supplied through the transistor 63C.

A current value that can be used for setting pixel parameters can be output from the wiring V0. Specifically, the wiring V0 can function as a monitor line for outputting current flowing through the transistor 63B or current flowing through the light-emitting device 91 to the outside. Current output to the wiring V0 is converted into voltage by a source follower circuit or the like and output to the outside. Alternatively, the current output to the wiring V0 can be converted into a digital signal by an A-D converter or the like and output to the arithmetic device 10 or the like.

The light-emitting device described in one embodiment of the present invention refers to a self-luminous display element such as an organic EL element (also referred to as an OLED (Organic Light Emitting Diode)). Note that the light-emitting device electrically connected to the pixel circuit can be a self-luminous light-emitting device such as an LED (Light Emitting Diode), a micro LED, a QLED (Quantum-dot Light Emitting Diode), or a semiconductor laser.

Note that in the structure illustrated as an example in FIG. 12B, the wirings electrically connecting the pixel circuit 62 and the driver circuit portion 51 can be shortened, so that wiring resistance of the wirings can be reduced. Thus, data can be written at high speed, which enables high-speed driving of the display portion 60. Accordingly, even when the number of pixel circuits 62 included in the display portion 60 is large, a sufficient frame period can be ensured, thereby increasing the pixel density of the display portion 60. In addition, the increased pixel density of the display portion 60 can increase the resolution of an image displayed on the display portion 60.

Although FIG. 12A and FIG. 12B illustrate, as an example, the pixel circuit 62 including three transistors in total, one embodiment of the present invention is not limited thereto. Structure examples and a driving method example of a pixel circuit which can be used for the pixel circuit 62 will be described below.

Figure 13A:
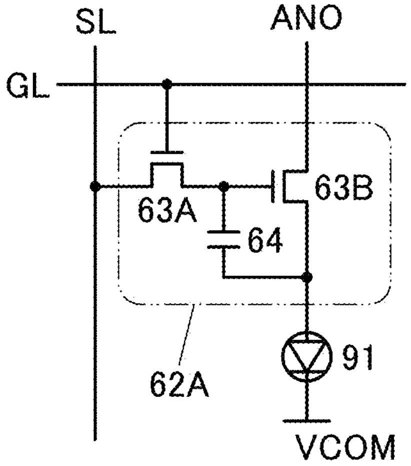
FIG. 13A to FIG. 13D are circuit diagrams illustrating configuration examples of pixel circuits.

A pixel circuit 62A illustrated in FIG. 13A includes the transistor 63A, the transistor 63B, and the capacitor 64. FIG. 13A illustrates the light-emitting device 91 connected to the pixel circuit 62A. The wiring SL, the wiring GL, the wiring ANO, and the wiring VCOM are electrically connected to the pixel circuit 62A. The pixel circuit 62A has a structure in which the transistor 63C is removed from the pixel circuit 62 illustrated in FIG. 12A and the wiring GL1 and the wiring GL2 are replaced with the wiring GL.

A gate of the transistor 63A is electrically connected to the wiring GL, one of a source and a drain of the transistor 63A is electrically connected to the wiring SL, and the other of the source and the drain of the transistor 63A is electrically connected to a gate of the transistor 63B and one electrode of a capacitor C1. One of a source and a drain of the transistor 63B is electrically connected to the wiring ANO and the other of the source and the drain of the transistor 63B is electrically connected to an anode of the light-emitting device 91. The other electrode of the capacitor C1 is electrically connected to the anode of the light-emitting device 91. A cathode of the light-emitting device 91 is electrically connected to the wiring VCOM.

Figure 13B:
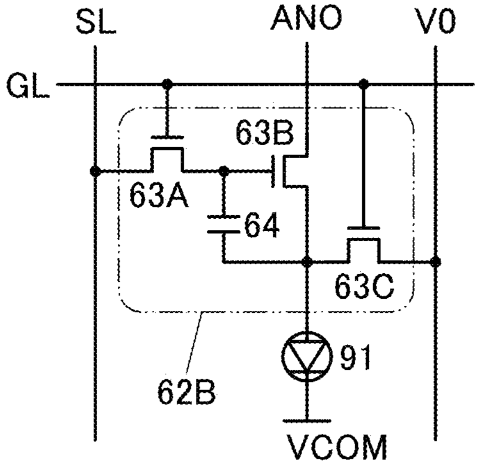

A pixel circuit 62B illustrated in FIG. 13B has a structure in which the transistor 63C is added to the pixel circuit 62A. In addition, the wiring V0 is electrically connected to the pixel circuit 62B.

Figure 13C:
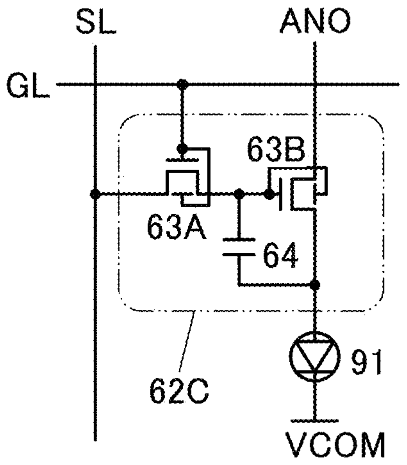
Figure 13D:
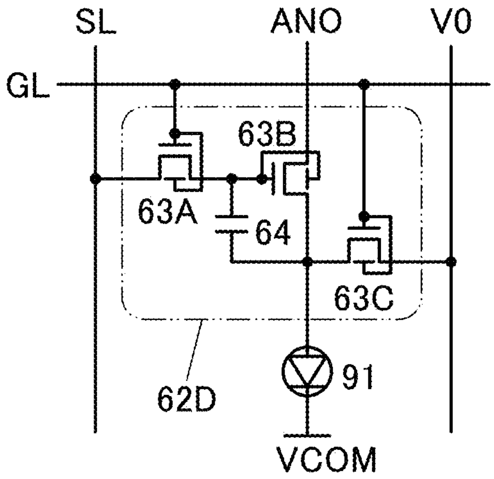

A pixel circuit 62C illustrated in FIG. 13C is an example of the case where a transistor in which a pair of gates are electrically connected to each other is used as each of the transistor 63A and the transistor 63B of the pixel circuit 62A. A pixel circuit 62D illustrated in FIG. 13D is an example of the case where such transistors are employed in the pixel circuit 62B. Thus, current that can flow through the transistors can be increased. Note that although a transistor in which a pair of gates are electrically connected to each other is used for each of the transistors here, one embodiment of the present invention is not limited thereto. A transistor that includes a pair of gates electrically connected to different wirings may be used. When, for example, a transistor in which one of the gates is electrically connected to the source is used, the reliability can be increased.

Figure 14A:
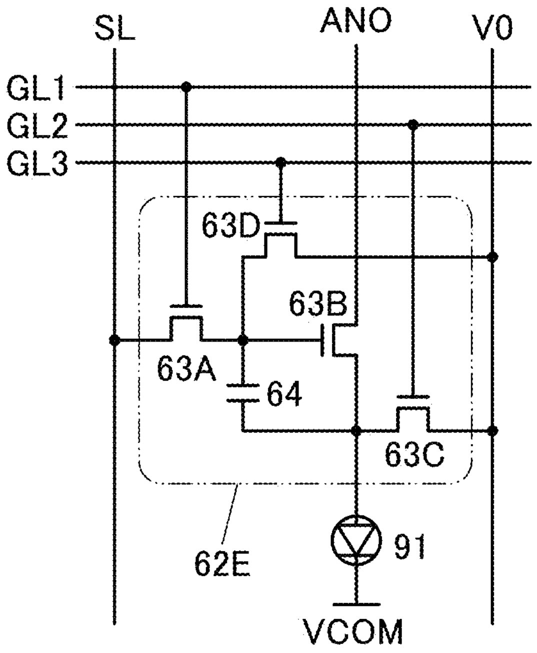
FIG. 14A to FIG. 14D are circuit diagrams illustrating configuration examples of pixel circuits.

A pixel circuit 62E illustrated in FIG. 14A has a structure in which a transistor 63D is added to 51B. The wiring GL1, the wiring GL2, and a wiring GL3 functioning as gate lines are electrically connected to the pixel circuit 62E. Note that in this embodiment and the like, the wiring GL1, the wiring GL2, and the wiring GL3 are sometimes collectively referred to as the wiring GL. Thus, the wiring GL may be one wiring or a plurality of wirings.

A gate of the transistor 63D is electrically connected to the wiring GL3, one of a source and a drain of the transistor 63D is electrically connected to the gate of the transistor 63B, and the other of the source and the drain of the transistor 63D is electrically connected to the wiring V0. The gate of the transistor 63A is electrically connected to the wiring GL1, and the gate of the transistor 63C is electrically connected to the wiring GL2.

When the transistor 63C and the transistor 63D are turned on at the same time, the source and the gate of the transistor 63B have the same potential, so that the transistor 63B can be turned off. Thus, current flowing to the light-emitting device 91 can be blocked forcibly. Such a pixel circuit is suitable for the case of using a display method in which a display period and a non-lighting period are alternately provided.

Figure 14B:
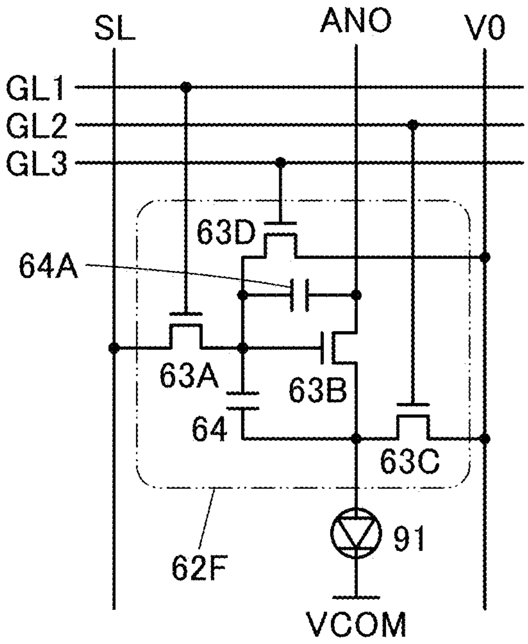

A pixel circuit 62F illustrated in FIG. 14B is an example where a capacitor 64A is added to the pixel circuit 62E. The capacitor 64A functions as a storage capacitor.

Figure 14C:
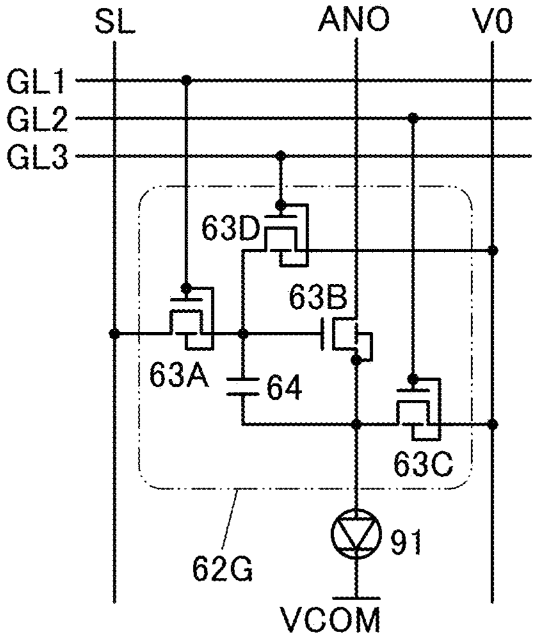
Figure 14D:
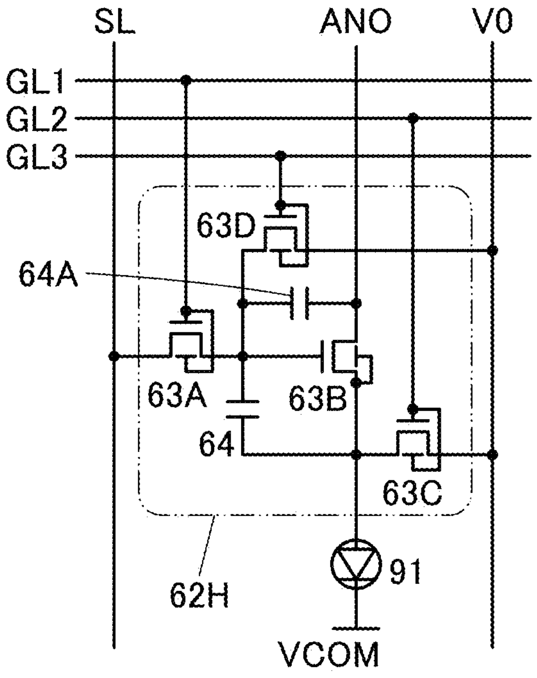

A pixel circuit 62G illustrated in FIG. 14C and a pixel circuit 62H illustrated in FIG. 14D are respectively examples of the cases where transistors each including a pair of gates are used in the pixel circuit 62E and the pixel circuit 62F. A transistor in which a pair of gates are electrically connected to each other is used as each of the transistor 63A, the transistor 63C, and the transistor 63D, and a transistor in which one of gates is electrically connected to a source is used as the transistor 63B.

Structure Example of Arithmetic Device

An example of the arithmetic device 10 including a CPU core capable of power gating will be described.

Figure 15:
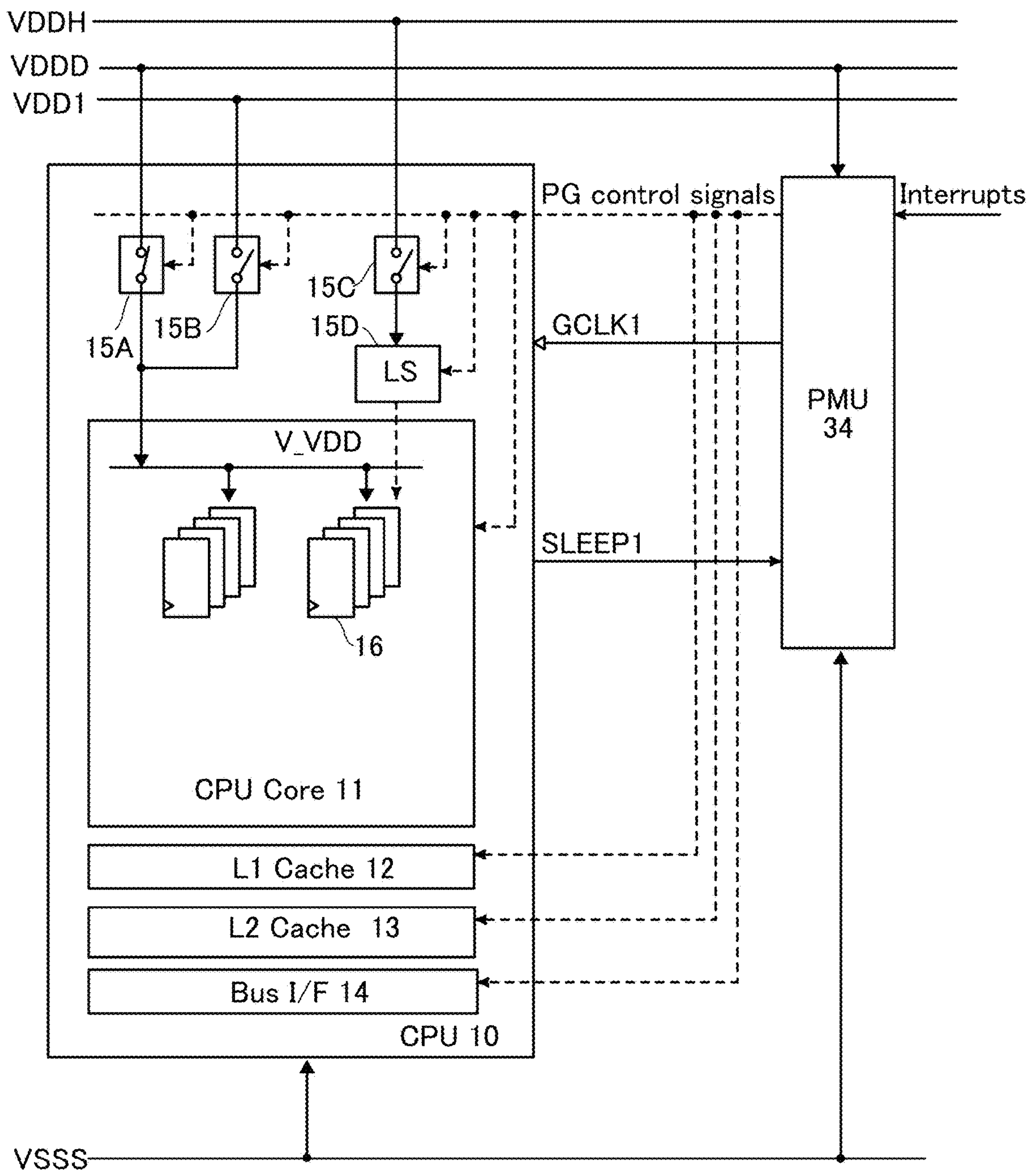
FIG. 15 is a block diagram illustrating a configuration example of an arithmetic device.

FIG. 15 illustrates a structure example of the arithmetic device 10. The arithmetic device 10 includes the CPU core 11, an L1 cache memory device (L1 Cache) 12, an L2 cache memory device (L2 Cache) 13, a bus interface portion (Bus I/F) 14, power switches 15A to 15C, and a level shifter (LS) 15D. The CPU core 11 includes a flip-flop 16.

Through the bus interface portion 14, the CPU core 11, the L1 cache memory device 12, and the L2 cache memory device 13 are mutually connected to one another.

The PMU 34 generates a clock signal GCLK1 and various PG (power gating) control signals in response to signals such as an interrupt signal (Interrupts) input from the outside and a signal SLEEP1 issued from the arithmetic device 10. The clock signal GCLK1 and the PG control signal are input to the arithmetic device 10. The PG control signal controls the power switches 15A to 15C and the flip-flop 16.

The power switches 15A and 15B control supply of voltages VDDD and VDD1 to a virtual power supply line V_VDD (hereinafter referred to as a V_VDD line), respectively. The power switch 15C controls supply of a voltage VDDH (high-level-side power supply voltage) to the level shifter (LS) 15D. A voltage VSSS is input to the arithmetic device 10 and the PMU 34 not through the power switches. The voltage VDDD is input to the PMU 34 not through the power switches.

The voltages VDDD and VDD1 are drive voltages for a CMOS circuit. The voltage VDD1 is lower than the voltage VDDD and is a drive voltage in a sleep state. The voltage VDDH is a drive voltage for an OS transistor and is higher than the voltage VDDD.

The L1 cache memory device 12, the L2 cache memory device 13, and the bus interface portion 14 each include at least one power domain capable of power gating. The power domain capable of power gating is provided with one or a plurality of power switches. These power switches are controlled by the PG control signal.

The flip-flop 16 is used for a register. The flip-flop 16 is provided with a backup circuit. The flip-flop 16 is described below.

Figure 16A:
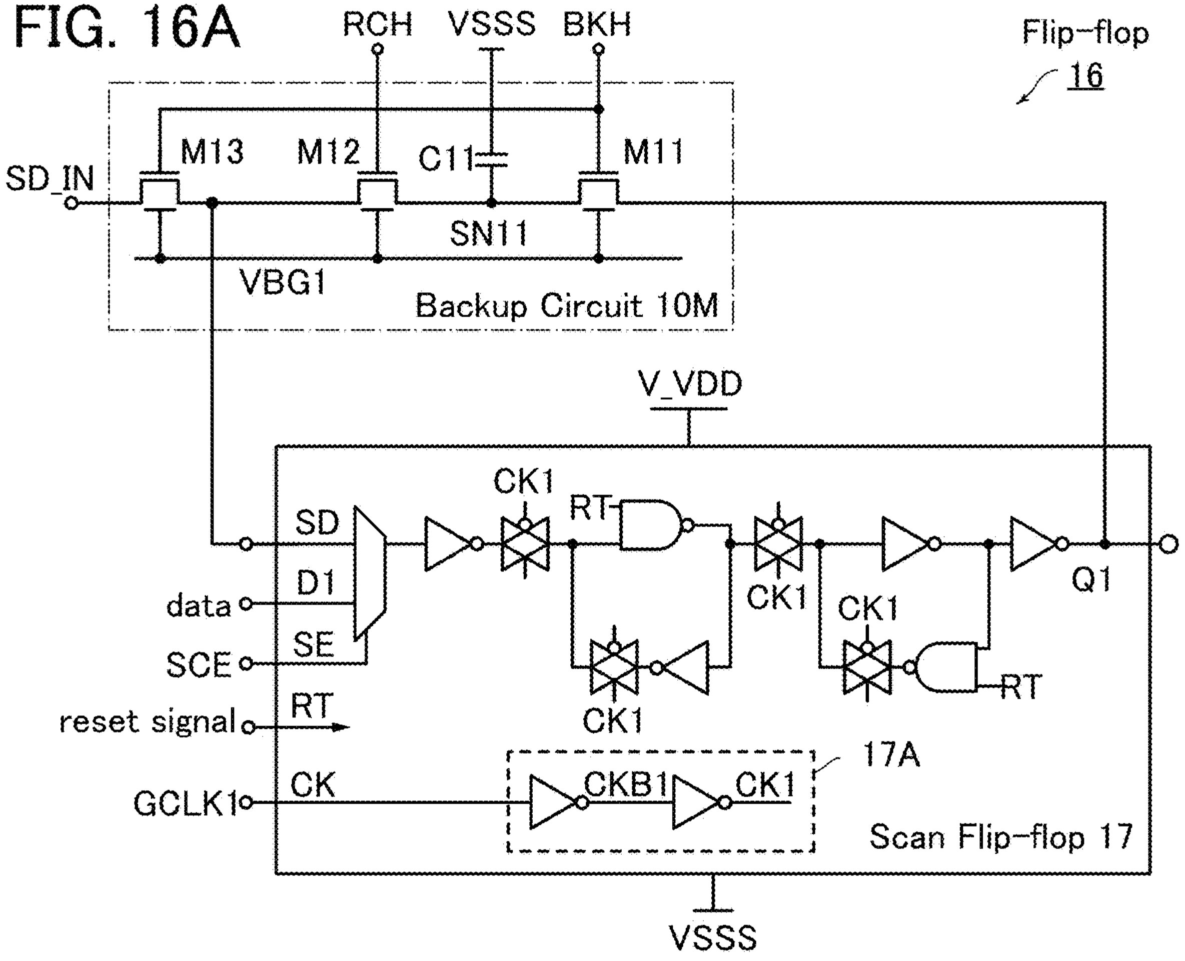
FIG. 16A and FIG. 16B are circuit diagrams illustrating configuration examples of an arithmetic device.

FIG. 16A shows a circuit configuration example of the flip-flop 16. The flip-flop 16 includes a scan flip-flop 17 and the backup circuit 10M.

The scan flip-flop 17 includes nodes D1, Q1, SD, SE, RT, and CK and a clock buffer circuit 17A.

The node D1 is a data input node, the node Q1 is a data output node, and the node SD is a scan test data input node. The node SE is a signal SCE input node. The node CK is a clock signal GCLK1 input node. The clock signal GCLK1 is input to the clock buffer circuit 17A. Analog switches in the scan flip-flop 17 are connected to nodes CK1 and CKB1 of the clock buffer circuit 17A. The node RT is a reset signal input node.

The signal SCE is a scan enable signal, which is generated in the PMU 34. The PMU 34 generates signals BK and RC. The level shifter 15D level-shifts the signals BK and RC to generate signals BKH and RCH. The signals BK and RC are a backup signal and a recovery signal.

The circuit configuration of the scan flip-flop 17 is not limited to that in FIG. 16A. A flip-flop prepared in a standard circuit library can be applied.

The backup circuit 10M includes nodes SD_IN and SN11, transistors M11 to M13, and a capacitor C11.

The node SD_IN is a scan test data input node and is connected to the node Q1 of the scan flip-flop 17. The node SN11 is a retention node of the backup circuit 10M. The capacitor C11 is a storage capacitor for retaining the voltage of the node SN11.

The transistor M11 controls continuity between the node Q1 and the node SN11. The transistor M12 controls continuity between the node SN11 and the node SD. The transistor M13 controls continuity between the node SD_IN and the node SD. The on/off of the transistors M11 and M13 is controlled by the signal BKH, and the on/off of the transistor M12 is controlled by the signal RCH.

The transistors M11 to M13 are OS transistors. The transistors M11 to M13 have back gates in the illustrated structure. The back gates of the transistors M11 to M13 are connected to a power supply line for supplying a voltage VBG1.

At least the transistors M11 and M12 are preferably OS transistors. Because of extremely low off-state current, which is a feature of the OS transistor, a decrease in the voltage of the node SN11 can be suppressed and almost no power is consumed to retain data; therefore, the backup circuit 10M has nonvolatile characteristics. Data is rewritten by charge and discharge of the capacitor C11; hence, there is theoretically no limitation on rewrite cycles of the backup circuit 10M, and data can be written and read with low energy.

Figure 16B:
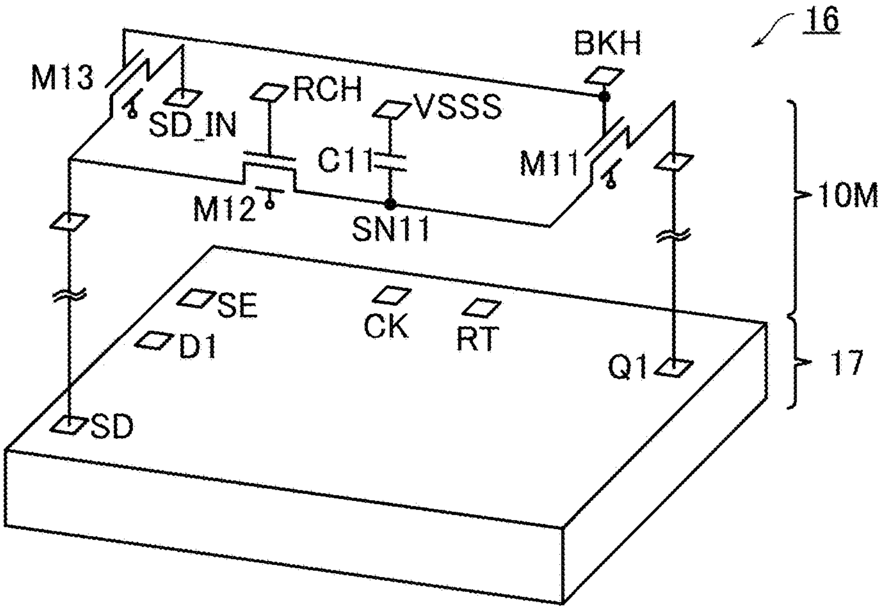

It is very preferable that all of the transistors in the backup circuit 10M be OS transistors. As shown in FIG. 16B, the backup circuit 10M can be stacked on the scan flip-flop 17 configured with a silicon CMOS circuit.

The number of elements in the backup circuit 10M is much smaller than the number of elements in the scan flip-flop 17; hence, there is no need to change the circuit configuration and layout of the scan flip-flop 17 in order to stack the backup circuit 10M. That is, the backup circuit 10M is a backup circuit that has very broad utility. In addition, the backup circuit 10M can be provided in a region where the scan flip-flop 17 is formed; thus, even when the backup circuit 10M is incorporated, the area overhead of the flip-flop 16 can be zero. Thus, the backup circuit 10M is provided in the flip-flop 16, whereby power gating of the CPU core 11 is enabled. The power gating of the CPU core 11 is enabled with high efficiency owing to little power necessary for the power gating.

When the backup circuit 10M is provided, parasitic capacitance due to the transistor M11 is added to the node Q1; the parasitic capacitance is lower than parasitic capacitance due to a logic circuit connected to the node Q1, whereby there is no influence on the operation of the scan flip-flop 17. That is, even when the backup circuit 10M is provided, the performance of the flip-flop 16 does not substantially decrease.

The CPU core 11 can be set to a clock gating state, a power gating state, or a resting state (non-operation) as a low power consumption state. The PMU 34 selects the low power consumption mode of the CPU core 11 on the basis of the interrupt signal, the signal SLEEP1, and the like. For example, in the case of transition from a normal operation state to a clock gating state, the PMU 34 stops generation of the clock signal GCLK1.

For example, in the case of transition from a normal operation state to a resting state (non-operation state), the PMU 34 performs voltage and/or frequency scaling. For example, when the voltage scaling is performed, the PMU 34 turns off the power switch 15A and turns on the power switch 15B to input the voltage VDD1 to the CPU core 11. The voltage VDD1 is voltage at which data in the scan flip-flop 17 is not lost. When the frequency scaling is performed, the PMU 34 reduces the frequency of the clock signal GCLK1.

In the case where the CPU core 11 transitions from a normal operation state to a power gating state, data in the scan flip-flop 17 is backed up to the backup circuit 10M. When the CPU core 11 is returned from the power gating state to the normal operation state, a recovery operation of writing back data in the backup circuit 10M to the scan flip-flop 17 is performed.

Figure 17:
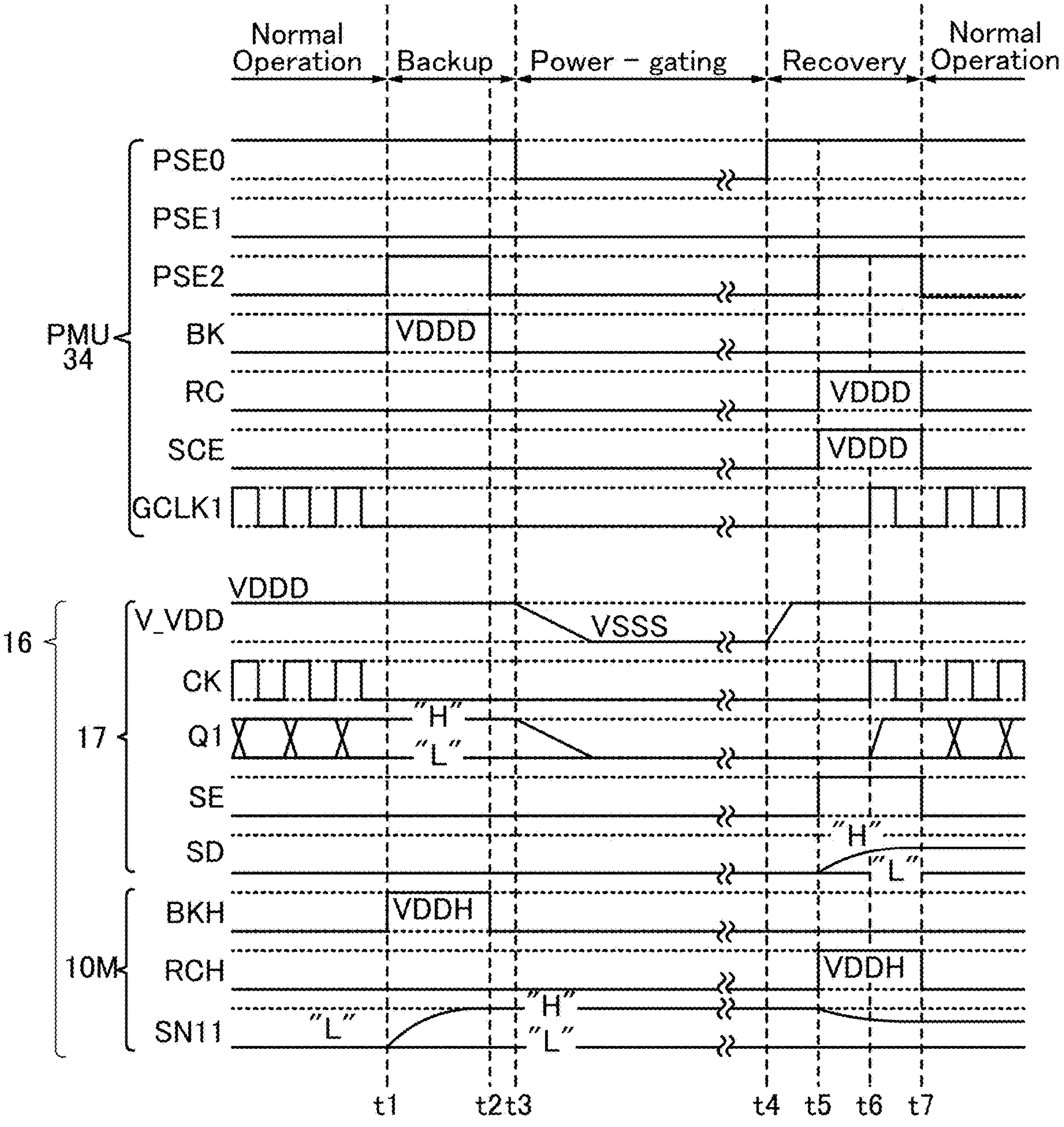
FIG. 17 is a timing chart showing a configuration example of an arithmetic device.

FIG. 17 illustrates an example of the power gating sequence of the CPU core 11. Note that in FIG. 17, t1 to t7 represent the time. Signals PSE0 to PSE2 are control signals of the power switches 15A to 15C, which are generated in the PMU 34. When the signal PSE0 is at "H"/"L", the power switch 15A is on/off. The same applies to the signals PSE1 and PSE2.

Until Time t1, a normal operation is performed. The power switch 15A is on, and the voltage VDDD is input to the CPU core 11. The scan flip-flop 17 performs the normal operation. At this time, the level shifter 15D does not need to be operated; thus, the power switch 15C is off and the signals SCE, BK, and RC are each at "L". The node SE is at "L"; thus, the scan flip-flop 17 stores data in the node D1. Note that in the example of FIG. 17, the node SN11 of the backup circuit 10M is at "L" at Time t1.

A backup operation is described. At Time t1, the PMU 34 stops the clock signal GCLK1 and sets the signals PSE2 and BK at "H". The level shifter 15D becomes active and outputs the signal BKH at "H" to the backup circuit 10M.

The transistor M11 in the backup circuit 10M is turned on, and data in the node Q1 of the scan flip-flop 17 is written to the node SN11 of the backup circuit 10M. When the node Q1 of the scan flip-flop 17 is at "L", the node SN11 remains at "L", whereas when the node Q1 is at "H", the node SN11 becomes "H".

The PMU 34 sets the signals PSE2 and BK at "L" at Time t2 and sets the signal PSE0 at "L" at Time t3. The state of the CPU core 11 transitions to a power gating state at Time t3. Note that at the timing when the signal BK falls, the signal PSE0 may fall.

A power-gating operation is described. When the signal PSE0 is set at "L", data in the node Q1 is lost because the voltage of the V_VDD line decreases. The node SN11 retains data that is retained in the node Q1 at Time t3.

A recovery operation is described. When the PMU 34 sets the signal PSE0 at "H" at Time t4, the power gating state transitions to a recovery state. Charging of the V_VDD line starts, and the PMU 34 sets the signals PSE2, RC, and SCE at "H" in a state where the voltage of the V_VDD line becomes VDDD (at Time t5).

The transistor M12 is turned on, and charge in the capacitor C11 is distributed to the node SN11 and the node SD. When the node SN11 is at "H", the voltage of the node SD increases. The node SE is at "H", and thus, data in the node SD is written to a latch circuit on the input side of the scan flip-flop 17. When the clock signal GCLK1 is input to the node CK at Time t6, data in the latch circuit on the input side is written to the node Q1. That is, data in the node SN11 is written to the node Q1.

When the PMU 34 sets the signals PSE2, SCE, and RC at "L" at Time t7, the recovery operation is terminated.

The backup circuit 10M using OS transistors is extremely suitable for normally-off computing because both dynamic power consumption and static power consumption are low. Even when the flip-flop 16 is mounted, a decrease in the performance and an increase in the dynamic power of the CPU core 11 can be made hardly to occur.

Note that the CPU core 11 may include a plurality of power domains capable of power gating. In the plurality of power domains, one or a plurality of power switches for controlling voltage input are provided. In addition, the CPU core 11 may include one or a plurality of power domains where power gating is not performed. For example, the power domain where power gating is not performed may be provided with a power gating control circuit for controlling the flip-flop 16 and the power switches 15A to 15C.

Note that the application of the flip-flop 16 is not limited to the arithmetic device 10. In an arithmetic device, the flip-flop 16 can be used as a register provided in a power domain capable of power gating.

Structure Example of Memory Device

Here, a structure example of the memory device 20 that is provided with the memory cell 20M including an OS transistor will be described.

Figure 18A:
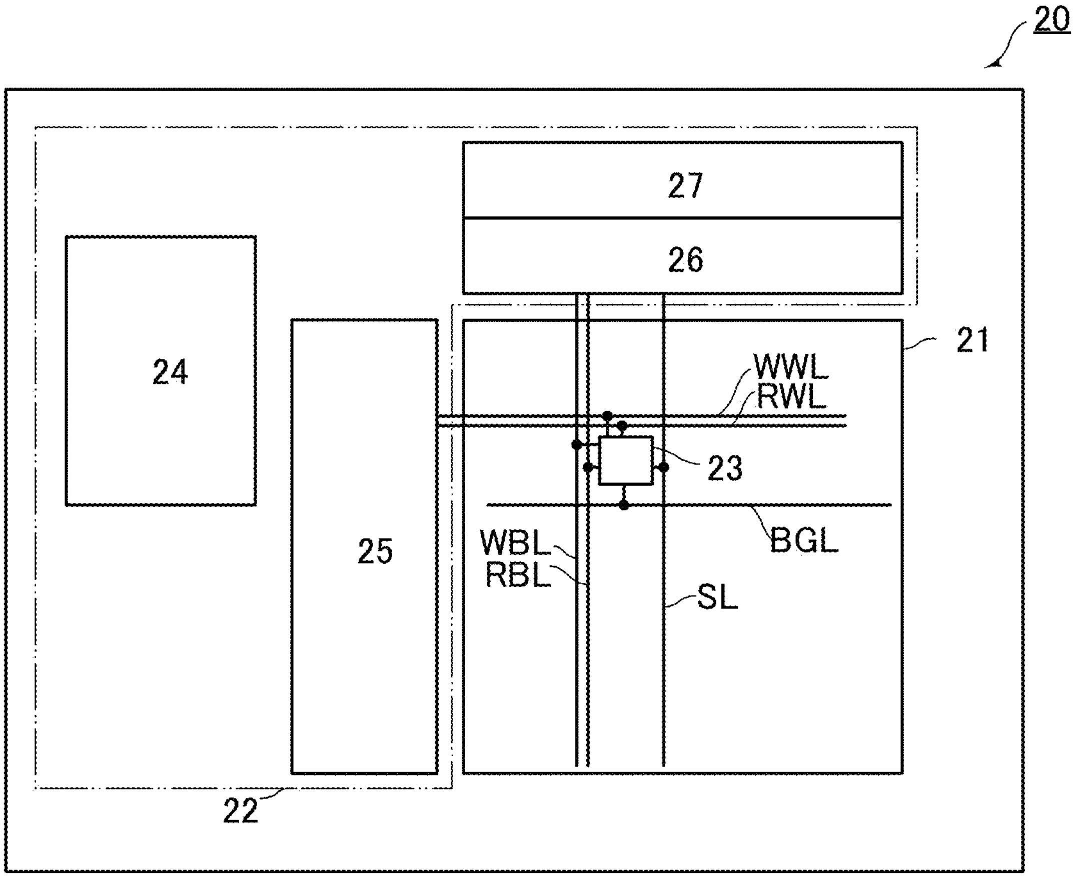
FIG. 18A and FIG. 18B are a block diagram and a circuit diagram illustrating a configuration example of a memory circuit.

The memory device 20 illustrated in FIG. 18A includes the memory cell array 21 and the peripheral circuit 22. A control circuit 24, a row circuit 25, a column circuit 26, and an input/output circuit 27 are provided to form the peripheral circuit 22.

The memory cell array 21 includes a memory cell 23, the read word line RWL, the write word line WWL, the read bit line RBL, the write bit line WBL, a wiring SL, and the wiring BGL. Note that the read word line RWL and the write word line WWL are referred to as a word line RWL and a word line WWL, respectively, in some cases. The read bit line RBL and the write bit line WBL are referred to as a bit line RBL and a bit line WBL, respectively, in some cases.

The control circuit 24 controls the memory device 20 as a whole and performs data writing and data reading. The control circuit 24 processes command signals from the outside (e.g., a chip enable signal, a write enable signal, and the like) and generates control signals for other circuits of the peripheral circuit 22.

The row circuit 25 has a function of selecting a row to be accessed. For example, the row circuit 25 includes a row decoder and a word line driver. The column circuit 26 has a function of precharging the bit lines WBL and RBL, a function of writing data to the bit line WBL, a function of amplifying data of the bit line RBL, a function of reading data from the bit line RBL, and the like. The input/output circuit 27 has a function of retaining writing data, a function of retaining readout data, and the like.

The configuration of the peripheral circuit 22 is changed as appropriate depending on the configuration, readout method, writing method, or the like of the memory cell array 21.

Figure 18B:
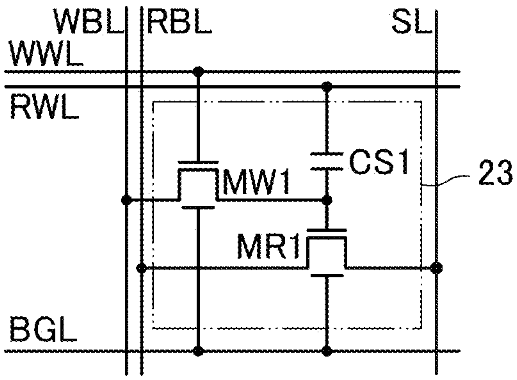

FIG. 18B illustrates a circuit configuration example of the memory cell 23. The memory cell 23 here is a 2-transistor (2T) gain cell. The memory cell 23 includes transistors MW1 and MR1 and a capacitor CS1. The transistor MW1 is a write transistor and the transistor MR1 is a read transistor. Back gates of the transistors MW1 and MR1 are electrically connected to the wiring BGL.

Since the read transistor is composed of an OS transistor, the memory cell 23 does not consume power for data retention. Thus, the memory cell 23 is a memory cell with low power consumption that can retain for a long time, and the memory device 20 can be used as a nonvolatile storage device. The OS transistor and the capacitor can be stacked with a Si transistor. Accordingly, the memory cell array 21 can be stacked with the peripheral circuit 22, resulting in improvement in the integration degree of the memory cell array 21.

Other configuration examples of a memory cell are described with reference to FIG. 19A to FIG. 19F.

Figure 19A:
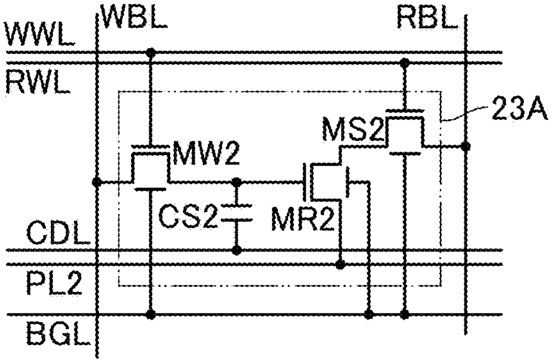
FIG. 19A to FIG. 19F are circuit diagrams illustrating configuration examples of memory circuits.

A memory cell 23A illustrated in FIG. 19A is a 3T gain cell, which includes transistors MW2, MR2, and MS2, and a capacitor CS2. The transistors MW2, MR2, and MS2 are a write transistor, a read transistor, and a selection transistor, respectively. Back gates of the transistors MW2, MR2, and MS2 are electrically connected to the wiring BGL. The memory cell 23A is electrically connected to the word lines RWL and WWL, the bit lines RBL and WBL, a capacitor line CDL, and a power supply line PL2. For example, the voltage GND (low-level-side power supply voltage) is input to the capacitor line CDL and the power supply line PL2.

Figure 19B:
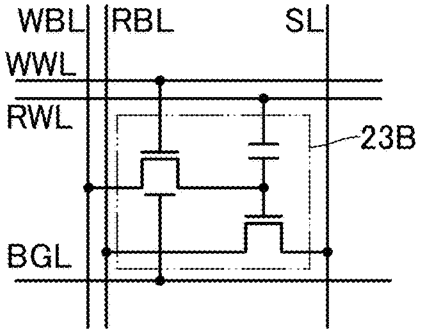
Figure 19C:
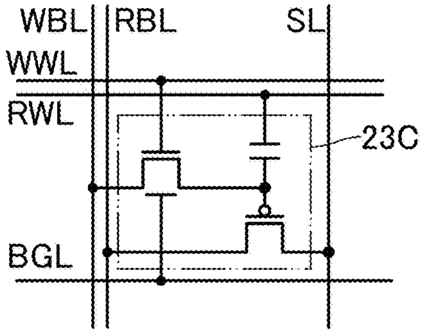

FIG. 19B and FIG. 19C illustrate other configuration examples of a 2T gain cell. In a memory cell 23B illustrated in FIG. 19B, a read transistor is composed of an n-channel Si transistor. In a memory cell 23C illustrated in FIG. 19C, a read transistor is composed of a p-channel Si transistor. As illustrated in FIG. 19B and FIG. 19C, the transistors in the memory cell may be a combination of an OS transistor and a Si transistor.

Figure 19D:
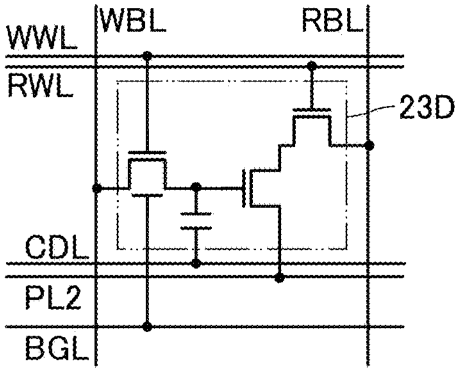
Figure 19E:
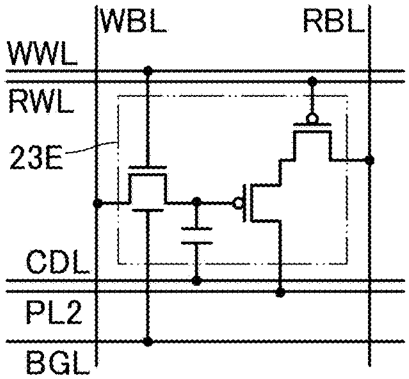

FIG. 19D and FIG. 19E illustrate other configuration examples of a 3T gain cell. In a memory cell 23D illustrated in FIG. 19D, a read transistor and a selection transistor are composed of an n-channel Si transistor. In a memory cell 23E illustrated in FIG. 19E, a read transistor and a selection transistor are composed of a p-channel Si transistor. In the example of FIG. 19E, the voltage VDDD is input to the power supply line PL2.

In the above-described gain cells, a bit line serving as both the bit line RBL and the bit line WBL may be provided.

Figure 19F:
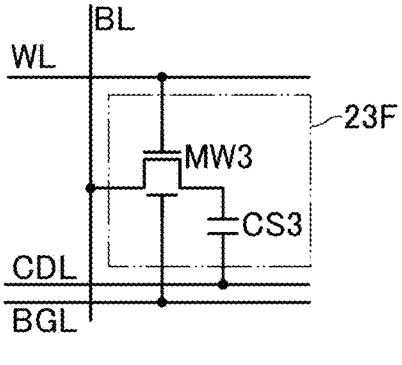

FIG. 19F illustrates an example of a 1TIC (capacitor) memory cell. A memory cell 23F illustrated in FIG. 19F is electrically connected to the word line WL, the bit line BL, the capacitor line CDL, and the wiring BGL. The memory cell 23F includes a transistor MW3 and a capacitor CS3. A back gate of the transistor MW3 is electrically connected to the wiring BGL.

A circuit configuration of the memory cell 20M in the memory device 20 can be a circuit configuration in which a Si transistor is combined, for example, in addition to a circuit configuration including only OS transistors.

In the above-described semiconductor device of one embodiment of the present invention and the electronic device including the semiconductor device, an electronic component of the semiconductor device or the like, such as the display portion, the arithmetic device, and the memory device are stored in the housing 1001 with a limited volume. The frequency of updating the image data in the display portion and the driving control portion of the semiconductor device is reduced, whereby power consumption can be reduced.

In the semiconductor device of one embodiment of the present invention and the electronic device including the semiconductor device, the semiconductor device having a structure in which the backup circuit is provided in the arithmetic device and the memory cell including the OS transistor is provided in the memory device can significantly reduce power when the electronic device 1000 is brought into a sleep state; thus, the convenience can be improved even when the capacity of the battery is small. As a result, the electronic device can be more lightweight.

Embodiment 2

This embodiment will describe a structure example of a transistor that can be used for the element layer 40 included in the semiconductor device 100 described in Embodiment 1 above. In particular, in this embodiment, a structure example of a transistor that can be used as an OS transistor will be described.

Structure Example 1 of Transistor

Figure 20A:
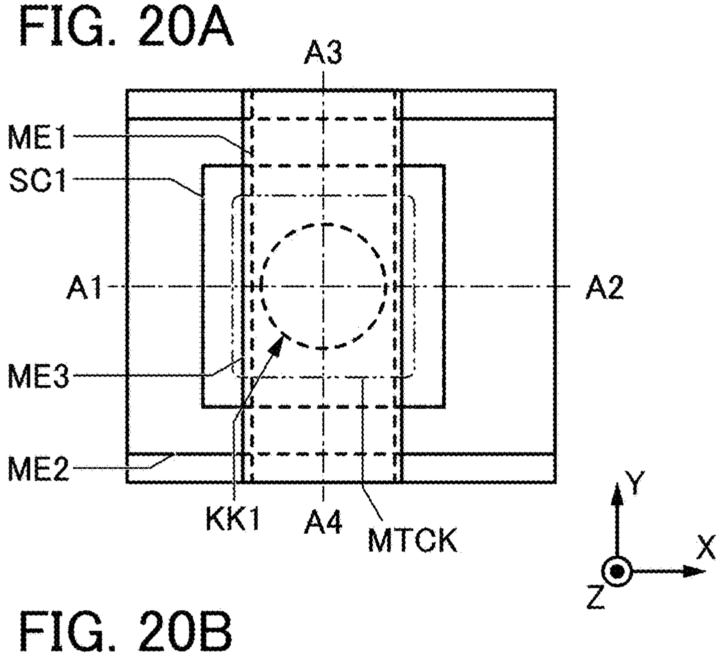
FIG. 20A is a schematic plan view illustrating a structure example of a semiconductor device.
Figure 20B:
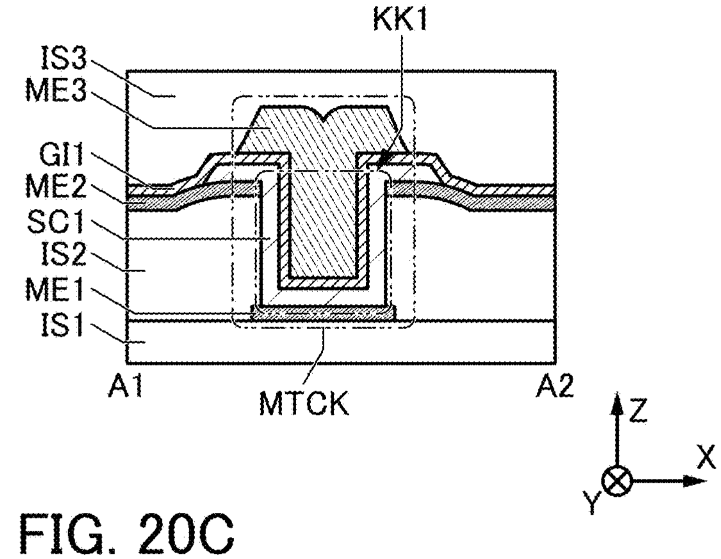
FIG. 20B and FIG. 20C are schematic cross-sectional views illustrating a structure example of a semiconductor device.
Figure 20C:
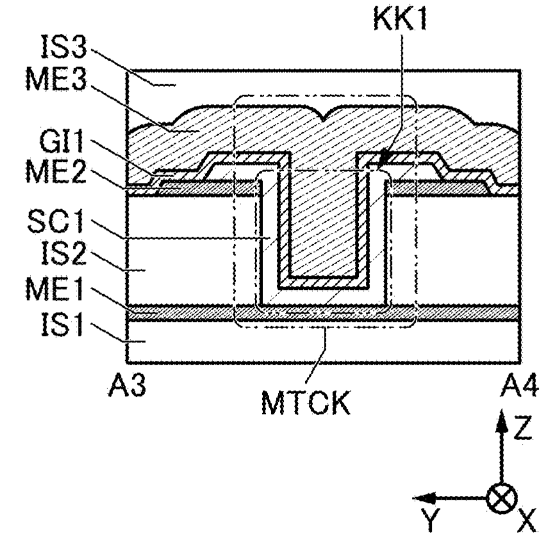

FIG. 20A to FIG. 20C illustrate an example of a semiconductor device (showing, for example, a pixel circuit or a driver circuit) including a transistor MTCK. Specifically, FIG. 20A is a schematic plan view of the transistor MTCK. FIG. 20B is a schematic cross-sectional view corresponding to a portion along the dashed-dotted line A1-A2 illustrated in FIG. 20A, and is also a schematic cross-sectional view of the transistor MTCK. FIG. 20C is a schematic cross-sectional view corresponding to a portion along the dashed-dotted line A3-A4 illustrated in FIG. 20A, and is also a schematic cross-sectional view of the transistor MTCK.

In FIG. 20A to FIG. 20C, the direction along the dashed-dotted line A1-A2 is the X direction and the direction along the dashed-dotted line A3-A4 is the Y direction. Furthermore, the direction perpendicular to both the X direction and the Y direction is referred to as the Z direction. The X direction and the Y direction can be perpendicular to each other. The definition of the X direction, the Y direction, and the Z direction applies to some of the following drawings and does not apply to other drawings. In the description of the schematic plan view in FIG. 20A and the like, the right side is referred to as the X direction, the left side is referred to as the −X direction, the upper side is referred to as the Y direction, and the lower side is referred to as the −Y direction in some cases. In the description of the schematic cross-sectional view in FIG. 20B and the like, the right side is referred to as the X direction, the left side is referred to as the −X direction, the upper side is referred to as the Z direction, and the lower side is referred to as the −Z direction in some cases. In the description of the schematic cross-sectional view in FIG. 20C, the right side is referred to as the −Y direction, the left side is referred to as the +Y direction, the upper side is referred to as the Z direction, and the lower side is referred to as the −Z direction in some cases.

The transistor MTCK illustrated in FIG. 20A to FIG. 20C includes an insulator IS1 to an insulator IS3, an insulator GI1, a conductor ME1 to a conductor ME3, and a semiconductor SC1.

The insulator IS1 functions as a base film above which a source, a drain, and a channel formation region of the transistor MTCK are provided, for example. For the insulator IS1, silicon oxide, silicon oxynitride, silicon nitride oxide, or silicon nitride may be used, for example. For the insulator IS1, for example, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable. In particular, materials such as silicon oxide, silicon oxynitride, and porous silicon oxide are preferably used, in which case a region containing oxygen to be released by heating can be easily formed. Alternatively, for example, a resin can be used for the insulator IS1. A material combined with any of the above insulating materials as appropriate may be used for the insulator IS1.

The conductor ME1 is a conductor (sometimes referred to as a terminal, a wiring, or the like) functioning as one of a source and a drain in the transistor MTCK. The conductor ME2 is a conductor (sometimes referred to as a terminal, a wiring, or the like) functioning as the other of the source and the drain in the transistor MTCK.

Note that in FIG. 20A to FIG. 20C, the conductor ME1 is provided to extend in the Y direction as a wiring, for example. The conductor ME2 is provided to extend in the X direction as a wiring, for example.

For each of the conductor ME1, the conductor ME2, and the conductor ME3, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum or an alloy containing two or more selected from the above metal elements as components or an alloy combining two or more selected from the above metal elements. Alternatively, for the conductive film ME1, for example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, or an oxide containing lanthanum and nickel. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. As the conductor, a semiconductor having high electrical conductivity, typified by polycrystalline silicon containing an impurity element (e.g., phosphorus or arsenic), or silicide (e.g., nickel silicide) may be used.

A plurality of conductive films formed using any of the above materials may be stacked. For example, a stacked-layer structure combining a material containing the above-described metal element and a conductive material containing oxygen may be employed. Specific examples of the stacked-layer structure of the conductive film include a stacked-layer structure of indium oxide and a metal film containing ruthenium. In addition, a stacked-layer structure combining a material containing the above-described metal element and a conductive material containing nitrogen may be employed. Furthermore, a stacked-layer structure combining a material containing the above-described metal element, a conductive material containing oxygen, and a conductive material containing nitrogen may be employed.

The insulator IS2 functions as an interlayer film that separates the source and the drain of the transistor MTCK, for example. Any of the materials that can be used for the insulator IS1 can be used as the insulating film IS2, for example. In the case where the semiconductor SC1 is a metal oxide functioning as an oxide semiconductor, for example, silicon oxide, silicon oxynitride, and porous silicon oxide are preferably used. With these materials, a region containing oxygen released by heating can be easily formed, and the released oxygen can be supplied to the metal oxide. This reduces the carrier concentration of the metal oxide at the interface of the semiconductor SC1 in contact with the insulator IS2 and in the vicinity of the interface, whereby the interface of the semiconductor SC1 and the vicinity of the interface are i-type or substantially i-type. Accordingly, the interface of the semiconductor SC1 and the vicinity of the interface can function as the channel formation region of the transistor MTCK.

For example, the semiconductor SC1 can be a metal oxide functioning as an oxide semiconductor. In this case, the transistor MTCK is an OS transistor. The metal oxide preferably contains at least indium or zinc, for example. In particular, indium and zinc are preferably contained. In addition to them, an element M is preferably contained. As the element M, one or more selected from aluminum, gallium, silicon, yttrium, tin, copper, vanadium, beryllium, boron, titanium, iron, nickel, germanium, zirconium, molybdenum, lanthanum, cerium, neodymium, hafnium, tantalum, tungsten, magnesium, cobalt, and antimony can be used. In particular, the element M is preferably one or more of aluminum, gallium, yttrium, and tin. The element M further preferably contains one or both of gallium and tin. When the semiconductor SC1 is a metal oxide functioning as an oxide semiconductor, it is preferably formed by an ALD (Atomic Layer Deposition) method. As illustrated in FIG. 20B and FIG. 20C, when the semiconductor SC1 is formed in a region having a step, an ALD method enables favorable coverage.

In the case where a metal oxide functioning as an oxide semiconductor is used as the semiconductor SC1, microwave treatment is preferably performed in an oxygen-containing atmosphere during or after the deposition of the metal oxide to reduce the impurity concentration in the metal oxide. Note that specific examples of impurities include hydrogen and carbon. The microwave treatment can increase the crystallinity of the metal oxide in some cases. Here, the microwave treatment refers to, for example, treatment using an apparatus including a power source that generates high-density plasma with the use of a microwave.

It is preferable to use a metal oxide layer having crystallinity as the semiconductor SC1. For example, a metal oxide layer having a CAAC (c-axis aligned crystal) structure, a polycrystalline structure, a nano-crystal (nc) structure, or the like can be used. With use of the metal oxide layer having crystallinity as the semiconductor SC1, the density of defect states in the semiconductor SC1 can be reduced, which enables the semiconductor device to have high reliability.

For example, an In—Ga—Zn oxide is preferably used for the semiconductor SC1. The In—Ga—Zn oxide is preferably a metal oxide with a composition of In:Ga:Zn=1:1:1 [atomic ratio] or in the neighborhood thereof, a composition of In:Ga:Zn=4:2:3 [atomic ratio] or in the neighborhood thereof, or a composition of In:Ga:Zn=3:1:2 [atomic ratio] or in the neighborhood thereof, in particular. For another example, an In—Zn oxide is preferably used for the semiconductor film SC1. The In—Zn oxide is further preferably a metal oxide with a composition of In:Zn=4:1 [atomic ratio] or in the neighborhood thereof, in particular.

The semiconductor SC1 preferably has a stacked-layer structure of a plurality of oxide layers that differ in the atomic ratio of metal atoms. For example, a first metal oxide and a second metal oxide formed over the first metal oxide are assumed as the metal oxide. In the case where each metal oxide contains at least indium (In) and the element M, the proportion of the number of atoms of the element M contained in the first metal oxide to the number of atoms of all elements that constitute the first metal oxide is preferably higher than the proportion of the number of atoms of the element M contained in the second metal oxide to the number of atoms of all elements that constitute the second metal oxide. In addition, the atomic ratio of the element M to In in the first metal oxide is preferably higher than the atomic ratio of the element M to In in the second metal oxide.

Specifically, as the first metal oxide, a metal oxide with a composition of In:Ga:Zn=1:3:4 [atomic ratio] or in the neighborhood thereof, a composition of In:Ga:Zn=1:3:2 [atomic ratio] or in the neighborhood thereof, or a composition of In:Ga:Zn=1:1:0.5 [atomic ratio] or in the neighborhood thereof can be used. As the second metal oxide, a metal oxide with In:Ga:Zn=1:1:1 [atomic ratio] or a composition in the neighborhood thereof, In:Ga:Zn=4:2:3 [atomic ratio] or a composition in the neighborhood thereof, or In:Ga:Zn=3:1:2 [atomic ratio] or a composition in the neighborhood thereof is used. Note that the neighborhood of the composition includes ±30% of an intended atomic ratio.

In this case, the second metal oxide serves as a main carrier path. When the first metal oxide has the above structure, the density of defect states at the interface between the first metal oxide and the second metal oxide can be made low. Thus, the influence of interface scattering on carrier conduction is small, and the transistor can have a high on-state current and high frequency characteristics.

In a region of the insulator IS2 where the transistor MTCK is provided, an opening KK1 whose side surface is substantially perpendicular to the X-Y plane (the taper angle is greater than or equal to 70° and less than or equal to 110°) is formed. The semiconductor SC1 including the channel formation region of the transistor MTCK is provided to be in contact with the conductor ME1 and the conductor ME2 through the opening KK1.

In the transistor MTCK, the insulator GI1 is provided over the semiconductor SC1. Specifically, the insulator GI1 is positioned above and overlaps with the channel formation region included in the semiconductor SC1 in the plan view. The insulator GI1 functions as a gate insulating film of the transistor MTCK.

Thus, for the insulator GI1, a single layer or a stacked layer using an insulator containing what is called a high-k material, such as aluminum oxide, hafnium oxide, tantalum oxide, zirconium oxide, lead zirconate titanate (PZT), strontium titanate ($SrTiO_3$), or (Ba, Sr)$TiO_3$ (BST) is preferably used. Alternatively, for the insulator GI1, as an insulator having a high relative permittivity, an oxide containing aluminum and hafnium, an oxynitride containing aluminum and hafnium, an oxide containing silicon and hafnium, an oxynitride containing silicon and hafnium, or a nitride containing silicon and hafnium may be used.

In the transistor MTCK, the conductor ME3 is provided over the insulator GI1 to fill the opening KK1. The conductor ME3 is a conductor (sometimes referred to as a terminal, a wiring, or the like) functioning as a gate in the transistor MTCK.

In FIG. 20A to FIG. 20C, the conductor ME3 is provided to extend in the Y direction as a wiring, for example.

The insulator IS3 is a film functioning as an interlayer film, for example. The insulator IS3 preferably includes an insulating material with a low relative permittivity. The use of an insulating material with a low relative permittivity for the interlayer film can reduce the parasitic capacitance between wirings.

Any of the materials that can be used as the insulator IS1 can be used for the insulator IS3, for example.

As described above, in the transistor MTCK illustrated in FIG. 20A to FIG. 20C, the conductor ME1 functioning as one of the source and the drain is positioned below the insulator IS2 functioning as an interlayer film, and the conductor ME2 functioning as the other of the source and the drain is positioned above the insulator IS2. Thus, the channel formation region of the transistor MTCK is provided along the opening of the insulator IS2.

As illustrated in FIGS. 20A to 20C, when the channel formation region of the transistor is provided along the side surface of the opening of the insulator functioning as an interlayer film, the transistor formation area can be smaller than that in the case where the channel formation region of the transistor is provided along the X-Y plane. Thus, when a circuit is formed using the transistor MTCK, the area of the circuit can be small. As a result, the semiconductor device including the circuit or a display apparatus can be downsized.

Structure Example 2 of Transistor

Figure 21A:
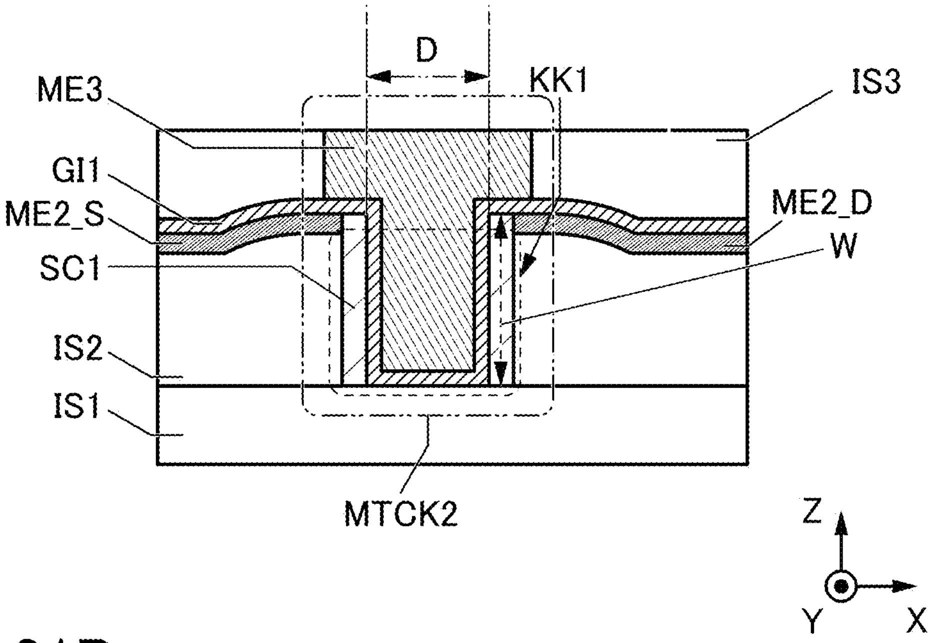
FIG. 21A and FIG. 21B are schematic cross-sectional views illustrating a structure example of a semiconductor device.
Figure 21B:
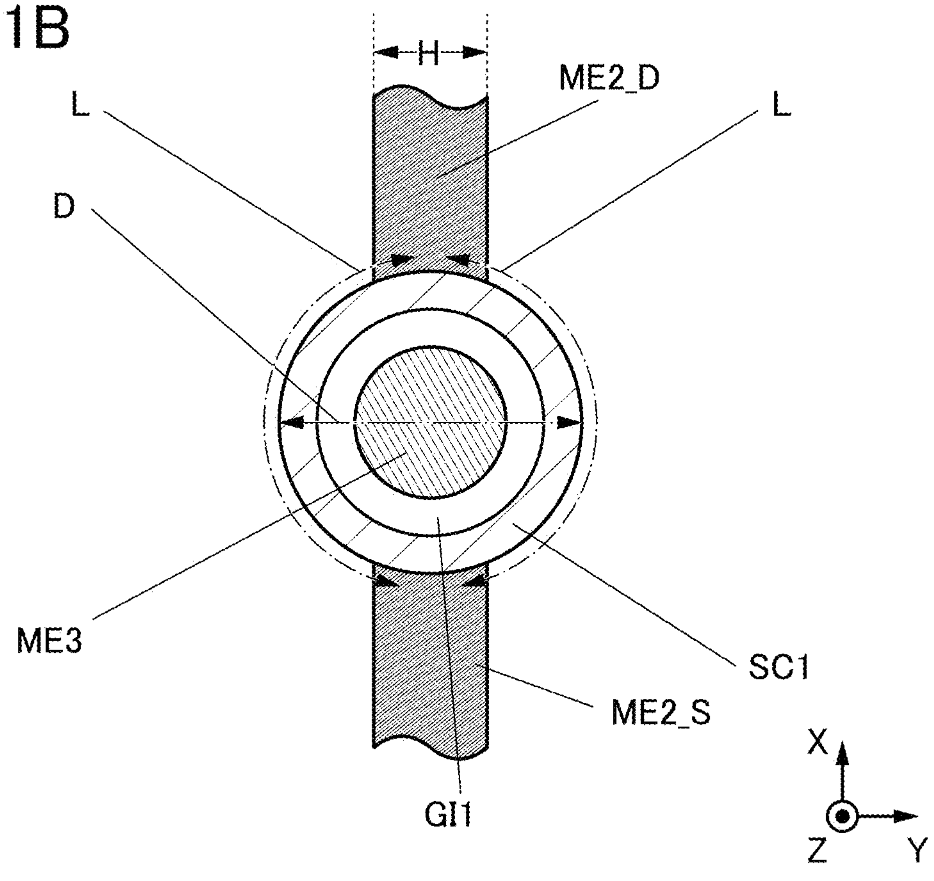

FIG. 21A is a cross-sectional view of a transistor MTCK2, along the XZ plane, having a structure different from that in FIG. 20B. FIG. 21B is a cross-sectional view taken along the XY plane.

The transistor MTCK2 is different from the transistor MTCK mainly in that the conductor ME1 is not included, conductors ME2_S and ME2_D are included instead of the conductor ME2, and the semiconductor SC1 has a different shape. The conductor ME2_S functions as a source electrode, and the conductor ME2_D functions as a drain electrode.

The semiconductor SC1 has a circular shape. Specifically, the semiconductor SC1 includes a region in contact with the side surface of the conductor ME2_S, a region in contact with the side surface of the conductor ME2_D, and a region in contact with the side surface of the insulator IS2 in the opening KK1. Here, the semiconductor SC1 is not in contact with the top surfaces of the conductors ME2_S and ME2_D. The semiconductor SC1 having such a shape can be formed through processing with anisotropic etching, for example.

As illustrated in FIG. 21B, the widths H of the conductor ME2_S and the conductor ME2_D are smaller than the maximum width D of the opening KK1. In this case, the circumferential direction of the opening KK1 corresponds to a channel length direction L of the transistor MTCK2. Here, since the semiconductor SC1 has a circular shape, two kinds of current paths (i.e., channels) from the conductor ME2_S to the conductor ME2_D exist. Note that the semiconductor SC1 does not necessarily have a circular shape and may be in contact with both the conductor ME2_S and the conductor ME2_D.

The channel length can be controlled by the shape and size of the opening KK1. For example, in the case where an increase in the channel length is assumed, the perimeter of the opening KK1 should be long. Although this embodiment describes the example where the opening KK1 has a circular shape in the plan view, the present invention is not limited thereto. For example, the opening KK1 can have an elliptical shape or a quadrangular shape with rounded corners besides the circular shape in the plan view. Alternatively, a regular polygonal shape such as a regular triangular shape, a square shape, or a regular pentagonal shape or a polygonal shape other than the regular polygonal shape may be employed. By employing a concave polygonal shape in which at least one interior angle is greater than 180°, such as a star polygonal shape, the channel length can be increased. Alternatively, an elliptical shape, a polygonal shape with rounded corners, a closed curve in which a straight line and a curve are combined, or the like can be employed. In that case, the maximum width of the opening KK1 is preferably calculated as appropriate in accordance with the shape of the uppermost portion of the opening KK1. For example, in the case where the opening portion is square or rectangular in the plan view, the maximum width of the opening KK1 may be the length of a diagonal line of the uppermost portion of the opening KK1.

As illustrated in FIG. 21A, the height of the semiconductor SC1 corresponds to the channel width W of the transistor MTCK2. Thus, the channel width W of the transistor MTCK2 can be controlled by the thickness of the insulator IS2. Accordingly, the channel width of the transistor MTCK2 can be extremely minute below the light exposure limit of photolithography (e.g., smaller than or equal to 60 nm, smaller than or equal to 50 nm, smaller than or equal to 40 nm, smaller than or equal to 30 nm, smaller than or equal to 20 nm, or smaller than or equal to 10 nm, and larger than or equal to 1 nm, or larger than or equal to 5 nm).

The transistor MTCK has an extremely small channel length and can have a large channel width, so that a high on-state current can be achieved. Meanwhile, the transistor MTCK2 has an extremely small channel width and can have a large channel length, so that an appropriate on-state current can be obtained and the transistor design is facilitated. The transistor MTCK and the transistor MTCK2 can be formed, with manufacturing steps some of which are shared, separately over the same substrate. For example, in the display apparatus, the transistor MTCK2 can be used as a driving transistor for controlling current flowing through the light-emitting element, and the transistor MTCK can be used as a transistor functioning as a switch.

The structures, configurations, methods, and the like described in this embodiment can be used in combination as appropriate with the structures, configurations, methods, and the like described in the other embodiments.

Embodiment 3

In this embodiment, a cross-sectional structure example of the semiconductor device of one embodiment of the present invention will be described.

Figure 22:
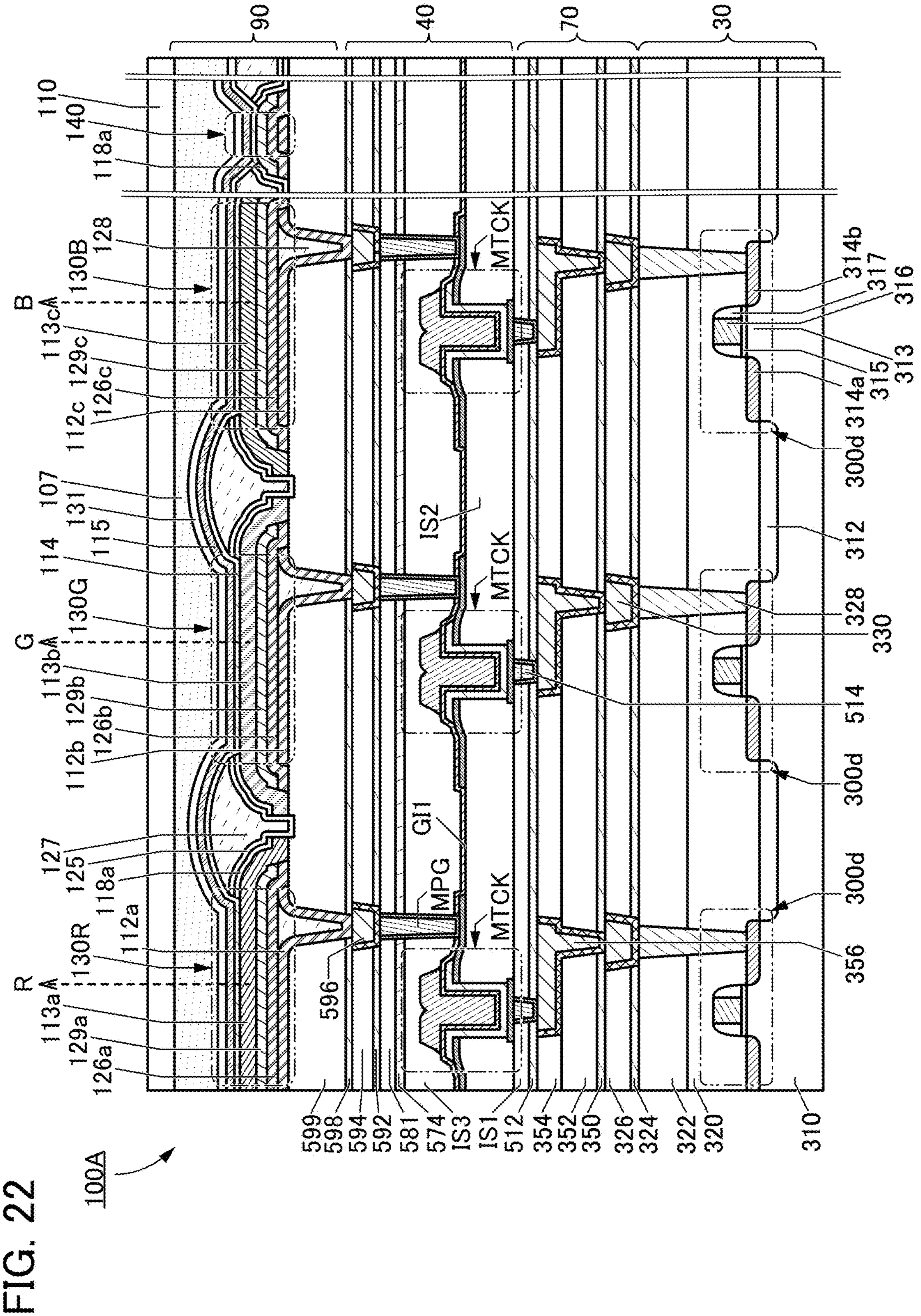
FIG. 22 is a schematic cross-sectional view illustrating a structure example of a semiconductor device.

A semiconductor device 100A illustrated in FIG. 22 is a structure example of the semiconductor device 100 described in Embodiment 1 and the like in a cross-sectional view. The semiconductor device 100A has a structure provided with a pixel circuit, a driver circuit, and the like over a substrate 310. Note that in the semiconductor device 100A in FIG. 22, a wiring layer 70 is illustrated in addition to the element layer 30, the element layer 40, and the element layer 90. The wiring layer 70 is a layer provided with a wiring.

The element layer 30 includes the substrate 310, for example, and a transistor 300*d* is formed over the substrate 310. The wiring layer 70 is provided above the transistor 300*d*, and the wiring layer 70 includes a wiring that electrically connects the transistor 300*d*, the transistor MTCK, a light-emitting device 130R, a light-emitting device 130G, and a light-emitting device 130B. The element layer 40 and the element layer 90 are provided above the wiring layer 70, and the element layer 40 includes the transistor MTCK and the like, for example. The element layer 90 includes the light-emitting device 130 (the light-emitting device 130R, the light-emitting device 130G, and the light-emitting device 130B in FIG. 22), for example.

The transistor 300*d* can be a transistor included in the element layer 30. The transistor MTCK can be a transistor included in the element layer 40. The light-emitting device 130 can be a light-emitting device included in the element layer 90.

As the substrate 310, a semiconductor substrate (e.g., a single crystal substrate containing silicon or germanium as a material) can be used, for example. Besides the semiconductor substrate, for example, an SOI (Silicon On Insulator) substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, or paper or a base material film containing a fibrous material can be used as the substrate 310. In this embodiment, the substrate 310 is a semiconductor substrate containing silicon as a material. Therefore, the transistor included in the element layer 30 can be a Si transistor.

The transistor 300*d* includes an element isolation layer 312, a conductor 316, an insulator 315, an insulator 317, a semiconductor region 313 that is part of the substrate 310, and a low-resistance region 314*a* and a low-resistance region 314*b* that function as a source region and a drain region. Thus, the transistor 300*d* is a Si transistor. Although FIG. 22 illustrates a structure in which one of a source and a drain of the transistor 300*d* is electrically connected to a conductor 330, a conductor 356, and a conductor 514, which are described later, through a conductor 328 described later, the electrical connection in the semiconductor device of one embodiment of the present invention is not limited thereto. The semiconductor device of one embodiment of the present invention may have a structure in which, for example, a gate of the transistor 300*d* is electrically connected to the conductor 514 through the conductor 328.

The transistor 300*d* can be a fin type when, for example, the top surface of the semiconductor region 313 and the side surface thereof in the channel width direction are covered with the conductor 316 with the insulator 315 functioning as a gate insulator therebetween. The effective channel width can be increased in the fin-type transistor 300*d*, so that the on-state characteristics of the transistor 300*d* can be improved. In addition, contribution of the electric field of the gate electrode can be increased, so that the off-state characteristics of the transistor 300*d* can be improved. For example, the transistor 300*d* may have a planar structure instead of a fin-type structure.

Note that the transistor 300*d* may be either a p-channel transistor or an n-channel transistor. Alternatively, a plurality of the transistors 300*d* may be provided and both the p-channel transistor and the n-channel transistor may be used.

A region of the semiconductor region 313 where a channel is formed, a region in the vicinity thereof, and the low-resistance region 314*a* and the low-resistance region 314*b* that function as the source region and the drain region preferably contain a silicon-based semiconductor, specifically, preferably contain single crystal silicon. Alternatively, each of the regions may be formed using germanium, silicon germanium, gallium arsenide, aluminum gallium arsenide, or gallium nitride, for example. A configuration using silicon whose effective mass is controlled by applying stress to a crystal lattice and changing lattice spacing may be employed. Alternatively, the transistor 300*d* may be a HEMT (High Electron Mobility Transistor) using gallium arsenide and aluminum gallium arsenide, for example.

For the conductor 316 functioning as a gate electrode, a semiconductor material such as silicon containing an element that imparts n-type conductivity, such as arsenic or phosphorus, or an element that imparts p-type conductivity, such as boron or aluminum, can be used. Alternatively, for the conductor 316, a conductive material such as a metal material, an alloy material, or a metal oxide material can be used, for example.

Since a work function depends on the material of the conductor, the threshold voltage of the transistor can be adjusted by selecting the material of the conductor. Specifically, it is preferable to use one or both of titanium nitride and tantalum nitride as the material of the conductor. Moreover, in order to ensure both conductivity and embeddability, it is preferable to use stacked layers of metal materials of one or both of tungsten and aluminum for the conductor, and it is particularly preferable to use tungsten in terms of heat resistance.

The element isolation layer 312 is provided to separate a plurality of transistors formed on the substrate 310 from each other. The element isolation layer can be formed by, for example, a LOCOS (Local Oxidation of Silicon) method, an STI (Shallow Trench Isolation) method, or a mesa isolation method.

Over the transistor 300*d* illustrated in FIG. 22, an insulator 320 and an insulator 322 are sequentially stacked from the substrate 310 side.

For the insulator 320 and the insulator 322, one or more selected from silicon oxide, silicon oxynitride, silicon nitride oxide, silicon nitride, aluminum oxide, aluminum oxynitride, aluminum nitride oxide, and aluminum nitride can be used, for example.

Note that in this specification and the like, oxynitride refers to a material that contains more oxygen than nitrogen in its composition, and nitride oxide refers to a material that contains more nitrogen than oxygen in its composition. For example, silicon oxynitride refers to a material that contains more oxygen than nitrogen in its composition, and silicon nitride oxide refers to a material that contains more nitrogen than oxygen in its composition.

The insulator 322 may have a function of a planarization film for eliminating a level difference caused by the transistor 300*d* or the like covered with the insulator 320 and the insulator 322. For example, the top surface of the insulator 322 may be planarized by planarization treatment using a chemical mechanical polishing (CMP) method to improve planarity.

The conductor 328 connected to the transistor MTCK and the like provided above the insulator 322 is embedded in the insulator 320 and the insulator 322. Note that the conductor 328 functions as a plug or a wiring. Thus, a material that is usable for the conductor MPG can be used for the conductor 328.

In the semiconductor device 100A, the wiring layer 70 is provided over the transistor 300*d*. The wiring layer 70 includes, for example, an insulator 324, an insulator 326, a conductor 330, an insulator 350, an insulator 352, an insulator 354, and a conductor 356.

Over the insulator 322 and the conductor 328, the insulator 324 and the insulator 326 are stacked in this order. An opening is formed in the insulator 324 and the insulator 326 in a region overlapping with the conductor 328. In addition, the conductor 330 is embedded in the opening.

The insulator 350, the insulator 352, and the insulator 354 are stacked sequentially over the insulator 326 and the conductor 330. An opening is formed in the insulator 350, the insulator 352, and the insulator 354 in a region overlapping with the conductor 330. The conductor 356 is embedded in the opening.

The conductor 330 and the conductor 356 have a function of a plug or a wiring that is connected to the transistor 300*d*. Note that the conductor 330 and the conductor 356 can be provided using a material similar to that for the conductor 328 or the conductor 596.

Note that like an insulator 592, for example, the insulator 324 and the insulator 350 are preferably formed using an insulator having a barrier property against one or more selected from hydrogen, oxygen, and water. Each of the insulator 326, the insulator 352, and the insulator 354 is preferably formed using an insulator having a comparatively low relative permittivity to reduce parasitic capacitance generated between wirings. Each of the insulator 326, the insulator 352, and the insulator 354 has a function of an interlayer insulating film and a planarization film. Furthermore, each of the insulator 326, the insulator 352, and the insulator 354 preferably includes an insulator having a barrier property against one or more selected from hydrogen, oxygen, and water.

For the conductor having a barrier property against hydrogen, tantalum nitride is preferably used, for example. The use of a stack including tantalum nitride and tungsten that has high conductivity can inhibit diffusion of hydrogen from the transistor 300*d* while the conductivity of a wiring is kept. In that case, a tantalum nitride layer having a barrier property against hydrogen is preferably in contact with the insulator 350 having a barrier property against hydrogen.

An insulator 512 is provided over the insulator 354 and the conductor 356. An insulator IS1 is provided over the insulator 512. The conductor 514 functioning as a plug or a wiring is embedded in the insulator IS1 and the insulator 512. Accordingly, one of a source and a drain of the transistor MTCK is electrically connected to one of the source and the drain of the transistor 300*d*. Note that the conductor 514 can be formed using any of the materials usable for the conductor MPG, for example.

The transistor MTCK is provided over the insulator IS1 and the conductor 514. An insulator 574 is formed over the transistor MTCK, and an insulator 581 is formed over the insulator 574. The conductive layer MPG functioning as a plug or a wiring is embedded in the insulator IS3, the insulator 574, and the insulator 581. Note that Embodiment 2 is referred to for the insulator, the conductor, and the semiconductor around the transistor MTCK.

The insulator IS3 is formed above the transistor MTCK. The insulator 574 and the insulator 581 are stacked in this order over the insulator IS3.

It is preferable that the insulator 574 have a function of inhibiting diffusion of impurities such as water and hydrogen (e.g., one or both of a hydrogen atom and a hydrogen molecule). In other words, the insulator 574 preferably functions as a barrier insulating film that inhibits the entry of the impurities into the transistor MTCK. In addition, it is preferable that the insulator 574 have a function of inhibiting diffusion of oxygen (e.g., one or both of an oxygen atom and an oxygen molecule). For example, the insulator 574 preferably has the property of being less likely to transmit oxygen than the insulator IS2 and the insulator IS3.

Thus, the insulator 574 preferably functions as a barrier insulating film that inhibits diffusion of impurities such as water and hydrogen. Accordingly, it is preferable to use, for the insulator 574, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the impurities are unlikely to pass). Alternatively, it is preferable to use an insulating material having a function of inhibiting diffusion of oxygen (e.g., one or both of an oxygen atom and an oxygen molecule) (an insulating material through which the oxygen is unlikely to pass).

An insulator having a function of inhibiting the passage of oxygen and impurities such as water and hydrogen can be formed to have a single layer or a stacked layer including an insulator containing one or more selected from boron, carbon, nitrogen, oxygen, fluorine, magnesium, aluminum, silicon, phosphorus, chlorine, argon, gallium, germanium, yttrium, zirconium, lanthanum, neodymium, hafnium, and tantalum, for example. Specific examples of the insulator having a function of inhibiting the passage of oxygen and impurities such as water and hydrogen include metal oxides such as aluminum oxide, magnesium oxide, gallium oxide, germanium oxide, yttrium oxide, zirconium oxide, lanthanum oxide, neodymium oxide, hafnium oxide, and tantalum oxide. Other examples of the insulator having a function of inhibiting the passage of oxygen and impurities such as water and hydrogen include oxides containing aluminum and hafnium (hafnium aluminate). Other examples of the insulator having a function of inhibiting the passage of oxygen and impurities such as water and hydrogen include metal nitrides such as aluminum nitride, aluminum titanium nitride, titanium nitride, silicon nitride oxide, and silicon nitride.

In particular, aluminum oxide or silicon nitride is preferably used for the insulator 574. Accordingly, it is possible to inhibit diffusion of impurities such as water and hydrogen to the transistor MTCK from a portion above the insulator 574. Alternatively, it is possible to inhibit diffusion of oxygen contained in the insulator IS3 and the like to a portion above the insulator 574.

The insulator 581 is preferably a film functioning as an interlayer film and having a lower permittivity than the insulator 574. When a material with a low permittivity is used for an interlayer film, parasitic capacitance generated between wirings can be reduced. For example, the relative permittivity of the insulator 581 is preferably lower than 4, further preferably lower than 3. The relative permittivity of the insulator 581 is, for example, preferably 0.7 times or less, further preferably 0.6 times or less the relative permittivity of the insulator 574. When a material with a low permittivity is used for the insulator 581, the parasitic capacitance generated between wirings can be reduced.

The concentration of impurities such as water and hydrogen in the insulator 581 is preferably reduced. In such a case, the insulator 581 can be formed using silicon oxide, silicon oxynitride, silicon nitride oxide, or silicon nitride, for example. For the insulator 581, for example, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable. In particular, materials such as silicon oxide, silicon oxynitride, and porous silicon oxide are preferably used, in which case a region containing oxygen to be released by heating can be easily formed. Moreover, for the insulator 581, a resin can be used. A material combined with any of the above insulating materials as appropriate may be used for the insulator 581.

The insulator 592 and the insulator 594 are sequentially stacked over the insulator 574 and the insulator 581.

For the insulator 592, it is preferable to use an insulating film having a barrier property (referred to as a barrier insulating film) which prevents diffusion of impurities such as water and hydrogen from the substrate 310 or the transistor MTCK to a region above the insulator 592 (e.g., the region where the light-emitting device 130R, the light-emitting device 130G, the light-emitting device 130B, and the like are provided). Accordingly, for the insulator 592, it is preferable to use an insulating material that has a function of inhibiting diffusion of impurities such as a hydrogen atom, a hydrogen molecule, and a water molecule (through which the above impurities are less likely to pass). Furthermore, depending on the situation, for the insulator 592, it is preferable to use an insulating material that has a function of inhibiting diffusion of impurities such as a nitrogen atom, a nitrogen molecule, a nitrogen oxide molecule (e.g., $N_2O$, NO, and $NO_2$), and a copper atom (through which the above oxygen is less likely to pass). It is preferable that the insulator 592 have a function of inhibiting diffusion of oxygen (e.g., one or both of an oxygen atom and an oxygen molecule).

For the film having a barrier property against hydrogen, silicon nitride formed by a CVD method can be used, for example.

The amount of released hydrogen can be analyzed by thermal desorption spectroscopy (TDS), for example. The amount of hydrogen released from the insulator 324 that is converted into hydrogen atoms per area of the insulator 324 is less than or equal to $10\times10^{15}$ atoms/$cm^2$, preferably less than or equal to $5\times10^{15}$ atoms/$cm^2$ in the TDS in a film-surface temperature range of 50° C. to 500° C., for example.

Like the insulator 581, the insulator 594 is preferably an interlayer film with a low permittivity. Thus, the insulator 594 can be formed using any of the materials usable for the insulator 581.

Note that the permittivity of the insulator 594 is preferably lower than that of the insulator 592. For example, the relative permittivity of the insulator 594 is preferably lower than 4, further preferably lower than 3. The relative permittivity of the insulator 594 is, for example, preferably 0.7 times or less, further preferably 0.6 times or less the relative permittivity of the insulator 592. When a material with a low permittivity is used for the insulator 594, the parasitic capacitance generated between wirings can be reduced.

The conductor MPG functioning as a plug or a wiring is embedded in the insulator GI1 and the insulator IS3, and the conductor 596 functioning as a plug or a wiring is embedded in the insulator 592 and the insulator 594. In particular, the conductor MPG and the conductor 596 are electrically connected to the light-emitting device or the like provided above the insulator 594. A plurality of conductors each having a function of a plug or a wiring are collectively denoted by the same reference numeral in some cases. Moreover, in this specification and the like, a wiring and a plug connected to the wiring may be a single component. That is, part of a conductor functions as a wiring in some cases and part of the conductor functions as a plug in other cases.

As a material of each of plugs and wirings (e.g., the conductor MPG and the conductor 596), a single layer or a stacked layer of one or more conductive materials selected from a metal material, an alloy material, a metal nitride material, and a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used for formation. The use of a low-resistance conductive material can reduce wiring resistance.

An insulator 598 and an insulator 599 are sequentially formed over the insulator 594 and the conductor 596.

Like the insulator 592, for example, the insulator 598 is preferably formed using an insulator having a barrier property against one or more selected from hydrogen, oxygen, and water. Like the insulator 594, the insulator 599 is preferably formed using an insulator having a comparatively low relative permittivity to reduce parasitic capacitance generated between wirings. The insulator 599 has functions of an interlayer insulating film and a planarization film.

The light-emitting device 130 and a connection portion 140 are formed over the insulator 599.

The connection portion 140 is referred to as a cathode contact portion in some cases, and is electrically connected to cathode electrodes of the light-emitting device 130R, the light-emitting device 130G, and the light-emitting device 130B. The connection portion 140 in FIG. 22 includes one or more conductors selected from a conductor 112*a* to a conductor 112*c* to be described later, at least one of a conductor 126*a* to a conductor 126*c* to be described later, one or more conductors selected from a conductor 129*a* to a conductor 129*c* to be described later, a common layer 114 to be described later, and a common electrode 115 to be described later.

Note that the connection portion 140 may be provided to surround four sides of the display portion in the plan view, or may be provided in the display portion (e.g., between adjacent light-emitting devices 130) (not illustrated).

The light-emitting device 130R includes the conductor 112*a*, the conductor 126*a* over the conductor 112*a*, and the conductor 129*a* over the conductor 126*a*. All of the conductor 112*a*, the conductor 126*a*, and the conductor 129*a* can be referred to as a pixel electrode, or one or two of them can be referred to as a pixel electrode. The light-emitting device 130G includes the conductor 112*b*, the conductor 126*b* over the conductor 112*b*, and the conductor 129*b* over the conductor 126*b*. As in the light-emitting device 130R, all of the conductor 112*b*, the conductor 126*b*, and the conductor 129*b* can be referred to as a pixel electrode, or one or two of them can be referred to as a pixel electrode. The light-emitting device 130B includes the conductor 112*c*, the conductor 126*c* over the conductor 112*c*, and the conductor 129*c* over the conductor 126*c*. As in the light-emitting device 130R and the light-emitting device 130G, all of the conductor 112*c*, the conductor 126*c*, and the conductor 129*c* can be referred to as a pixel electrode, or one or two of them can be referred to as a pixel electrode.

For the conductor 112*a* to the conductor 112*c* and the conductor 126*a* to the conductor 126*c*, a conductive layer functioning as a reflective electrode can be used, for example. For the conductive layer functioning as a reflective electrode, a conductor with high visible-light reflectance such as silver, aluminum, or an alloy film of silver (Ag), palladium (Pd), and copper (Cu) (an Ag—Pd—Cu (APC) film) can be used. The conductor 112*a* to the conductor 112*c* and the conductor 126*a* to the conductor 126*c* can each be a stacked-layer film in which a pair of titanium films sandwich aluminum (a film in which Ti, Al, and Ti are stacked in this order), or a stacked-layer film in which a pair of indium tin oxide films sandwich silver (a film in which ITO, Ag, and ITO are stacked in this order).

For example, a conductive layer functioning as a reflective electrode may be used for the conductor 112*a* to the conductor 112*c*, and a conductor with a high light-transmitting property may be used for the conductor 126*a* to the conductor 126*c*. Examples of the conductor with a high light-transmitting property include an alloy of silver and magnesium and indium tin oxide (sometimes referred to as ITO).

A conductive layer functioning as a transparent electrode can be used for the conductor 129*a* to the conductor 129*c*. For the conductive layer functioning as a transparent electrode, for example, the above-described conductor with a high light-transmitting property can be used.

A microcavity structure may be provided in the light-emitting device 130 to be described in detail later. The microcavity structure refers to a structure in which the distance between the bottom surface of the light-emitting layer and the top surface of a lower electrode is set to a thickness depending on a wavelength of color of light emitted from the light-emitting layer. In that case, a light-transmitting and light-reflective conductive material is preferably used for the conductor 129*a* to the conductor 129*c* serving as an upper electrode (a common electrode), and a light-reflective conductive material is preferably used for the conductor 112*a* to the conductor 112*c* and the conductor 126*a* to the conductor 126*c* which serve as lower electrodes (pixel electrodes).

The microcavity structure refers to a structure in which the optical distance between the lower electrode and the light-emitting layer is adjusted to be $(2n-1)\lambda/4$ (n is a natural number greater than or equal to 1, and $\lambda$ is a wavelength of emitted light to be amplified). Thus, light that is reflected back by the lower electrode (reflected light) considerably interferes with light that directly enters the upper electrode from the light-emitting layer (incident light). Accordingly, the phases of the reflected light and the incident light each having the wavelength $\lambda$ can be aligned with each other, and the light emitted from the light-emitting layer can be further amplified. Meanwhile, in the case where the reflected light and the incident light each have a wavelength other than the wavelength 2, their phases are not aligned with each other, resulting in attenuation without resonation.

The conductor 112*a* is connected to the conductor 596 embedded in the insulator 594 through an opening formed in the insulator 599. The end portion of the conductor 126*a* is positioned on the outer side of the end portion of the conductor 112*a*. The end portion of the conductor 126*a* and the end portion of the conductor 129*a* are aligned or substantially aligned with each other.

Since the conductor 112*b*, the conductor 126*b*, and the conductor 129*b* of the light-emitting device 130G and the conductor 112*c*, the conductor 126*c*, and the conductor 129*c* of the light-emitting device 130B are similar to the conductor 112*a*, the conductor 126*a*, and the conductor 129*a* of the light-emitting device 130R, detailed description is omitted.

Depression portions are formed in the conductor 112*a*, the conductor 112*b*, and the conductor 112*c* to cover the openings provided in the insulator 599. A layer 128 is embedded in the depression portions.

The layer 128 has a function of filling the depression portions of the conductor 112*a* to the conductor 112*c*. The conductor 126*a* to the conductor 126*c* electrically connected to the conductor 112*a* to the conductor 112*c*, respectively, are provided over the conductor 112*a* to the conductor 112*c* and the layer 128. Thus, regions overlapping with the depression portions of the conductor 112*a* to the conductor 112*c* can also be used as the light-emitting regions, increasing the aperture ratio of the pixels.

The layer 128 may be an insulating layer or a conductive layer. Any of a variety of inorganic insulating materials, organic insulating materials, and conductive materials can be used for the layer 128 as appropriate. In particular, the layer 128 is preferably formed using an insulating material.

An insulating layer containing an organic material can be suitably used for the layer 128. For the layer 128, an acrylic resin, a polyimide resin, an epoxy resin, a polyamide resin, a polyimide-amide resin, a siloxane resin, a benzocyclobutene-based resin, a phenol resin, or a precursor of any of these resins can be used, for example. A photosensitive resin can also be used for the layer 128. As the photosensitive resin, a positive material or a negative material is given.

When a photosensitive resin is used, the layer 128 can be formed through only light-exposure and development steps, reducing the influence of dry etching or wet etching on the surfaces of the conductor 112*a*, the conductor 112*b*, and the conductor 112*c*. When the layer 128 is formed using a negative photosensitive resin, the layer 128 can sometimes be formed using the same photomask (light-exposure mask) as the photomask used for forming the opening in the insulator 599.

Figure 23A:
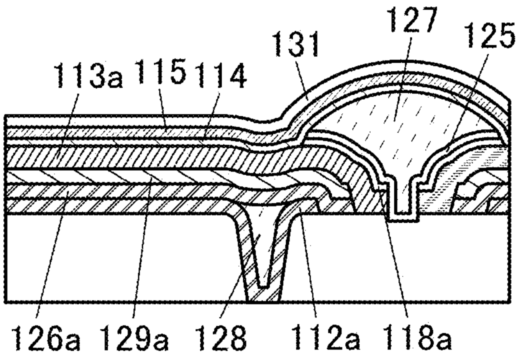
FIG. 23A to FIG. 23C are schematic cross-sectional views each illustrating a structure example of a semiconductor device.
Figure 23B:
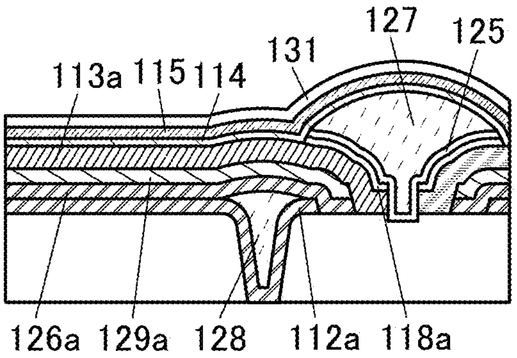
Figure 23C:
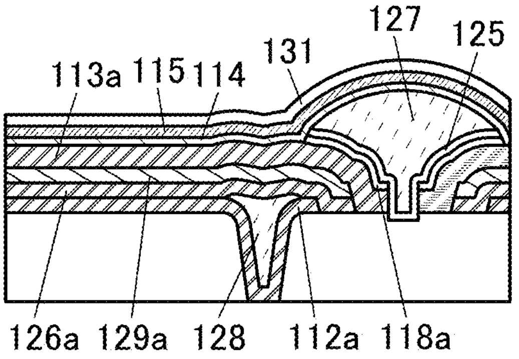

Although FIG. 22 illustrates an example where the top surface of the layer 128 includes a flat portion, the shape of the layer 128 is not particularly limited. As illustrated in FIG. 23A, the middle and the vicinity of the top surface of the layer 128 may be concave in the cross section. Alternatively, as illustrated in FIG. 23B, the middle and the vicinity of the layer 128 may be convex in the cross section. As illustrated in FIG. 23C, the middle and the vicinity of the layer 128 may be concave and convex in the cross section.

The light-emitting device 130R includes a first layer 113*a*, the common layer 114 over the first layer 113*a*, and the common electrode 115 over the common layer 114. The light-emitting device 130G includes a second layer 113*b*, the common layer 114 over the second layer 113*b*, and the common electrode 115 over the common layer 114. The light-emitting device 130B includes a third layer 113*c*, the common layer 114 over the third layer 113*c*, and the common electrode 115 over the common layer 114.

The first layer 113*a* is formed to cover the top surface and side surface of the conductor 126*a* and the top surface and side surface of the conductor 129*a*. Similarly, the second layer 113*b* is formed to cover the top surface and side surface of the conductor 126*b* and the top surface and side surface of the conductor 129*b*. Similarly, the third layer 113*c* is formed to cover the top surface and side surface of the conductor 126*c* and the top surface and side surface of the conductor 129*c*. Accordingly, regions provided with the conductor 126*a*, the conductor 126*b*, and the conductor 126*c* can be entirely used as the light-emitting regions of the light-emitting device 130R, the light-emitting device 130G, and the light-emitting device 130B, respectively, increasing the aperture ratio of the pixels.

In the light-emitting device 130R, the first layer 113*a* and the common layer 114 can be collectively referred to as an EL layer. Similarly, in the light-emitting device 130G, the second layer 113*b* and the common layer 114 can be collectively referred to as an EL layer. Similarly, in the light-emitting device 130B, the third layer 113*c* and the common layer 114 can be collectively referred to as an EL layer There is no particular limitation on the structure of the light-emitting device in this embodiment, and the light-emitting device can have a single structure or a tandem structure.

The first layer 113*a*, the second layer 113*b*, and the third layer 113*c* each have an island shape after being processed by a photolithography method. At each of end portions of the first layer 113*a*, the second layer 113*b*, and the third layer 113*c*, an angle between the top surface and side surface is approximately 90°. By contrast, for example, an organic film formed using an FMM (Fine Metal Mask) tends to have a thickness that gradually decreases with decreasing distance to an end portion, and has the top surface forming a slope in an area extending greater than or equal to 1 μm and less than or equal to 10 μm from the end portion, for example; thus, such an organic film has a shape whose top surface and side surface cannot be easily distinguished from each other.

The top surface and side surface of each of the first layer 113*a*, the second layer 113*b*, and the third layer 113*c* are clearly distinguished from each other. Accordingly, as for the first layer 113*a* and the second layer 113*b* which are adjacent to each other, one of the side surfaces of the first layer 113*a* and one of the side surfaces of the second layer 113*b* face to each other. This applies to a combination of any of the first layer 113*a*, the second layer 113*b*, and the third layer 113*c*.

The first layer 113*a*, the second layer 113*b*, and the third layer 113*c* each include at least a light-emitting layer. For example, a structure is preferable in which the first layer 113*a* includes a light-emitting layer that emits red light, the second layer 113*b* includes a light-emitting layer that emits green light, and the third layer 113*c* includes a light-emitting layer that emits blue light. Other than the above colors, cyan, magenta, yellow, or white can be employed for the light-emitting layers.

The first material layer 113*a*, the second material layer 113*b*, and the third material layer 113*c* each preferably include a light-emitting layer and a carrier-transport layer (an electron-transport layer or a hole-transport layer) over the light-emitting layer. Since surfaces of the first layer 113*a*, the second layer 113*b*, and the third layer 113*c* may be exposed in the manufacturing process of the semiconductor device, providing the carrier-transport layer over the light-emitting layers inhibits the light-emitting layers from being exposed on the outermost surface, so that damage to the light-emitting layers can be reduced. Accordingly, the reliability of the light-emitting devices can be improved.

The common layer 114 includes, for example, an electron-injection layer or a hole-injection layer. Alternatively, the common layer 114 may include a stack of an electron-transport layer and an electron-injection layer, or may include a stack of a hole-transport layer and a hole-injection layer. The common layer 114 is shared by the light-emitting device 130R, the light-emitting device 130G, and the light-emitting device 130B.

The common electrode 115 is shared by the light-emitting device 130R, the light-emitting device 130G, and the light-emitting device 130B. As illustrated in FIG. 22, the common electrode 115 shared by the plurality of light-emitting devices is electrically connected to a conductor included in the connection portion 140.

The insulator 125 preferably has a function of a barrier insulating layer against one or both of water and oxygen. Alternatively, the insulator 125 preferably has a function of inhibiting diffusion of one or both of water and oxygen. Alternatively, the insulator 125 preferably has a function of capturing or fixing (also referred to as gettering) one or both of water and oxygen. When the insulator 125 has a function of a barrier insulating layer or a gettering function, entry of impurities (typically, one or both of water and oxygen) that would diffuse into the light-emitting devices from the outside can be inhibited. With this structure, a highly reliable light-emitting device and a highly reliable display panel can be provided.

The insulator 125 preferably has a low impurity concentration. Accordingly, degradation of the EL layer, which is caused by entry of impurities into the EL layer from the insulator 125, can be inhibited. In addition, when the impurity concentration is reduced in the insulator 125, a barrier property against one or both of water and oxygen can be increased. For example, it is desirable that one or both of the hydrogen concentration and the carbon concentration in the insulator 125 be sufficiently low.

As the insulator 127, an insulating layer containing an organic material can be favorably used. As the organic material, a photosensitive organic resin is preferably used; for example, a photosensitive resin composition containing an acrylic resin may be used. The viscosity of the material of the insulator 127 is greater than or equal to 1 cP and less than or equal to 1500 cP, and is preferably greater than or equal to 1 cP and less than or equal to 12 cP. By setting the viscosity of the material of the insulator 127 in the above-described range, the insulator 127 having a tapered shape, which is to be described later, can be formed relatively easily. Note that in this specification and the like, an acrylic resin refers to not only a polymethacrylic acid ester or a methacrylic resin, but also all the acrylic-based polymers in a broad sense in some cases.

In this specification and the like, a tapered shape refers to a shape such that at least part of a side surface of a component is inclined to a substrate surface. For example, a tapered shape preferably includes a region where the angle between the inclined side surface and the substrate surface (such an angle is also referred to as a taper angle) is less than 90°.

Note that the organic material that can be used for the insulator 127 is not limited to the above as long as the insulator 127 has a tapered side surface as described later. For the insulator 127, an acrylic resin, a polyimide resin, an epoxy resin, an imide resin, a polyamide resin, a polyimide-amide resin, a silicone resin, a siloxane resin, a benzocyclobutene-based resin, a phenol resin, or precursors of these resins can be used in some cases, for example. Alternatively, an organic material such as polyvinyl alcohol (PVA), polyvinylbutyral (PVB), polyvinylpyrrolidone, polyethylene glycol, polyglycerin, pullulan, water-soluble cellulose, or an alcohol-soluble polyamide resin can be employed for the insulator 127 in some cases. For the insulator 127, for example, a photoresist can be used as the photosensitive resin in some cases. Note that as the photosensitive resin, a positive material or a negative material can be used.

For the insulator 127, a material absorbing visible light may be used. When the insulator 127 absorbs light from the light-emitting device, leakage of light (stray light) from the light-emitting device to the adjacent light-emitting device through the insulator 127 can be inhibited. Thus, the display quality of the display panel can be improved. Since the display quality of the display panel can be improved without using a polarizing plate, the weight and thickness of the display panel can be reduced.

Examples of the material absorbing visible light include materials containing pigment of black or the like, materials containing dye, light-absorbing resin materials (e.g., polyimide), and resin materials that can be used for color filters (color filter materials). A resin material obtained by stacking or mixing color filter materials of two colors or three or more colors is particularly preferably used to enhance the effect of blocking visible light. Specifically, mixing color filter materials of three or more colors enables formation of a black or nearly black resin layer.

For example, the insulator 127 can be formed by a wet deposition method such as spin coating, dipping, spray coating, ink-jetting, dispensing, screen printing, offset printing, a doctor knife method, slit coating, roll coating, curtain coating, or knife coating. Specifically, an organic insulating film that is to be the insulator 127 is preferably formed by spin coating.

The insulator 127 is formed at a temperature lower than the heat resistance temperature of the EL layer. The typical substrate temperature in formation of the insulator 127 is lower than or equal to 200° C., preferably lower than or equal to 180° C., further preferably lower than or equal to 160° C., still further preferably lower than or equal to 150° C., yet still further preferably lower than or equal to 140° C.

The description is made below on the structure of the insulator 127 or the like using the structure of the insulator 127 between the light-emitting device 130R and the light-emitting device 130G as an example. Note that the same applies to the insulator 127 between the light-emitting device 130G and the light-emitting device 130B, the insulator 127 between the light-emitting device 130B and the light-emitting device 130R, and the like. The description made below sometimes using an end portion of the insulator 127 over the second layer 113*b* as an example applies to an end portion of the insulator 127 over the first layer 113*a* and an end portion of the insulator 127 over the third layer 113*c*.

In a cross-sectional view of the semiconductor device, the side surface of the insulator 127 preferably has a tapered shape with the taper angle θ1. The taper angle θ1 is an angle formed by the side surface of the insulator 127 and the substrate surface. Note that the taper angle θ1 is not limited to the angle with the substrate surface, and may be an angle formed by the side surface of the insulator 127 and the top surface of the flat portion of the insulator 125 or the top surface of the flat portion of the second layer 113*b*. When the side surface of the insulator 127 has a tapered shape, the side surface of the insulator 125 and the side surface of the mask layer 118*a* also have a tapered shape in some cases.

The taper angle θ1 of the insulator 127 is less than 90°, preferably less than or equal to 60°, and further preferably less than or equal to 45°. Such a forward tapered shape of the end portion of the side surface of the insulator 127 can prevent disconnection, local thinning, or the like from occurring in the common layer 114 and the common electrode 115 which are provided over the end portion of the side surface of the insulator 127, leading to film formation with good coverage. The common layer 114 and the common electrode 115 can have improved in-plane uniformity in this manner, whereby the semiconductor device can have improved display quality.

The top surface of the insulator 127 preferably has a convex shape in a cross-sectional view of the semiconductor device. The top surface of the insulator 127 preferably has a convex shape that bulges gradually toward the center. The insulator 127 preferably has a shape such that the projecting portion at the center portion of the top surface is connected smoothly to the tapered portion of the end portion of the side surface. When the insulator 127 has such a shape, the common layer 114 and the common electrode 115 can be deposited with good coverage over the whole the insulator 127.

The insulator 127 is formed in a region between two EL layers (e.g., a region between the first layer 113*a* and the second layer 113*b*). At this time, part of the insulator 127 is placed at a position sandwiched between an end portion of the side surface of one of the EL layers (e.g., the first layer 113*a*) and an end portion of the side surface of the other of the EL layers (e.g., the second layer 113*b*).

One end portion of the insulator 127 preferably overlaps with the conductor 126*a* serving as a pixel electrode, and the other end portion of the insulator 127 preferably overlaps with the conductor 126*b* serving as a pixel electrode. With such a structure, the end portion of the insulator 127 can be formed over a substantially flat region of the first layer 113*a* (the second layer 113*b*). This makes it relatively easy to process the tapered shape of the insulator 127 as described above.

By providing the insulator 127 and the like in the above manner, a disconnected portion and a locally thinned portion can be prevented from being formed in the common layer 114 and the common electrode 115 from a substantially flat region in the first layer 113*a* to a substantially flat region in the second layer 113*b*. Thus, between the light-emitting devices, a connection defect caused by the disconnected portion and an increase in electric resistance caused by the locally thinned portion can be inhibited from occurring in the common layer 114 and the common electrode 115.

In the semiconductor device of this embodiment, the distance between the light-emitting devices can be short. Specifically, the distance between the light-emitting devices, the distance between the EL layers, or the distance between the pixel electrodes can be less than 10 μm, less than or equal to 8 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the semiconductor device of this embodiment includes a region where a distance between two adjacent island-shaped EL layers is less than or equal to 1 μm, preferably less than or equal to 0.5 μm (500 nm), further preferably less than or equal to 100 nm. The distance between light-emitting devices is shortened in this manner, whereby a semiconductor device with high resolution and a high aperture ratio can be provided.

A protective layer 131 is provided over the light-emitting device 130. The protective layer 131 is a film serving as a passivation film for protecting the light-emitting devices 130. Provision of the protective layer 131 covering the light-emitting device can inhibit an impurity such as water and oxygen from entering the light-emitting device, and increase the reliability of the light-emitting device 130. For the protective layer 131, aluminum oxide, silicon nitride, or silicon nitride oxide can be used, for example.

The protective layer 131 and a substrate 110 are bonded to each other with an adhesive layer 107. A solid sealing structure, a hollow sealing structure, or the like can be employed to seal the light-emitting devices. In FIG. 22, a solid sealing structure is employed in which a space between the substrate 310 and the substrate 110 is filled with the adhesive layer 107. Alternatively, a hollow sealing structure may be employed, in which the space is filled with an inert gas (e.g., nitrogen or argon). Here, the adhesive layer 107 may be provided not to overlap with the light-emitting devices. The space may be filled with a resin other than the frame-shaped adhesive layer 107.

For the adhesive layer 107, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. A two-liquid-mixture-type resin may be used. An adhesive sheet may be used.

The semiconductor device 100A has a top-emission structure. Light from the light-emitting device is emitted toward the substrate 110 side. Thus, for the substrate 110, a material having a high visible-light-transmitting property is preferably used. For example, a substrate having a high visible-light-transmitting property may be selected as the substrate 110 from substrates usable as the substrate 310. The pixel electrode contains a material that reflects visible light, and a counter electrode (the common electrode 115) contains a material that transmits visible light.

Note that the semiconductor device of one embodiment of the present invention may be not a top-emission display apparatus but a bottom-emission display apparatus where light from the light-emitting device is emitted to the substrate 310 side. In that case, a substrate having a high visible-light-transmitting property is selected as the substrate 310.

The structures, configurations, methods, and the like described in this embodiment can be used in combination as appropriate with the structures, configurations, methods, and the like described in the other embodiments.

Embodiment 4

In this embodiment, electronic devices each including the semiconductor device of one embodiment of the present invention will be described with reference to FIG. 24. Electronic devices described in this embodiment as examples are each provided with the semiconductor device of one embodiment of the present invention in a display portion. Thus, the electronic devices achieve high resolution.

Examples of electronic devices including the semiconductor device of one embodiment of the present invention include display apparatuses of televisions, monitors, and the like; lighting devices; desktop or laptop personal computers; word processors; image reproduction devices that reproduce still images or moving images stored in recording media such as DVD (Digital Versatile Disc); portable CD players; radios; tape recorders; headphone stereos; stereos; table clocks; wall clocks; cordless phone handsets; transceivers; mobile phones; car phones; portable game machines; tablet terminals; large-sized game machines such as pachinko machines; calculators; portable information terminals; electronic notebooks; e-book readers; electronic translators; audio input devices; video cameras; digital still cameras; electric shavers; high-frequency heating appliances such as microwave ovens; electric rice cookers; electric washing machines; electric vacuum cleaners; water heaters; electric fans; hair dryers; air-conditioning systems such as air conditioners, humidifiers, and dehumidifiers; dishwashers; dish dryers; clothes dryers; futon dryers; electric refrigerators; electric freezers; electric refrigerator-freezers; freezers for preserving DNA; flashlights; tools such as chain saws; smoke detectors; and medical equipment such as dialyzers. Other examples include industrial equipment such as guide lights, traffic lights, conveyor belts, elevators, escalators, industrial robots, power storage systems, and power storage devices for leveling the amount of power supply and smart grid.

In addition, moving objects and the like driven by electric motors using power from the power storage devices are also included in the category of electronic devices. Examples of the moving objects include electric vehicles (EVs), hybrid electric vehicles (HEVs) that include both an internal-combustion engine and a motor, plug-in hybrid electric vehicles (PHEVs), tracked vehicles in which caterpillar tracks are substituted for wheels of these vehicles, motorized bicycles including motor-assisted bicycles, motorcycles, electric wheelchairs, golf carts, boats, ships, submarines, helicopters, aircraft, rockets, artificial satellites, space probes, planetary probes, and spacecraft.

The electronic devices may include a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), for example.

The electronic device can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication mean, and a function of reading out a program or data stored in a recording medium.

The electronic devices illustrated in FIG. 24A to FIG. 24G have a variety of functions. For example, the electronic devices can have a function of displaying a variety of information (a still image, a moving image, a text image, and the like) on the display portion, a touch panel function, a function of displaying a calendar, date, time, or the like, a function of controlling processing with use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may each be provided with a camera or the like and have a function of taking a still image or a moving image, a function of storing the taken image in a storage medium (an external storage medium or a storage medium incorporated in the camera), a function of displaying the taken image on the display portion, or the like.

The electronic devices illustrated in FIG. 24A to FIG. 24G are described in detail below.

Figure 24A:
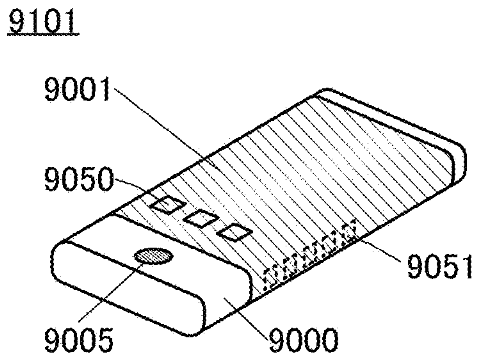
FIG. 24A to FIG. 24G are diagrams each illustrating a structure example of an electronic device.

FIG. 24A is a perspective view illustrating a portable information terminal 9101. For example, the portable information terminal 9101 can be used as a smartphone. Note that the portable information terminal 9101 may be provided with the speaker 9003, the connection terminal 9006, the sensor 9007, or the like. The portable information terminal 9101 can display characters and image information on its plurality of surfaces. FIG. 24A illustrates an example where three icons 9050 are displayed. Furthermore, information 9051 indicated by dashed rectangles can be displayed on another surface of the display portion 9001. Examples of the information 9051 include notification of reception of an e-mail, an SNS message, or an incoming call, the title and sender of an e-mail, an SNS message, or the like, the date, the time, remaining battery, and the radio field intensity. Alternatively, the icon 9050 or the like may be displayed at the position where the information 9051 is displayed.

Figure 24B:
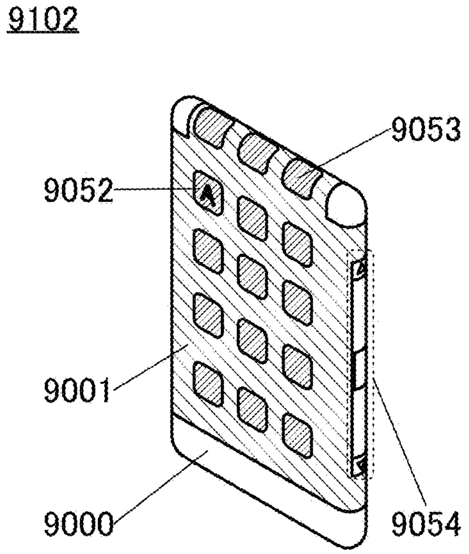

FIG. 24B is a perspective view illustrating a portable information terminal 9102. The portable information terminal 9102 has a function of displaying information on three or more surfaces of the display portion 9001. Here, information 9052, information 9053, and information 9054 are displayed on different surfaces. For example, a user can check the information 9053 displayed such that it can be seen from above the portable information terminal 9102, with the portable information terminal 9102 put in a breast pocket of their clothes. The user can see the display without taking out the portable information terminal 9102 from the pocket and decide whether to answer the call, for example.

Figure 24C:
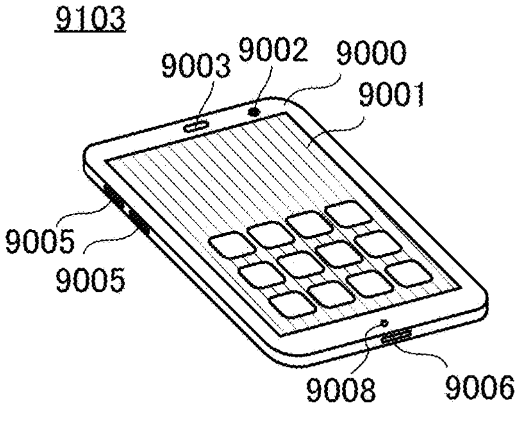

FIG. 24C is a perspective view illustrating a tablet terminal 9103. The tablet terminal 9103 is capable of executing a variety of applications such as mobile phone calls, e-mailing, viewing and editing texts, music reproduction, Internet communication, and a computer game. The tablet terminal 9103 includes the display portion 9001, a camera 9002, the microphone 9008, and the speaker 9003 on the front surface of the housing 9000; the operation keys 9005 as buttons for operation on the left side surface of the housing 9000; and the connection terminal 9006 on the bottom surface of the housing 9000.

Figure 24D:
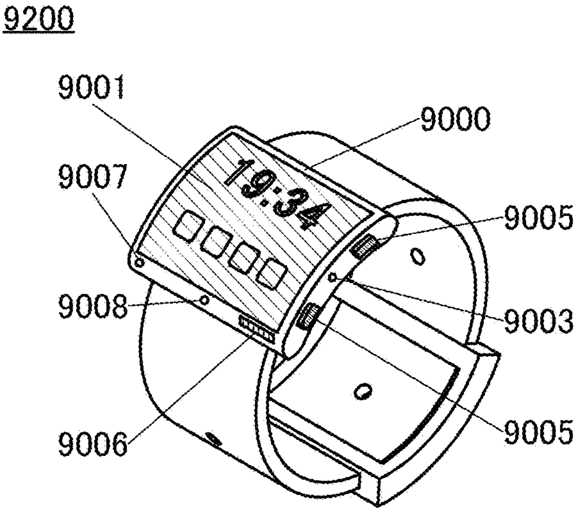

FIG. 24D is a perspective view illustrating a watch-type portable information terminal 9200. The portable information terminal 9200 can be used as a Smartwatch (registered trademark), for example. The display surface of the display portion 9001 is curved, and an image can be displayed on the curved display surface. Furthermore, for example, mutual communication between the portable information terminal 9200 and a headset capable of wireless communication can be performed, and thus hands-free calling is possible. With the connection terminal 9006, the portable information terminal 9200 can perform mutual data transmission with another information terminal and charging. Note that the charging operation may be performed by wireless power feeding.

Figure 24E:
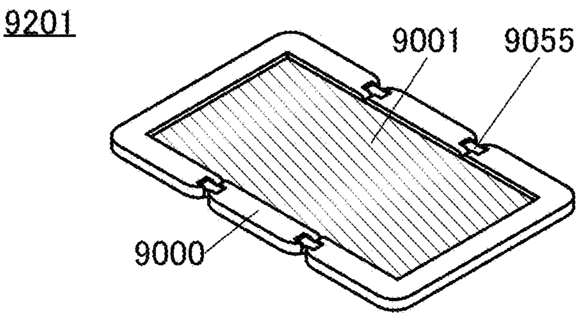
Figure 24F:
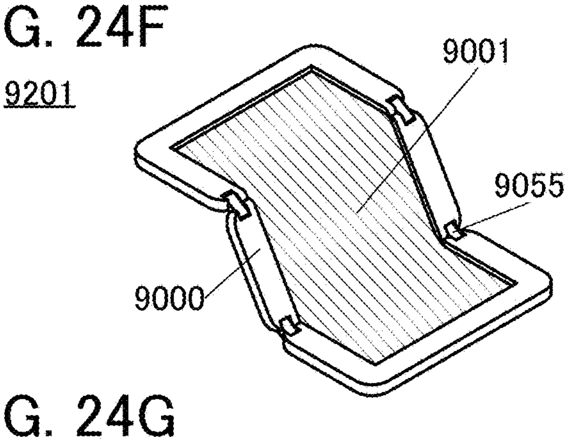
Figure 24G:
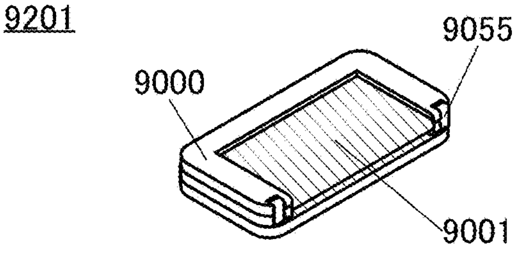

FIG. 24E to FIG. 24G are perspective views illustrating a foldable portable information terminal 9201. FIG. 24E is a perspective view of an opened state of the portable information terminal 9201, FIG. 24G is a perspective view of a folded state thereof, and FIG. 24F is a perspective view of a state in the middle of change from one of FIG. 24E and FIG. 24G to the other. The portable information terminal 9201 is highly portable when folded. When the portable information terminal 9201 is opened, a seamless large display region is highly browsable. The display portion 9001 of the portable information terminal 9201 is supported by three housings 9000 joined together by hinges 9055. The display portion 9001 can be folded with a radius of curvature greater than or equal to 0.1 mm and less than or equal to 150 mm, for example.

The structures, configurations, methods, and the like described in this embodiment can be used in combination as appropriate with the structures, configurations, methods, and the like described in the other embodiments.

Example 1

In this example, the numbers of the semiconductor devices 100S (corresponding to DPA in each diagram) and the semiconductor devices 100 (corresponding to DPB in each diagram) which are fabricated on one 12-inch wafer and which are assumed to have a diagonal size of 1.0 inch, an aspect ratio of 16:9, a 4K definition (3840×2160 pixels), and a resolution of 4406 ppi (the number is also referred to as "the number of chips obtained") are estimated, and the estimation results are described. Note that in this example and the like, a semiconductor device obtained by cutting a wafer is referred to as a "chip" in some cases.

The semiconductor device 100S is assumed to have a structure in which the display control portion 50 (a region where the plurality of driver circuit portions 51 are provided) and the display portion 60 (a region where the plurality of display regions 61 are provided) are formed using only Si transistors and a plurality of light-emitting devices 91 are provided thereover (also referred to as an "OEL/Si structure").

The semiconductor device 100 is assumed to have a structure in which the display control portion 50 is formed using Si transistors, the display portion 60 is formed thereover using OS transistors, and the plurality of light-emitting devices 91 are provided over the display portion 60 (also referred to as an "OEL/OS/Si structure"). The semiconductor device 100 corresponds to the semiconductor device 100 in Embodiment 1 described above, for example.

Figure 25A:
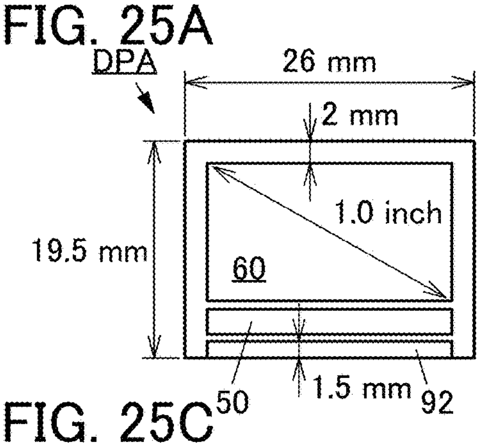
FIG. 25A to FIG. 25H are diagrams each showing a structure example of a semiconductor device.
Figure 25B:
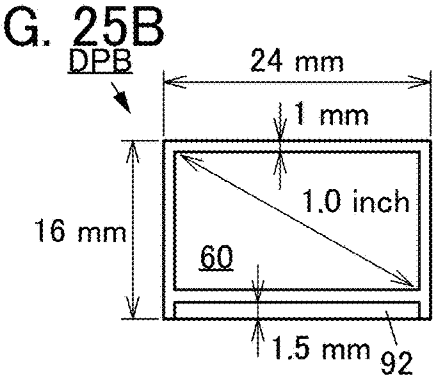

FIG. 25A shows the assumed external size of the semiconductor device 100S. FIG. 25B shows the assumed external size of the semiconductor device 100. In each of the semiconductor device 100S and the semiconductor device 100, the diagonal size of the display portion 60 is 1.0 inch and the width of the terminal portion 92 is 1.5 mm. The external size of the semiconductor device 100S is 19.5 mm×26 mm and the bezel width is 2 mm. The external size of the semiconductor device 100S is 16 mm×24 mm and the bezel width is 1 mm. A gate driver is provided at a bezel portion of 2 mm in the semiconductor device 100S.

In the semiconductor device 100S having the OEL/Si structure, the display control portion 50 and the display portion 60 are provided side by side on a wafer. In other words, the display control portion 50 and the display portion 60 cannot be provided to overlap with each other. Meanwhile, in the semiconductor device 100 having the OEL/OS/Si structure, the display control portion 50 can be provided to overlap with the display portion 60. Furthermore, in the semiconductor device 100, the logic circuit portion 31 can be provided to overlap with the display portion 60. Thus, the semiconductor device 100 can be provided with a larger number of peripheral circuits and the like than the semiconductor device 100S. In addition, the external size of the semiconductor device 100 can be smaller than that of the semiconductor device 100S.

The number of chips obtained as the semiconductor devices 100S is estimated to be 121 and the number of chips obtained as the semiconductor devices 100 is estimated to be 161 on the basis of the external sizes illustrated in FIG. 25A and FIG. 25B. Accordingly, it can be said that the final manufacturing cost of the semiconductor devices 100 having the OEL/OS/Si structure can be easily reduced as compared to the semiconductor devices 100S having the OEL/Si structure.

Figure 25C:
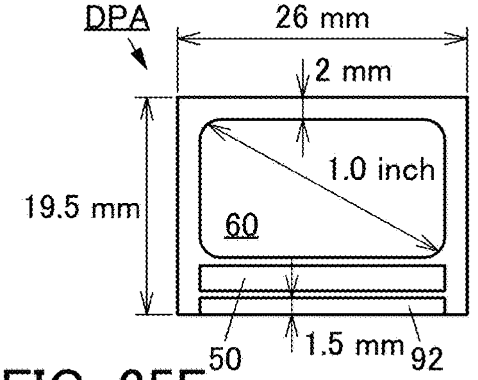
Figure 25D:
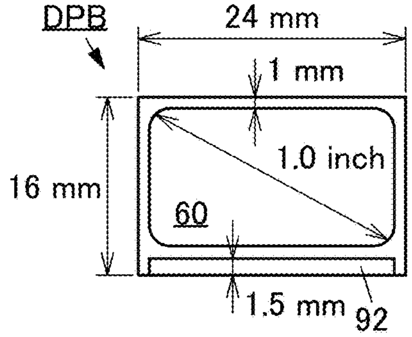
Figure 25E:
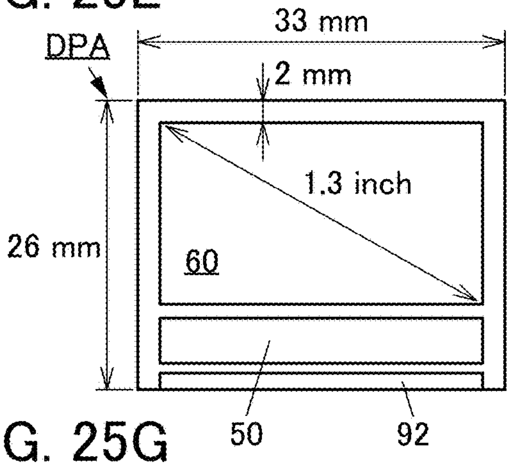

Note that the advantage of the semiconductor device 100 having the OEL/OS/Si structure over the semiconductor device 100S having the OEL/Si structure described with reference to FIG. 25A and FIG. 25B is not changed even when shapes of corner portions of the display portion 60 are different. For example, as illustrated in FIG. 25C and FIG. 25D, the corner portions of the display portions may have fillet shapes (shapes obtained by processing the corner portions to be rounded). Furthermore, the corner portion of the display portion may have a chamfered shape. When the corner portion of the display portion 60 has the fillet shape or the chamfered shape, the display portion can have excellent designability.

In FIG. 25E to FIG. 25H, the estimation results of the diagonal size of the display portion 60 of each of the semiconductor device 100S and the semiconductor device 100 that can be manufactured by one-time light exposure (one shot, 26 mm×33 mm) are shown.

In the case where the aspect ratio is 16:9, the maximum diagonal size of the display portion 60 of the semiconductor device 100S is estimated to be 1.3 inches (see FIG. 25C), and the maximum diagonal size of the display portion 60 of the semiconductor device 100 is estimated to be 1.4 inches (see FIG. 25D). Note that FIG. 25D shows a state where the logic circuit portion 31 is provided in the remaining region.

Figure 25F:
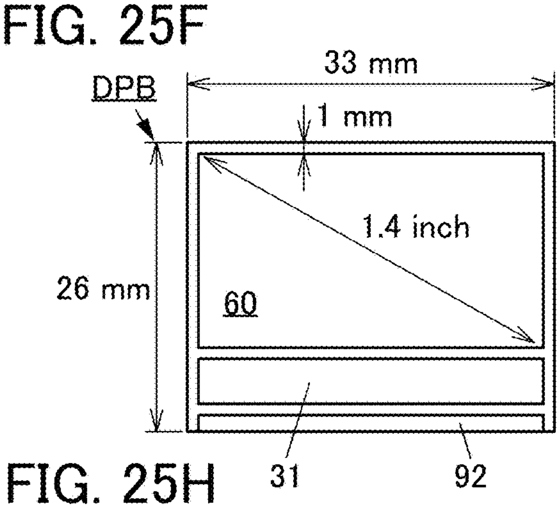
Figure 25G:
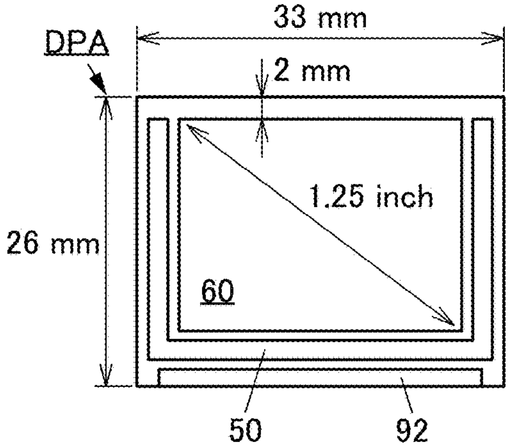
Figure 25H:
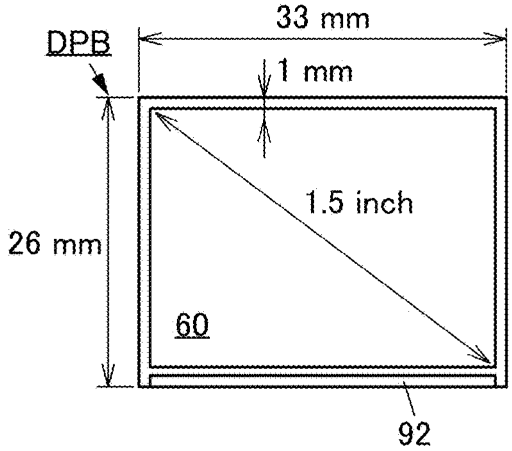

In the case where the aspect ratio is 4:3, the maximum diagonal size of the display portion 60 of the semiconductor device 100S is estimated to be 1.25 inches (see FIG. 25E), and the maximum diagonal size of the display portion 60 of the semiconductor device 100 is estimated to be 1.5 inches (see FIG. 25F).

The semiconductor device including the display portion preferably has a larger display portion. In the semiconductor device 100S having the OEL/Si structure, the maximum diagonal size that can be manufactured by one-time light exposure is 1.3 inches. On the other hand, the semiconductor device 100 having the OEL/OS/Si structure enables the display control portion 50 or the like to be provided to overlap with the display portion 60, and thus, the diagonal size of the display portion that can be manufactured by one-time light exposure can be increased to 1.5 inches. In the semiconductor device 100, a circuit other than the display control portion 50 can be provided to overlap with the display portion 60. When the semiconductor device 100 has the OEL/OS/Si structure, addition of various functions can be achieved at low cost as well as a large size of the display portion 60.

In such an electronic device including the semiconductor device of one embodiment of the present invention, the stacked-layer structure of OS/Si, a display element (typically, an EL element), a display control portion for driving the display element, and the like are monolithically formed, whereby an on-chip system or a system display can be provided.

Supplementary Notes on the Description in this Specification and the Like

The description of the above embodiments and each configuration in the embodiments are noted below.

One embodiment of the present invention can be constituted by appropriately combining the structure described in each embodiment and example with any of the structures described in the other embodiments. In addition, in the case where a plurality of configuration examples are described in one embodiment, the configuration examples can be combined as appropriate.

Note that content (or may be part of the content) described in one embodiment can be applied to, combined with, or replaced with another content (or may be part of the content) described in the embodiment and/or content (or may be part of the content) described in another embodiment or other embodiments.

Note that in each embodiment, content described in the embodiment is content described using a variety of diagrams or content described with text disclosed in the specification.

Note that by combining a diagram (or may be part thereof) described in one embodiment with another part of the diagram, a different diagram (or may be part thereof) described in the embodiment, and/or a diagram (or may be part thereof) described in another embodiment or other embodiments, much more diagrams can be formed.

In addition, in this specification and the like, components are classified on the basis of the functions, and shown as blocks independent of one another in block diagrams. However, in an actual circuit or the like, it is difficult to separate components on the basis of the functions, and there is such a case where one circuit is associated with a plurality of functions or a case where a plurality of circuits are associated with one function. Therefore, blocks in the block diagrams are not limited by the components described in this specification, and the description can be changed appropriately depending on the situation.

Furthermore, in the drawings, the size, the layer thickness, or the region is shown with given magnitude for description convenience. Therefore, the size, the layer thickness, or the region is not limited to the illustrated scale. Note that the drawings are schematically shown for clarity, and embodiments of the present invention are not limited to shapes, values or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) are used in the description of the connection relationship of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the term "electrode" or "wiring" does not limit the function of the component. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as "film" and "layer" can be interchanged with each other depending on the case or according to circumstances. For example, the term "conductive layer" can be replaced with the term "conductive film" in some cases. As another example, the term "insulating film" can be changed into the term "insulating layer" in some cases.

In this specification and the like, a switch has a function of controlling whether current flows or not by being in a conduction state (an ON state) or a non-conduction state (an OFF state). Alternatively, a switch has a function of selecting and changing a current path.

In this specification and the like, channel length refers to, for example, the distance between a source and a drain in a region where a semiconductor (or a portion where current flows in a semiconductor when a transistor is in an ON state) and a gate overlap each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an ON state) and a gate electrode overlap each other or a region where a channel is formed.

In this specification and the like, the expression "A and B are connected" means the case where A and B are electrically connected as well as the case where A and B are directly connected. Here, the expression "A and B are electrically connected" means the case where electric signals can be transmitted and received between A and B when an object having any electric action is present between A and B.

REFERENCE NUMERALS

10: arithmetic device, 20: memory device, 30: element layer, 40: element layer, 50: display control portion, 51: driver circuit portion, 52: driver circuit, 53: driver circuit, 60: display portion, 61: display region, 62: pixel circuit, 70: wiring layer, 90: element layer, 91: light-emitting device, 92: terminal portion, 99: sealing substrate, 100: semiconductor device, 1000: electronic device, 1001: housing, 1011: hour hand, 1012: minute hand, 1013: second hand, 1014: dial

The invention claimed is:

1. An electronic device comprising:

a semiconductor device, wherein the electronic device is configured to display an analog watch, wherein the semiconductor device comprises a logic circuit portion provided in a plurality of element layers, a display control portion, and a display portion, wherein the display portion comprises a first display region to a thirteenth display region, wherein the thirteenth display region is located in a middle portion of the display portion, wherein the thirteenth display region is surrounded by the first display region to the twelfth display region, wherein the display control portion comprises a first driver circuit portion to a thirteenth driver circuit portion, wherein the thirteenth driver circuit portion is located in a middle portion of the display control portion, wherein the thirteenth driver circuit portion is surrounded by the first driver circuit portion to the twelfth driver circuit portion, wherein the first display region is overlapped with the first driver circuit portion, wherein the second display region is overlapped with the second driver circuit portion, wherein the third display region is overlapped with the third driver circuit portion, wherein the fourth display region is overlapped with the fourth driver circuit portion, wherein the fifth display region is overlapped with the fifth driver circuit portion, wherein the sixth display region is overlapped with the sixth driver circuit portion, wherein the seventh display region is overlapped with the seventh driver circuit portion, wherein the eighth display region is overlapped with the eighth driver circuit portion, wherein the ninth display region is overlapped with the ninth driver circuit portion, wherein the tenth display region is overlapped with the tenth driver circuit portion, wherein the eleventh display region is overlapped with the eleventh driver circuit portion, wherein the twelfth display region is overlapped with the twelfth driver circuit portion, wherein the thirteenth display region is overlapped with the thirteenth driver circuit portion, wherein the first display region to the thirteenth display region each comprise a pixel circuit that controls light emission of a light-emitting device, wherein the first driver circuit portion to the thirteenth driver circuit portion each comprise a driver circuit that controls the corresponding pixel circuit, wherein the logic circuit portion comprises an arithmetic device, and wherein the arithmetic device is configured to control, in accordance with whether or not image data is updated in each of the first display region to the thirteenth display region, an operation state or a stop state of the driver circuit corresponding to the pixel circuit included in the display region.

2. The electronic device according to claim 1, further comprising:

a first element layer, a second element layer, and a third element layer, wherein the first element layer comprises a first transistor comprising a semiconductor layer comprising silicon in a channel formation region, wherein the second element layer comprises a second transistor comprising a semiconductor layer comprising a metal oxide in a channel formation region, and wherein the third element layer comprises the light-emitting device.

3. The electronic device according to claim 2, wherein the arithmetic device comprises a scan flip-flop and a backup circuit electrically connected to the scan flip-flop, wherein the scan flip-flop and the first driver circuit portion to the thirteenth driver circuit portion are provided in the first element layer, and wherein the backup circuit and the pixel circuit are provided in the second element layer.

4. The electronic device according to claim 3, wherein the backup circuit, in a non-operation state of the arithmetic device, is configured to retain data retained in the scan flip-flop in a state where supply of power supply voltage is stopped.

5. The electronic device according to claim 2, wherein the metal oxide comprises In, Ga, and Zn.

6. The electronic device according to claim 1, wherein the image data is image data for displaying a second hand, an hour hand, and a minute hand, wherein in the arithmetic device, the driver circuit corresponding to the pixel circuit included in the display region displaying the second hand, the hour hand, and the minute hand is in an operation state, and wherein the driver circuit corresponding to the pixel circuit included in the display region not displaying the second hand, the hour hand, and the minute hand is in a stop state.

* * * * *